United States Patent [19]
Kanai et al.

[11] Patent Number: 5,864,679
[45] Date of Patent: Jan. 26, 1999

[54] TRANSACTION ROUTING IN A MULTIPLE PROCESSOR SYSTEM USING AN EXTRACTED TRANSACTION FEATURE PARAMETER AND TRANSACTION HISTORICAL DATA

[75] Inventors: Tatsunori Kanai; Takeshi Yokokawa, both of Kanagawa-ken, Japan

[73] Assignee: Kabushiki Kaisha Toshiba, Kawasaki, Japan

[21] Appl. No.: 859,724

[22] Filed: May 21, 1997

Related U.S. Application Data

[63] Continuation of Ser. No. 300,554, Sep. 6, 1994, abandoned.

[30] Foreign Application Priority Data

| Sep. 6, 1993 | [JP] | Japan | 5-220353 |
| Dec. 28, 1993 | [JP] | Japan | 5-349306 |

[51] Int. Cl.⁶ .................................................. G06F 15/00
[52] U.S. Cl. .......................... 395/200.68; 707/3; 707/10; 395/200.31; 395/200.54; 395/200.78
[58] Field of Search ................. 707/10, 3; 395/200.31, 395/200.54, 200.68, 200.78

[56] References Cited

U.S. PATENT DOCUMENTS

| 5,048,011 | 9/1991 | Melen | 370/60 |
| 5,155,851 | 10/1992 | Krishnan | 395/650 |
| 5,170,393 | 12/1992 | Peterson et al. | 370/94.1 |
| 5,218,676 | 6/1993 | Ben-Ayed et al. | 395/200 |
| 5,289,371 | 2/1994 | Abel et al. | 364/401 |
| 5,347,450 | 9/1994 | Nugent | 395/200 |
| 5,404,451 | 4/1995 | Nemirovsky et al. | 395/200 |
| 5,430,729 | 7/1995 | Rahnema | 270/94.1 |
| 5,452,350 | 9/1995 | Reynolds et al. | 379/220 |
| 5,475,813 | 12/1995 | Cieslak et al. | 395/182.02 |
| 5,499,237 | 3/1996 | Richetta et al. | 370/54 |
| 5,504,894 | 4/1996 | Ferguson et al. | 395/650 |
| 5,537,394 | 7/1996 | Abe et al. | 370/17 |
| 5,546,541 | 8/1996 | Drew et al. | 395/200.7 |
| 5,586,312 | 12/1996 | Johnson et al. | 707/10 |
| 5,678,010 | 10/1997 | Pittenger et al. | 340/825.3 |

FOREIGN PATENT DOCUMENTS 4-229356   8/1992   Japan.

OTHER PUBLICATIONS

Proceedings of the Twelfth International Conference on Very Large Data Bases, Aug. 1986, pp. 249–256, Philip S. Yu, et al., "On Affinity Based Routing in Multi–System Data Sharing".

*Primary Examiner*—Paul R. Lintz
*Assistant Examiner*—Jean R. Homere
*Attorney, Agent, or Firm*—Oblon, Spivak, McClelland, Maier & Neustadt, P.C.

[57] ABSTRACT

A multiple processor transaction processing system having both a transaction routing unit for routing each transaction generated by the transaction source to one of the transaction processors, and a data arrangement unit for determining data arrangement of the data to be used in processing the transactions by the transaction processors. The transaction routing unit routes each transaction to one of the transaction processors according to the feature parameters extracted from each transaction and the processing history information for past transactions processed by the transaction processors. The data arrangement unit determines a new data arrangement of the data in the data storage regions according to a data storage information indicating original arrangement of the data in the data storage regions and the correlation information indicating all sets of data which are accessed together in each series processing carried out by the transaction processors.

20 Claims, 82 Drawing Sheets

| DATABASE | KEY RANGE | PROCESSOR NO. |
|---|---|---|
| ACCOUNT | 0 ~ 999 | $\phi$ |
| ACCOUNT | 1000 ~ 1999 | 1 |
| ACCOUNT | 2000 ~ 2999 | 2 |
| ⋮ | ⋮ | ⋮ |
| TELLER | 0 ~ 9 | $\phi$ |
| TELLER | 10 ~ 19 | 1 |
| ⋮ | ⋮ | ⋮ |

| TRANSACTION TYPE | ARGUMENT | DATABASE |
|---|---|---|
| WITHDRAW | ACCOUNT-ID | ACCOUNT |
| DEPOSIT | TELLER-ID | TELLER |
| ......... | ......... | ......... |

4C

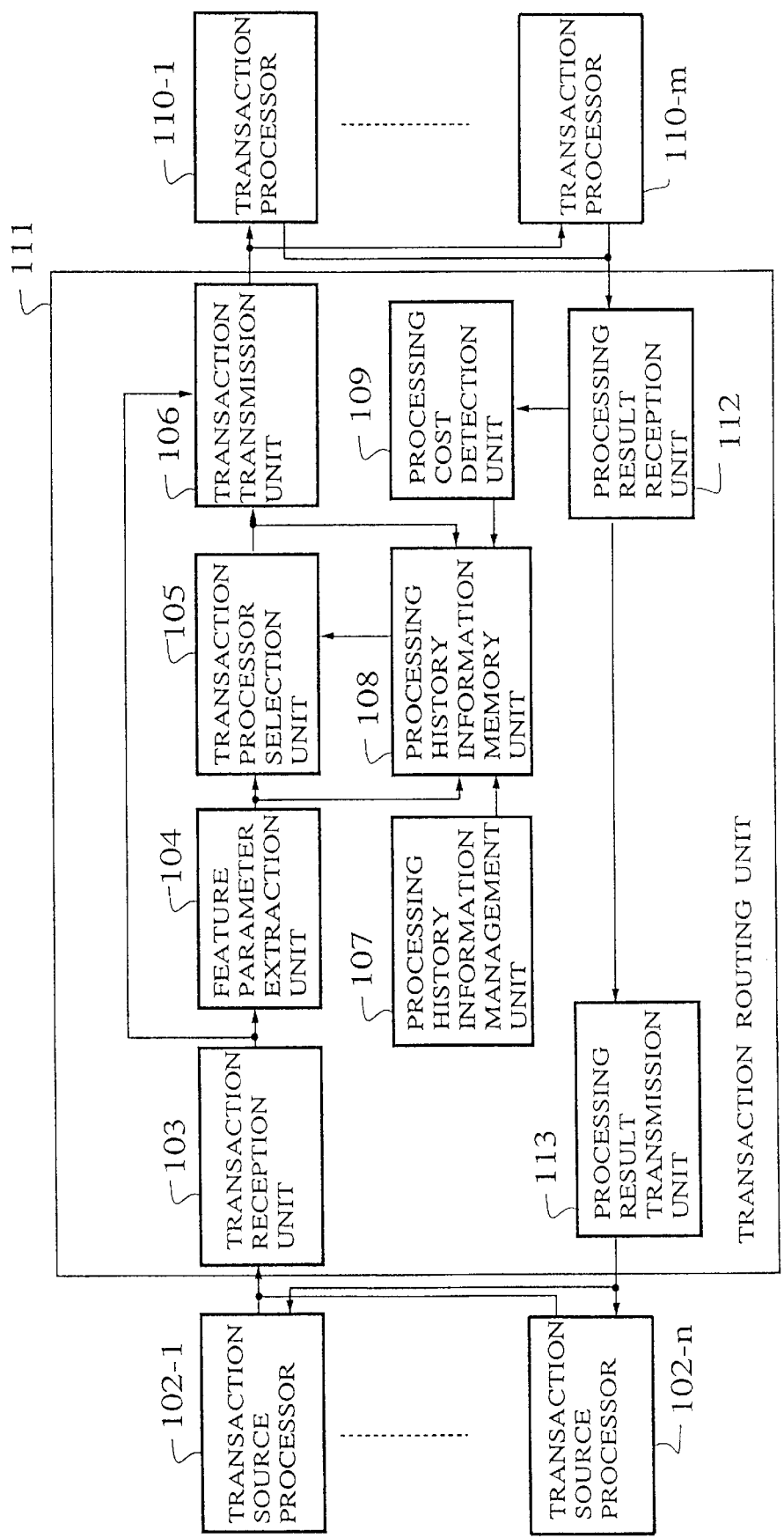

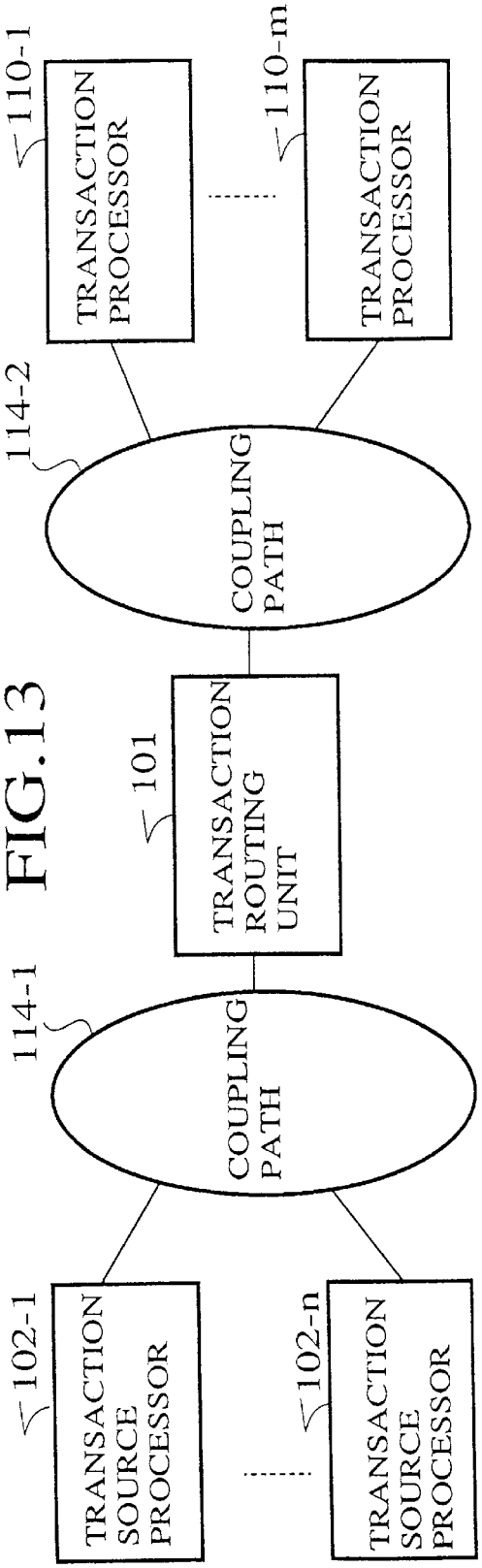
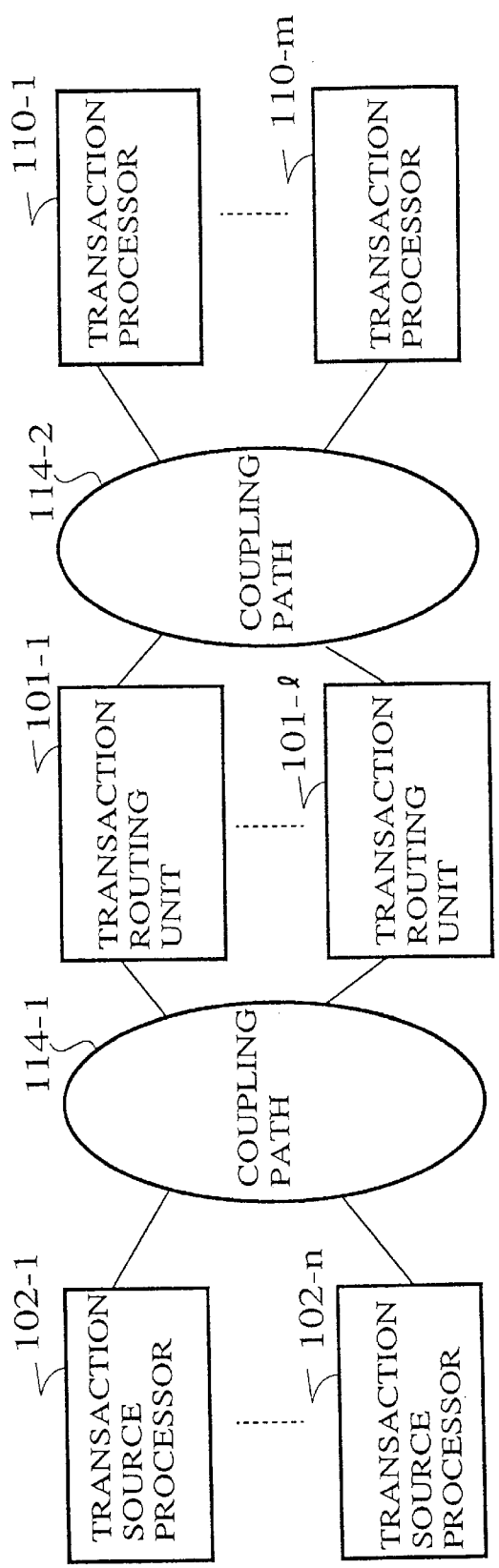

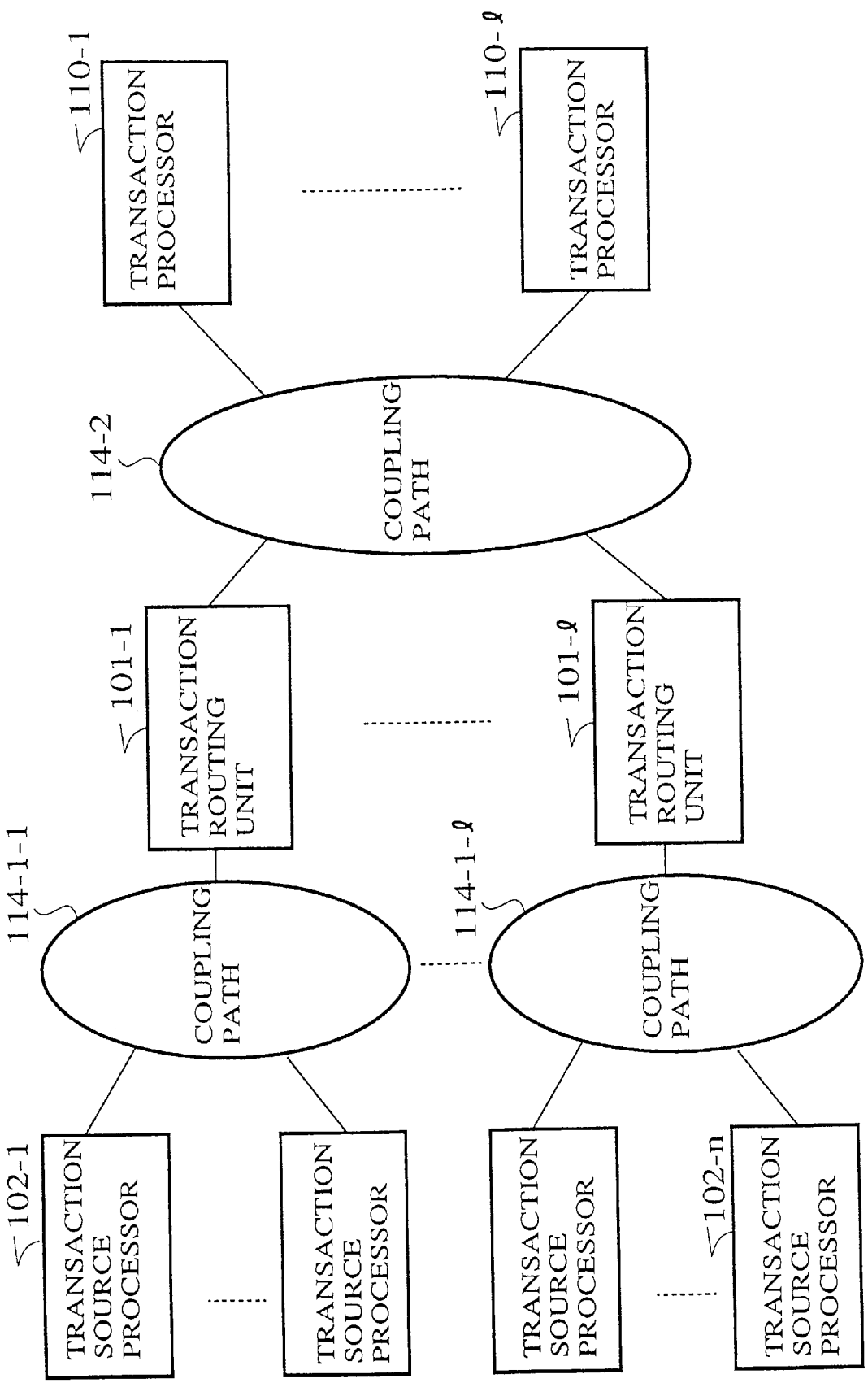

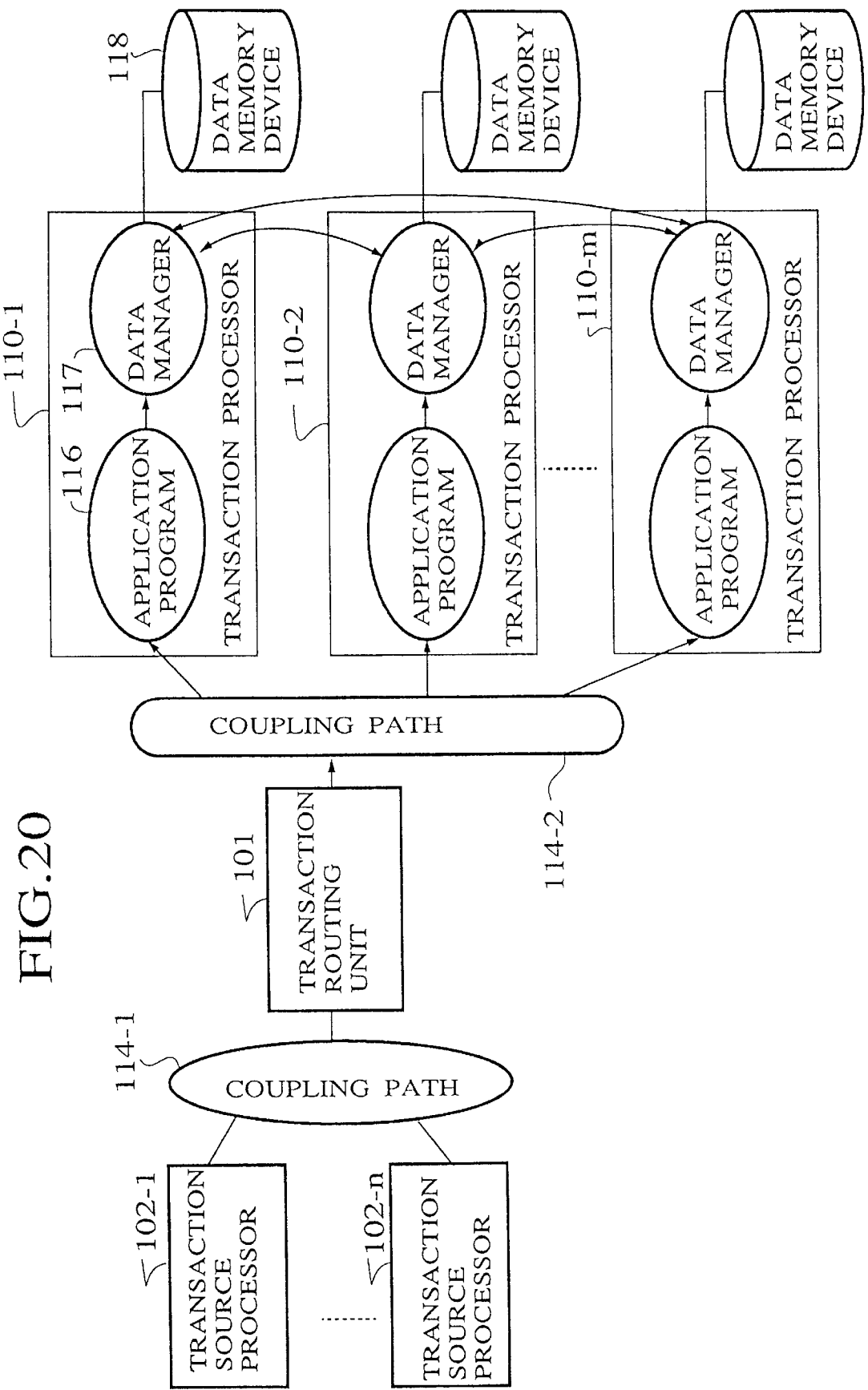

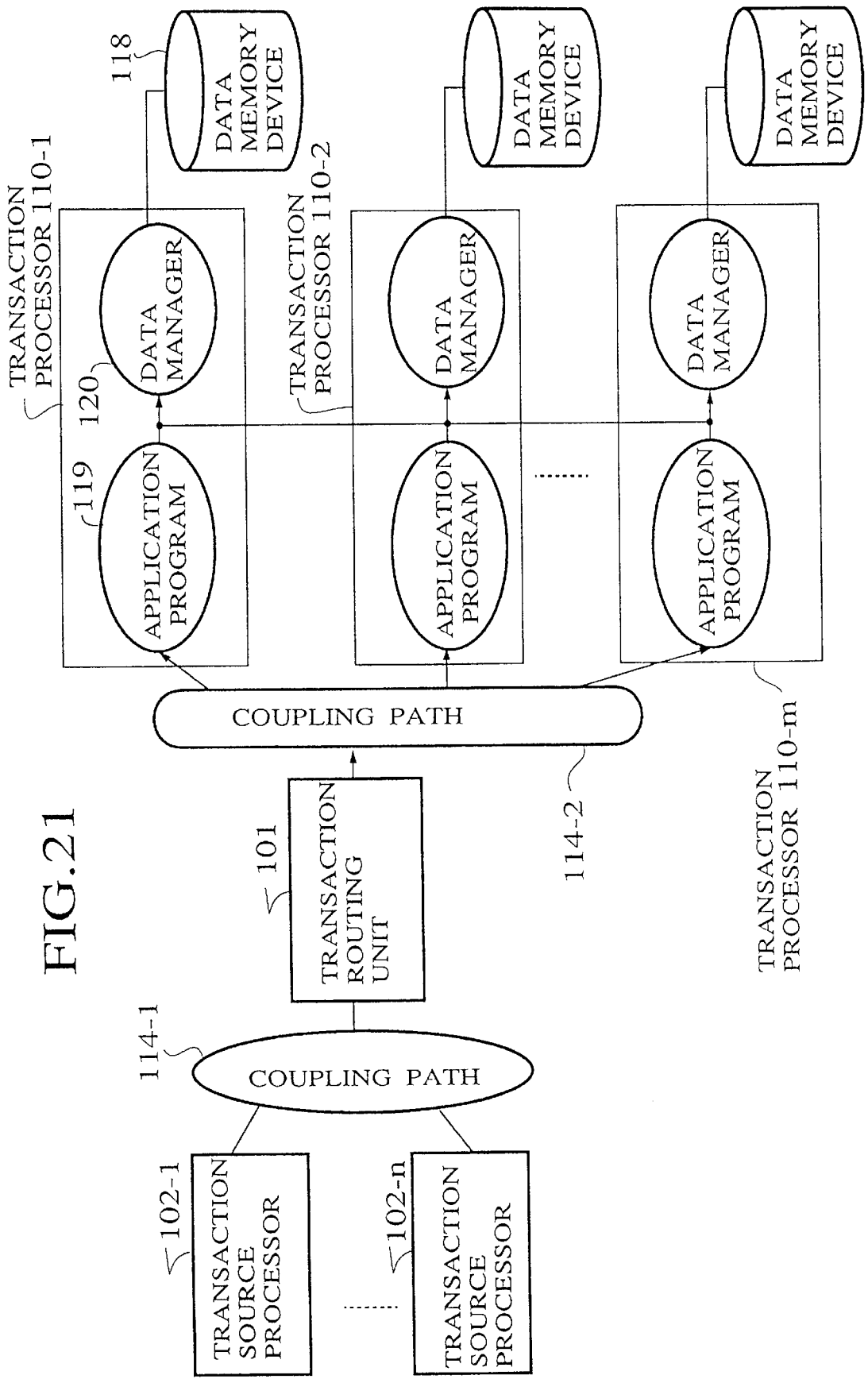

BYTE

PACKET

BYTE proc 1 — TYPE OF TRANSACTION x — ARGUMENT 1 y — ARGUMENT 2 z — ARGUMENT 3

PACKET struct {
int a ;
char b ;
}

| struct |
| 2 |
| int |
| char | int x [10] ;

| array |
| 10 |
| int | int proc 1 (int x, string y, float z)

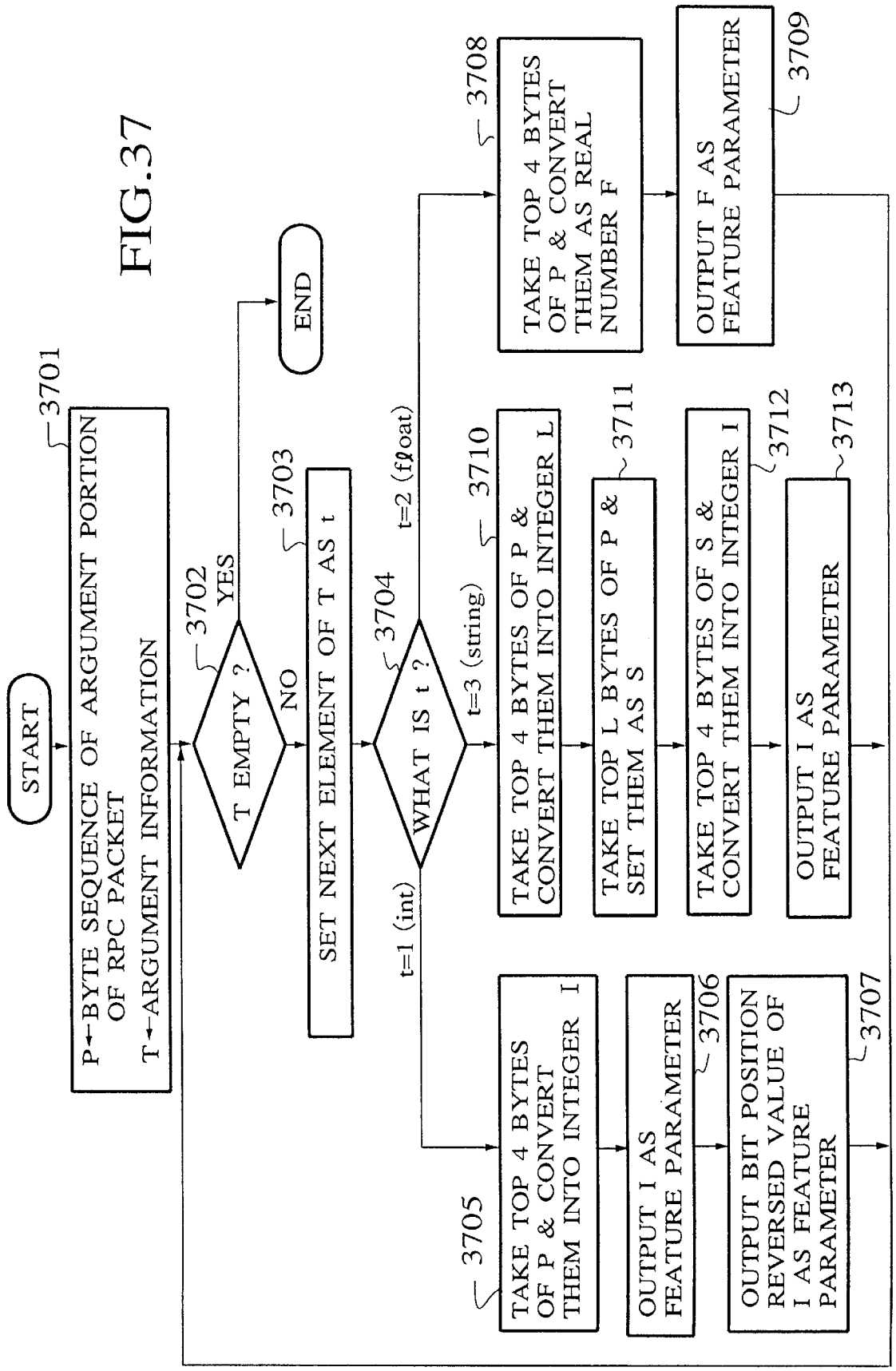

FIG.45A

| TYPE OF TRANSACTION |
|---|
| IDENTIFICATION NUMBER |
| ARGUMENT 1 |
| ARGUMENT 2 |
| ⋮ |
| ARGUMENT n |

FIG.45B

| IDENTIFICATION NUMBER |
|---|
| RESULT 1 |
| RESULT 2 |
| ⋮ |
| RESULT m |

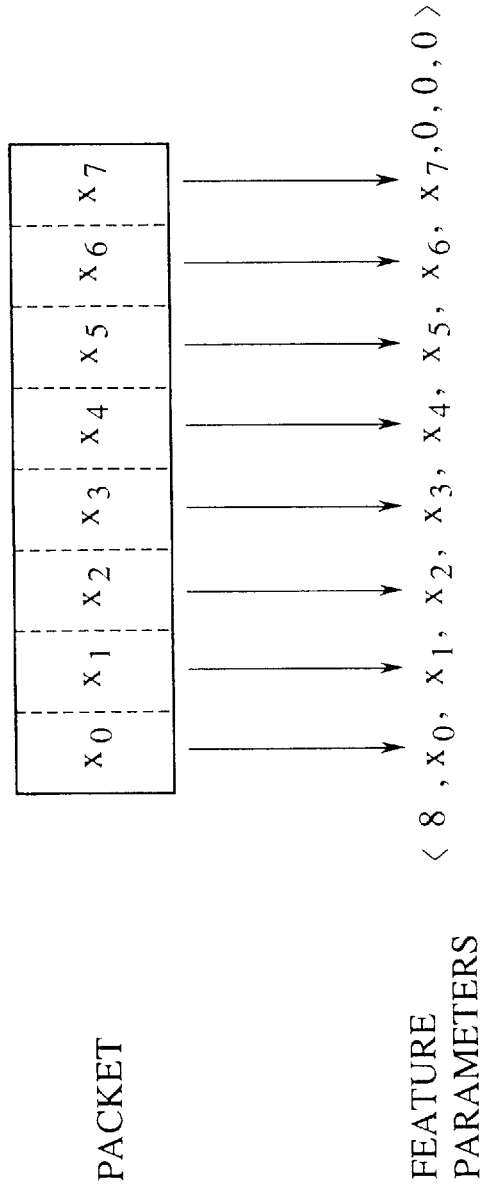

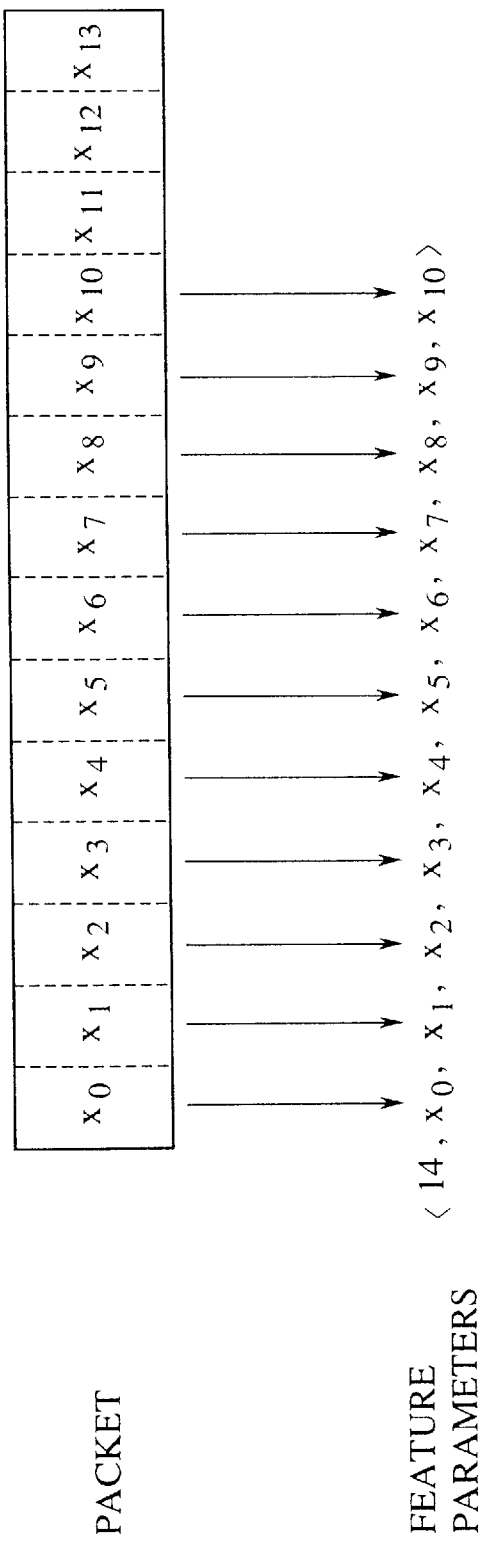

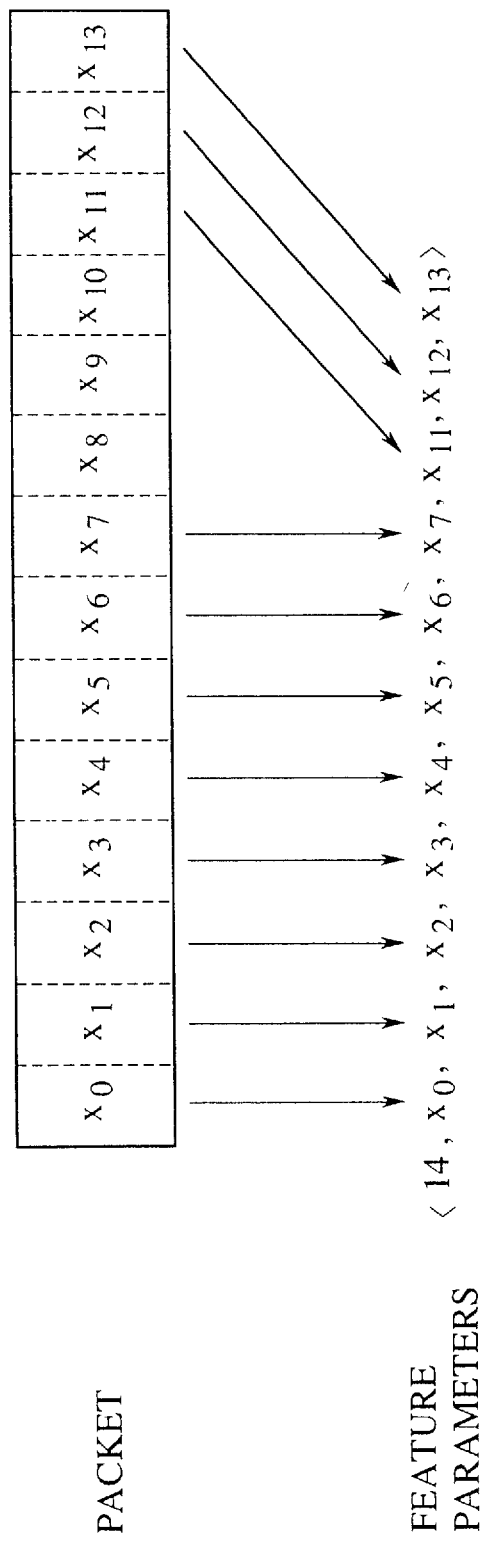

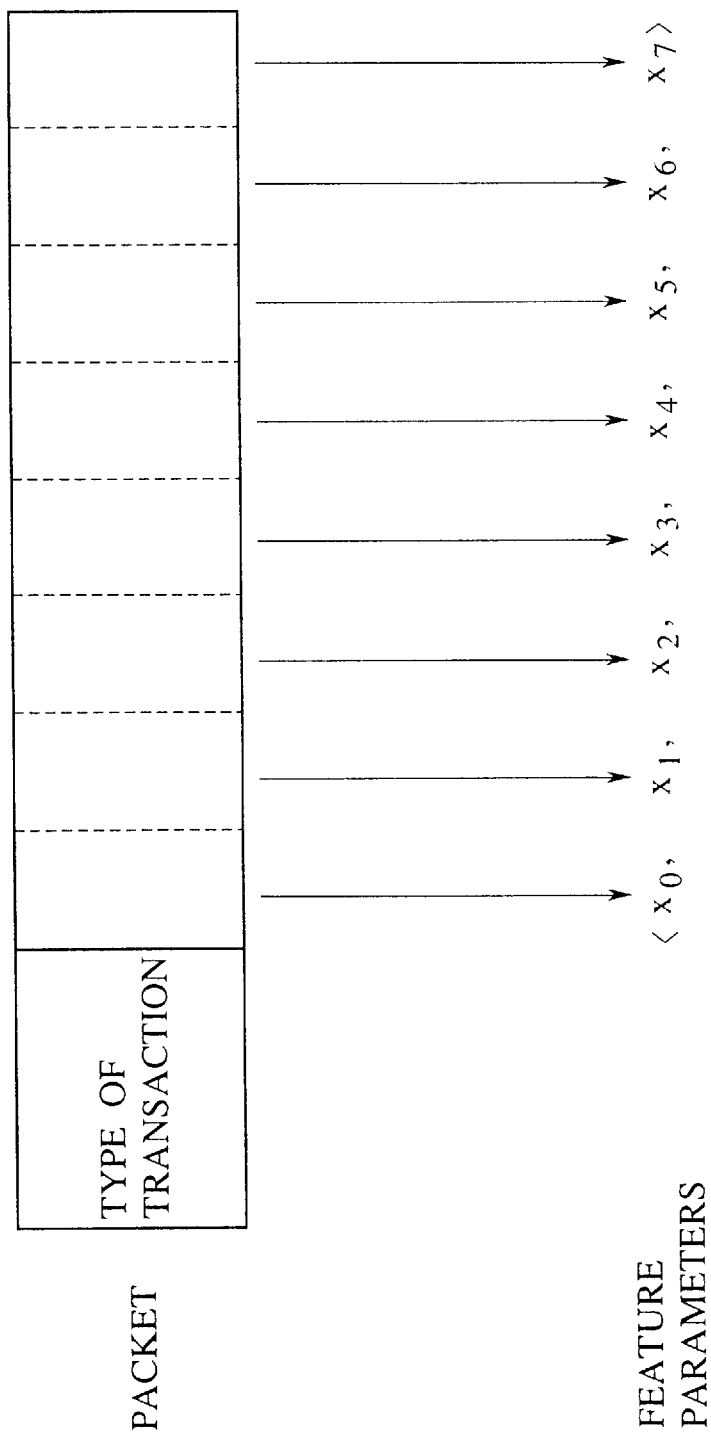

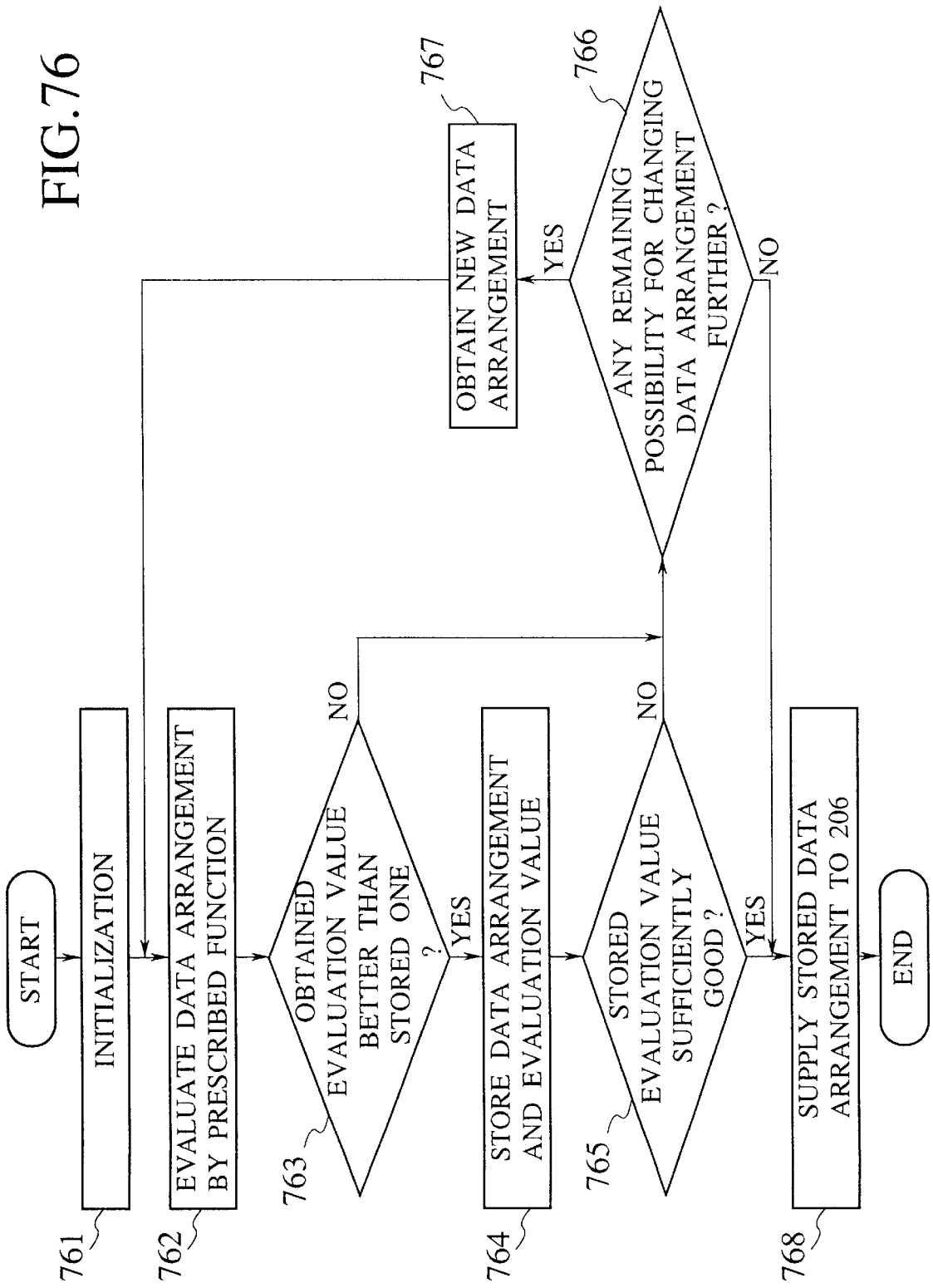

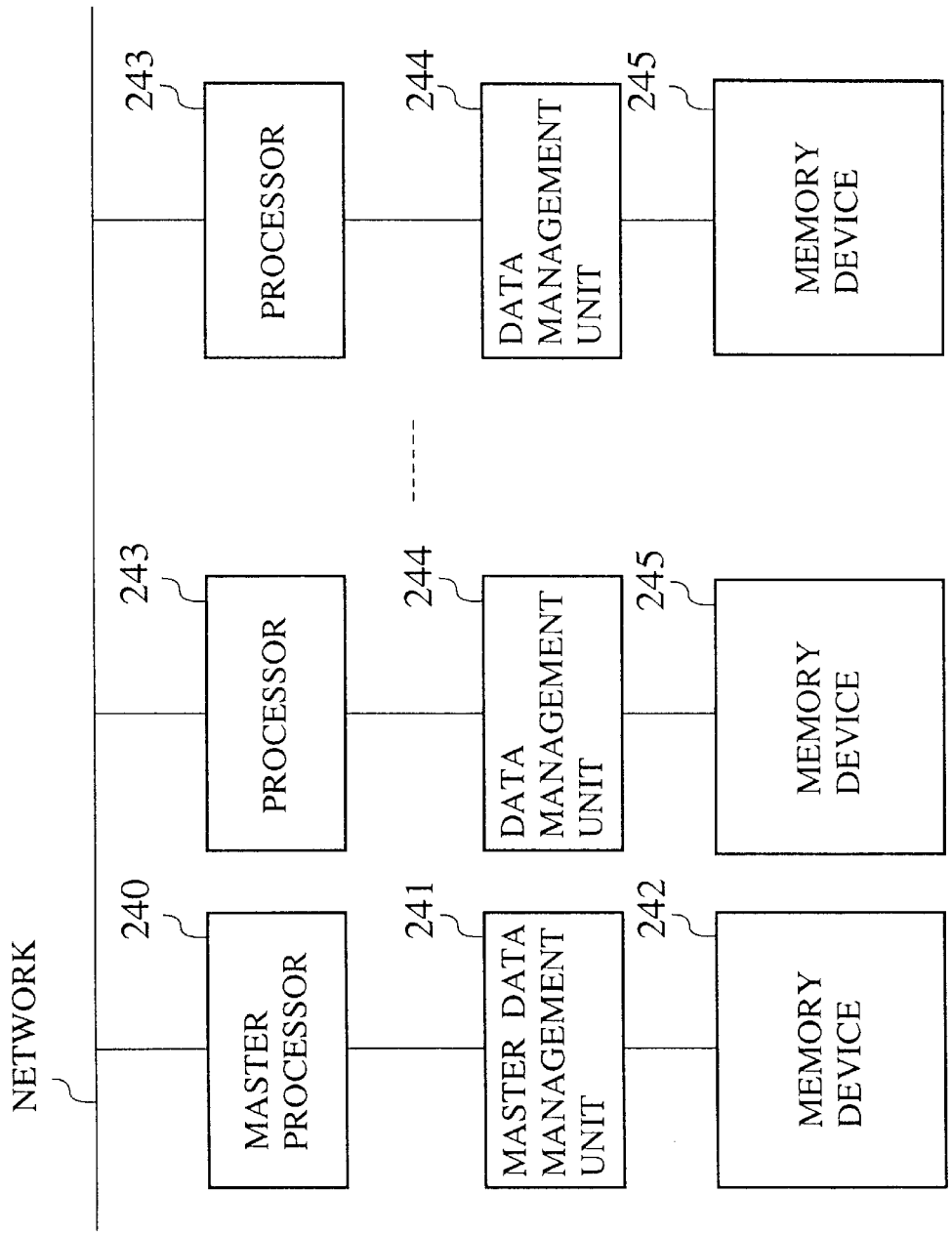

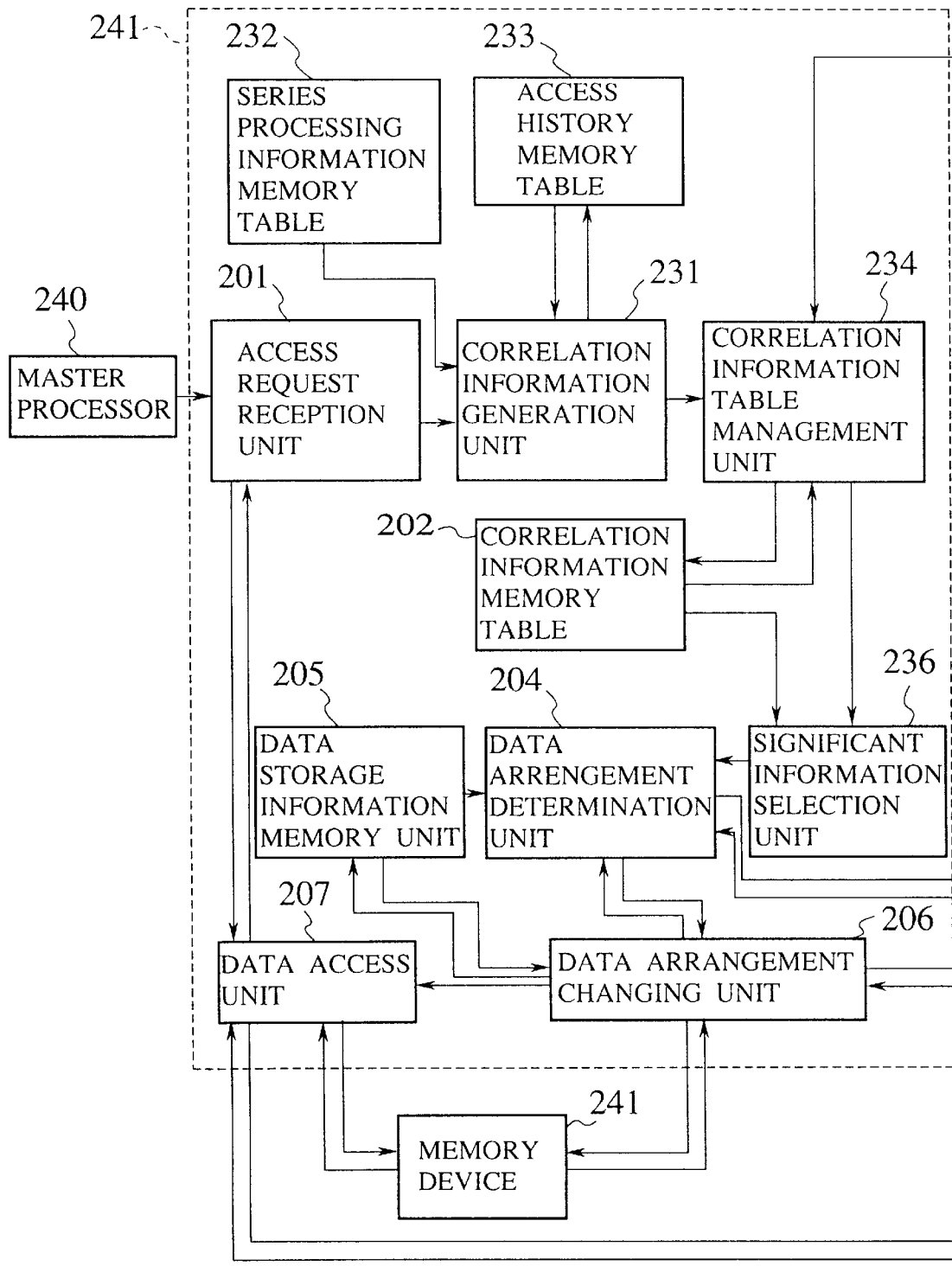

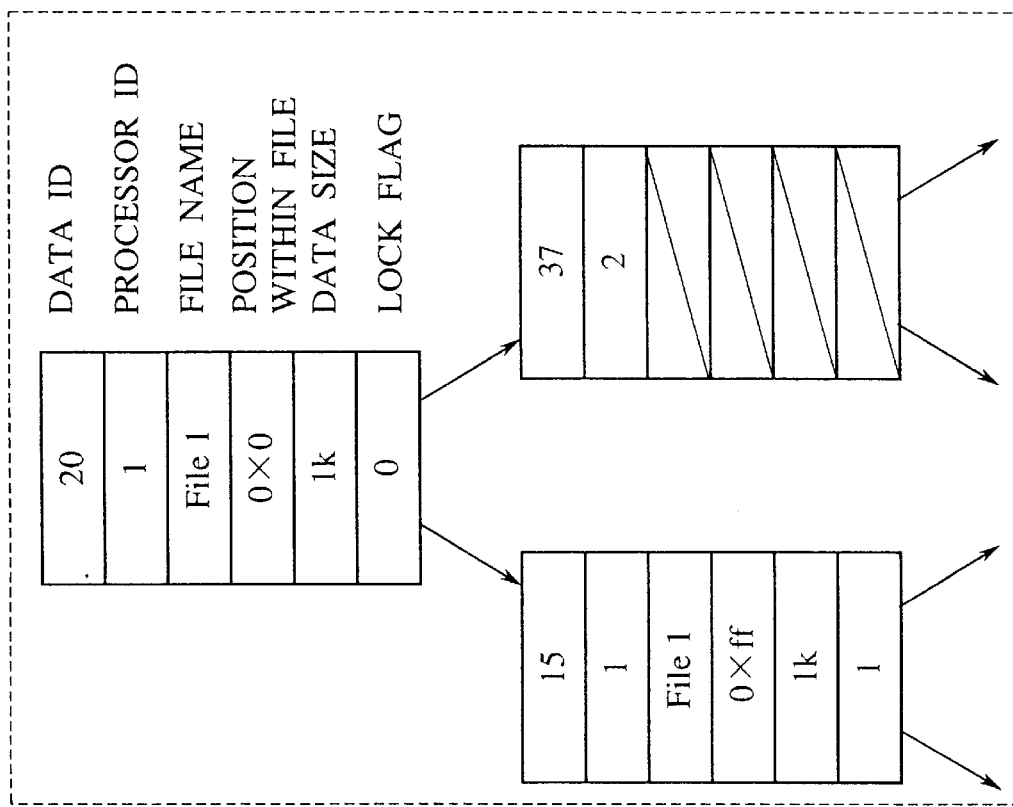

| PROCESS ID | STARTING LIBRARY | ENDING LIBRARY | PARAMETER |
|---|---|---|---|
| 10 | begin | commit | none |
| 20 | begin | commit | 1 |
| 20 | begin | commit | 2 |
| ... | ... | ... | ... |

FIG.80A

| STARTING LIBRARY | ENDING LIBRARY |
|---|---|
| init | commit |

| DATA ID 1 | DATA ID 2 | NUMBER OF ACCESSES |
|---|---|---|
| 29 | 37 | 3985 |
| 21 | 266 | 1980 |
| 4 | 30 | 306 |
| 109 | 300 | 231 |
| 3099 | 4396 | 129 |
| ⋮ | ⋮ | ⋮ |

202

TRANSACTION ROUTING IN A MULTIPLE PROCESSOR SYSTEM USING AN EXTRACTED TRANSACTION FEATURE PARAMETER AND TRANSACTION HISTORICAL DATA

This application is a Continuation of application Ser. No. 08/300,554, filed on Sep. 6, 1994, now abandoned.

BACKGROUND OF THE INVENTION

1. Field of the Invention

The present invention relates to a transaction processing system using multiple processors, and more particularly, to schemes for transaction routing and data management in such a multiple processor transaction processing system.

2. Description of the Background Art

The transaction processing system for executing some kind of processing for the transactions received from the transaction sources such as a plurality of terminals, computers, and automatic teller machines which are coupled to the transaction processing system through communication paths is widely utilized today. Such a transaction processing system has been constituted by a single general purpose computer, but it has become necessary to constitute the transaction processing system from a plurality of processors in a case the higher processing power is required such as a case of handling a large amount transactions simultaneously, so as to share the load of processing a plurality of transactions among a plurality of transaction processors.

This multiple processor transaction processing system can take either a data non-sharing type configuration as shown in FIG. 1 or a data sharing type configuration as shown in FIG. 2. In either one of these configuration, a plurality of transaction processors 6'-1 to 6'-m having application programs 7'-1 to 7'-m and data management units 8'-1 to 8'-m, respectively, are coupled together by a coupling device 5' connected with a front-end processor 3' having a transaction routing unit 4'. This transaction routing unit 4' is connected with a number of transaction sources 1'-1 to 1'-n through a communication path 2' such that the transactions received from the transaction sources 1'-1 to 1'-n through the communication path 2' are routed through the coupling device 5' to the transaction processors 6'-1 to 6'-m distributedly.

In a case of the data non-sharing type configuration of FIG. 1, the transaction processors 6'-1 to 6'-m are associated with local data memory units 9'-1 to 9'-m, respectively, in which the data for each transaction processor 6' are separately stored in each local data memory unit 9', so that the data management unit 8' of each transaction processor 6' can make accesses only to the data in the corresponding data memory unit 9' connected with this transaction processor 6'. On the other hand, in a case of the data sharing type configuration of FIG. 2, all the transaction processors 6'-1 to 6'-m are associated with a common data memory unit 9A, so that the data management unit 8' of each transaction processor 6' can make accesses to any data in this common data memory unit 9A.

In the multiple processor transaction processing system of the data non-sharing type, the data in files or databases to be processed can be managed by being distributed among a plurality of processors. For this reason, a received transaction can be processed in shortest time with lowest load by processing this transaction at a processor on which the data required in processing this transaction are present. In other words, when this transaction is received at the processor which does not have the data required in processing this transaction, it is necessary to transfer the processing to the other processor which manages the relevant data or to transfer the data from the other processor which manages the relevant data, so that the required time and the load for processing this transaction are going to be increased.

Consequently, in order to improve the processing power of the multiple processor transaction processing system as a whole, it is necessary to provide the routing of each transaction to the optimum processor which can make access to the data required in processing each transaction at the lowest cost, which is furnished by the transaction routing unit 4' in the front-end processor 3' in the configuration of FIG. 1.

Here, however, the conventionally known transaction routing scheme includes a scheme for routing the transactions according to the prescribed order by using the prescribed correspondence table which indicates which transaction should be routed to which transaction processor, and a scheme for providing additional means for checking the loading state of each transaction processor and routing each transaction to the transaction processor which is judged as being less loaded by this additional means in the random order, and both of these conventional schemes totally irrespective of the content of each transaction so that it has been difficult to take a full advantage of the available processing power of the system effectively.

In addition, in a case of the data non-sharing type configuration of FIG. 1 using a plurality of data memory devices 9', the transaction processing system can have a plurality of data storage regions and data management units for distributedly storing and managing the data in these plurality of data storage regions, and a plurality of accesses to the data in a plurality of data storage regions can be made in processing each transaction. In such a case, the time required in processing each transaction can be shortened if all the data required in processing each transaction are present in the same data storage region. In other words, in a case a plurality of data required in processing each transaction are not present in the same data storage region, even if they are stored in the different data storage regions within the same data memory device, an extra time is required for the data accesses for reading and writing of the data compared with a case in which all these data are present in the same data storage region.

Also, when a plurality of data are present in the different data storage regions on different data memory devices, the access time is further increased as it becomes necessary to request the data management unit managing the relevant data memory device to read out or transfer the data, and this in turn further increases the processing time for each transaction.

On the other hand, in a case it is possible to make accesses to a plurality of data storage regions simultaneously, the transaction processing power of the system as a whole can be improved by equalizing the access frequency with respect to each data storage region as much as possible, i.e., by loading the data memory devices as uniformly as possible. Consequently, in order to shorten the processing time for each transaction while taking a full advantage of the transaction processing power of the system as a whole, it is preferable to arrange the data such that the data necessary for each transaction are available within the same data storage region as much as possible and the access frequency with respect to each data storage region is equalized as much as possible.

Conventionally, the data arrangement in the data storage regions has been specified explicitly by a system manager.

Namely, the system manager has been required to decide which data should be arranged in which data storage regions in order to take a better advantage of the system power according to the result of analysis of the data accessed by each transaction, the frequency of occurrences of each transaction, and the loading state of each data memory device to determine whether the available system power is currently utilized sufficiently or not, and if not, the cause in terms of the data arrangement which prevents the sufficient utilization of the available system power. Then, the system manager has been required to explicitly specify the correspondence between each data and the data storage region for storing each data to the data management units in order to realize the decided new data arrangement. As for those data for which the correspondence between the data and the data storage region for storing the data is not given, the data are arranged in the arbitrary memory devices by the system itself.

However, in order to analyze what kinds of data accesses are going to be made by a transaction, there is a need to analyze the source codes, but it has been quite difficult to analyze the source codes for all the transactions to be processed in the transaction processing system. Moreover, even if the source codes are analyzed somehow, some data access targets would not be apparent in cases the branching occurs or the data access target is determined according to the factors dynamically determined at a time of the transaction processing. Therefore, even when the new data arrangement is obtained to satisfy the above described requirement according to the result of analysis of the source codes, it is unlikely to be able to take a sufficient advantage of the available system power by such a data arrangement.

Furthermore, whenever a new transaction is added to the system, or the frequency of occurrences of the transaction to be processed on the system changes, it has been necessary to carry out the analysis again. Thus, this manner of changing the data arrangement requires an enormous amount of efforts. In addition, in this simple-minded scheme, the data are arbitrarily arranged once without the analysis, and then, by measuring the individual data and the loads of the data memory devices, the data are rearranged simply to make the difference in the loads of the data memory devices as small as possible, so that there is no consideration given to which sets of data are required by the same transaction processed on the system, and consequently it is unlikely to be able to take a sufficient advantage of the available system power in this regard as well.

On the other hand, instead of the scheme for rearranging the data after the arbitrary arrangement of the data to make the difference in the loads as small as possible, there are several propositions for a scheme for arranging the data according to prescribed rules so as not to make any difference in the loads from the beginning, without requiring the analysis. Examples of this type of data arrangement scheme includes a scheme for arranging the data randomly with respect to the data storage regions using the hash function, a scheme for dividing the range of values taken by the data into as many groups as a number of data storage regions and allocating each group to each data storage region, and a scheme for dividing the range of values taken by the data into a prescribed number of groups and allocating the groups to the data storage regions in the manner of round robin.

These schemes are all of the type which attempts to avoid the concentration of the loads to a particular data memory device probabilistically, so that there are cases in which they can be successful, but they do not guarantee the avoidance of the concentration of the loads for any system configuration and any frequency of occurrences of the transactions. Moreover, in this type of scheme, the data required for each transaction to be processed on the system are going to be arranged randomly, so that the processing time for each transaction can be longer not just when the concentration of the loads occurs but also when the concentration of the loads is avoided, and consequently it is unlikely to be able to take a sufficient advantage of the available system power in this regard as well.

Thus, in the conventional data management scheme, the analysis necessary for taking the sufficient advantage of the available system power has been quite difficult, and furthermore, the incompleteness of the analysis made it unlikely to be able to take the sufficient advantage of the available system power.

As described, in the multiple processor transaction processing system, in order to carry out the processing of the transaction efficiently by using a plurality of transaction processors, it is necessary to route each transaction to the transaction processor for which the cost for processing this transaction is low, and in addition when a plurality of data memory devices are used, it is also necessary to arrange the data distributedly among a plurality of data memory devices.

Conventionally, it has been a role of the system manager to analyze which data are going to be accessed by the application program executed in the system and determine the schemes for distributed data arrangement and the transaction routing appropriately, such that the transactions can be processed in parallel as much as possible, the data necessary for the processing of each transaction are present at the transaction processor for processing this transaction as much as possible, and the cost required for processing each transaction becomes as small as possible in view of the data arrangement and the frequency of occurrences of each transaction. However, in determining either one of the distributed data arrangement scheme and the transaction routing scheme, it is still necessary to analyze the dynamic characteristic of the system as a whole in order to take the full advantage of the available system power, but this analysis has been quite difficult.

Even when the transaction routing is dynamically determined somehow, if the data arrangement is fixed, it is impossible to route each transaction such that all the data required for this transaction are always present in the routed transaction processor, so that it is unlikely to take the full advantage of the available system power. To this end, in the conventional transaction processing system, it has been necessary for the system manager to make the rearrangement of the data in view of the newly determined transaction routing scheme, but this system management operation can be quite tedious.

Also, even when the data arrangement is changed according to the dynamic characteristic of the data accesses somehow, if the transaction routing is predetermined, all the data required for each transaction are not necessarily always present in the routed transaction processor as the data arrangement is no longer the same as that used in the transaction routing, so that it is still unlikely to take the full advantage of the available system power. To this end, in the conventional transaction processing system, it has also been necessary for the system manager to make the routing of the transactions in view of the newly determined data arrangement scheme and the frequency of occurrences of the transactions, but this system management operation can be quite tedious.

SUMMARY OF THE INVENTION

It is therefore an object of the present invention to provide a scheme for controlling the transaction processing system to take a full advantage of the available system power easily and the management and the tuning of the system can be carried out automatically.

It is another object of the present invention to provide a scheme for automatic transaction routing capable of taking a full advantage of the available processing power of the multiple processor transaction processing system, dealing with changes in a number of processors constituting the system or a data arrangement in the system, and balancing loads among a plurality of processors by reflecting the dynamic load distribution state in the transaction routing procedure.

It is another object of the present invention to provide a scheme for data management in the transaction processing system, capable of taking a full advantage of the available processing power of the multiple processor transaction processing system, by automatically producing and analyzing the data necessary in determining the data arrangement.

According to one aspect of the present invention there is provided a multiple processor transaction processing system, comprising: at least one transaction source means for generating transactions to be processed; a plurality of transaction processors for processing the transactions generated by the transaction source means; at least one transaction routing means for routing each transaction generated by the transaction source means to one of the transaction processors; at least one data memory means connected with at least one of the transaction processors for storing data to be used in processing the transactions by the transaction processors; and data arrangement means for determining data arrangement of the data stored in the data memory means.

According to another aspect of the present invention there is provided a transaction routing apparatus for routing transactions from at least one transaction source to one of a plurality of transaction processors for processing the transactions, comprising: means for extracting feature parameters from each transaction; means for storing processing history information for past transactions; and means for routing each transaction to one of the transaction processors according to the feature parameters extracted by the extracting means and the processing history information stored by the storing means.

According to another aspect of the present invention there is provided an apparatus for managing data to be stored in a plurality of data storage regions, comprising: means for receiving access requests for making accesses to the data from at least one processor; means for producing a correlation information indicating all sets of data which are accessed together in each series processing carried out by the processor according to the access requests received by the receiving means; and means for determining a new data arrangement of the data in the data storage regions according to a data storage information indicating original arrangement of the data in the data storage regions and the correlation information produced by the producing means.

According to another aspect of the present invention there is provided a method of operating a multiple processor transaction processing system, comprising: receiving transactions to be processed from at least one transaction source; routing each transaction received at the receiving step to one of a plurality of transaction processors; determining data arrangement of data to be used in processing the transactions by the transaction processors in at least one data memory connected with at least one of the transaction processors; storing the data in the data arrangement determined at the determining step; and processing each transaction by said one of the transaction processors to which each transaction is routed at the routing step, by using the data stored at the storing step.

According to another aspect of the present invention there is provided a method for routing transactions from at least one transaction source to one of a plurality of transaction processors for processing the transactions, comprising the steps of: extracting feature parameters from each transaction; obtaining processing history information for past transactions; and routing each transaction to one of the transaction processors according to the feature parameters extracted at the extracting step and the processing history information obtained at the obtaining step.

According to another aspect of the present invention there is provided a method for managing data to be stored in a plurality of data storage regions, comprising the steps of: receiving access requests for making accesses to the data from at least one processor; producing a correlation information indicating all sets of data which are accessed together in each series processing carried out by the processor according to the access requests received at the receiving step; and determining a new data arrangement of the data in the data storage regions according to a data storage information indicating original arrangement of the data in the data storage regions and the correlation information produced at the producing step.

Other features and advantages of the present invention will become apparent from the following description taken in conjunction with the accompanying drawings.

BRIEF DESCRIPTION OF THE DRAWINGS

FIG. 12 is a block diagram of a modified configuration of the transaction routing unit of FIG. 11.

FIG. 13 is a schematic block diagram of one possible system configuration for the second embodiment of the present invention.

FIG. 14 is a schematic block diagram of another possible system configuration for the second embodiment of the present invention.

FIG. 15 is a schematic block diagram of another possible system configuration for the second embodiment of the present invention.

FIG. 20 is a schematic block diagram of another possible system configuration for the second embodiment of the present invention.

FIG. 21 is a schematic block diagram of another possible system configuration for the second embodiment of the present invention.

FIG. 37 is a flow chart for the operation of a feature parameter extraction unit in the transaction routing unit of FIG. 27.

FIG. 45A is a diagrammatic illustration of the transaction packet used in a modification of the transaction routing scheme of the second embodiment of the present invention.

FIG. 45B is a diagrammatic illustration of the processing result used in a modification of the transaction routing scheme of the second embodiment of the present invention.

FIG. 54 is a diagrammatic illustration showing another possible manner of obtaining featura parameters from a packet of unknown structure.

FIG. 55 is a diagrammatic illustration showing another possible manner of obtaining feature parameters from a packet of unknown structure.

FIG. 56 is a diagrammatic illustration showing another possible manner of obtaining feature parameters from a packet of unknown structure.

FIG. 58 is a diagrammatic illustration showing one possible form of the packets that can be handled by the second embodiment of the present invention.

FIG. 76 is a flow chart for the operation of a data arrangement determination unit in the data management unit of FIG. 59.

FIG. 77 is a schematic block diagram of one possible system configuration for the third embodiment of the present invention in a case of an application to an index sequential files.

FIG. 78, 78A, 78B are block diagrams of data management units in the system configuration of FIG. 77.

FIGS. 79A and 79B are diagrammatic illustrations of an index and a disk capacity table used in a data storage information memory unit in the data management units of FIG. 78.

FIGS. 80A and 80B are diagrammatic illustrations of series processing and defalut processing defined by the series processing information memory table in the data management units of FIG. 78.

FIG. 84 is a diagrammatic illustration of a correlation information memory table in the data managemenet units of FIG. 78.

DETAILED DESCRIPTION OF THE PREFERRED EMBODIMENTS

Figure 1:
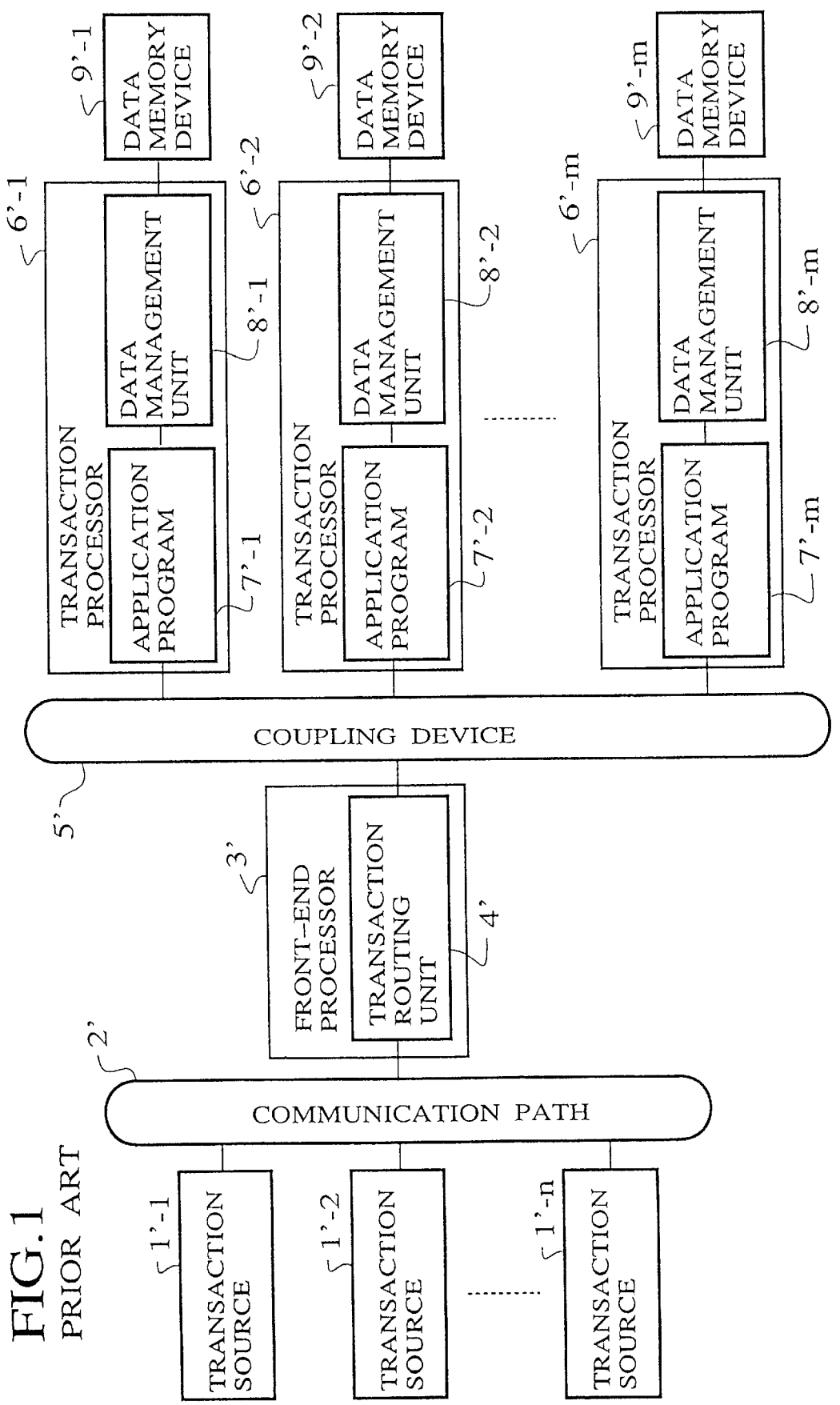
FIG. 1 is a schematic block diagram of one exmaple of a conventional transaction processing system.
Figure 2:
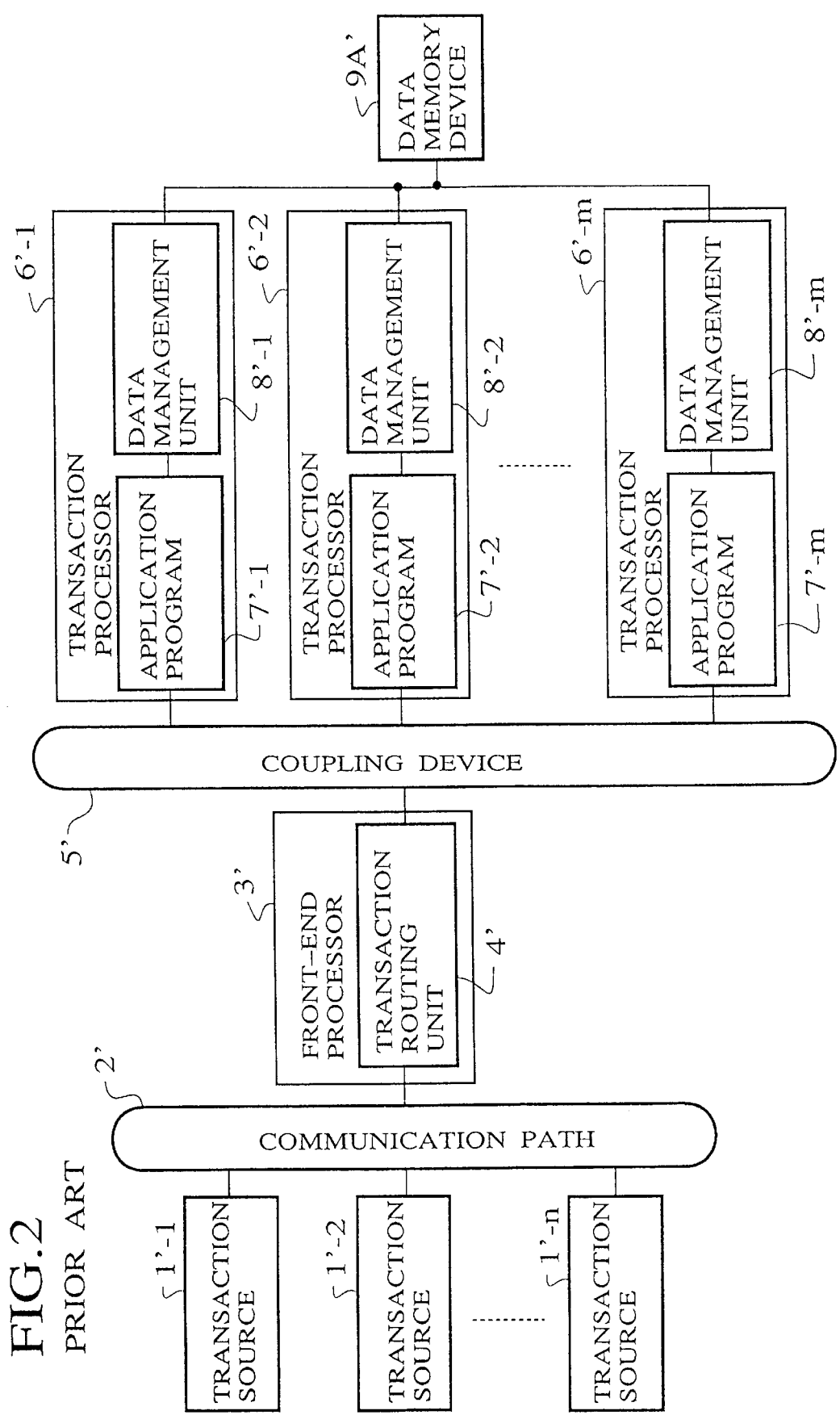
FIG. 2 is a schematic block diagram of another example of a conventional transaction processing system.
Figure 3:
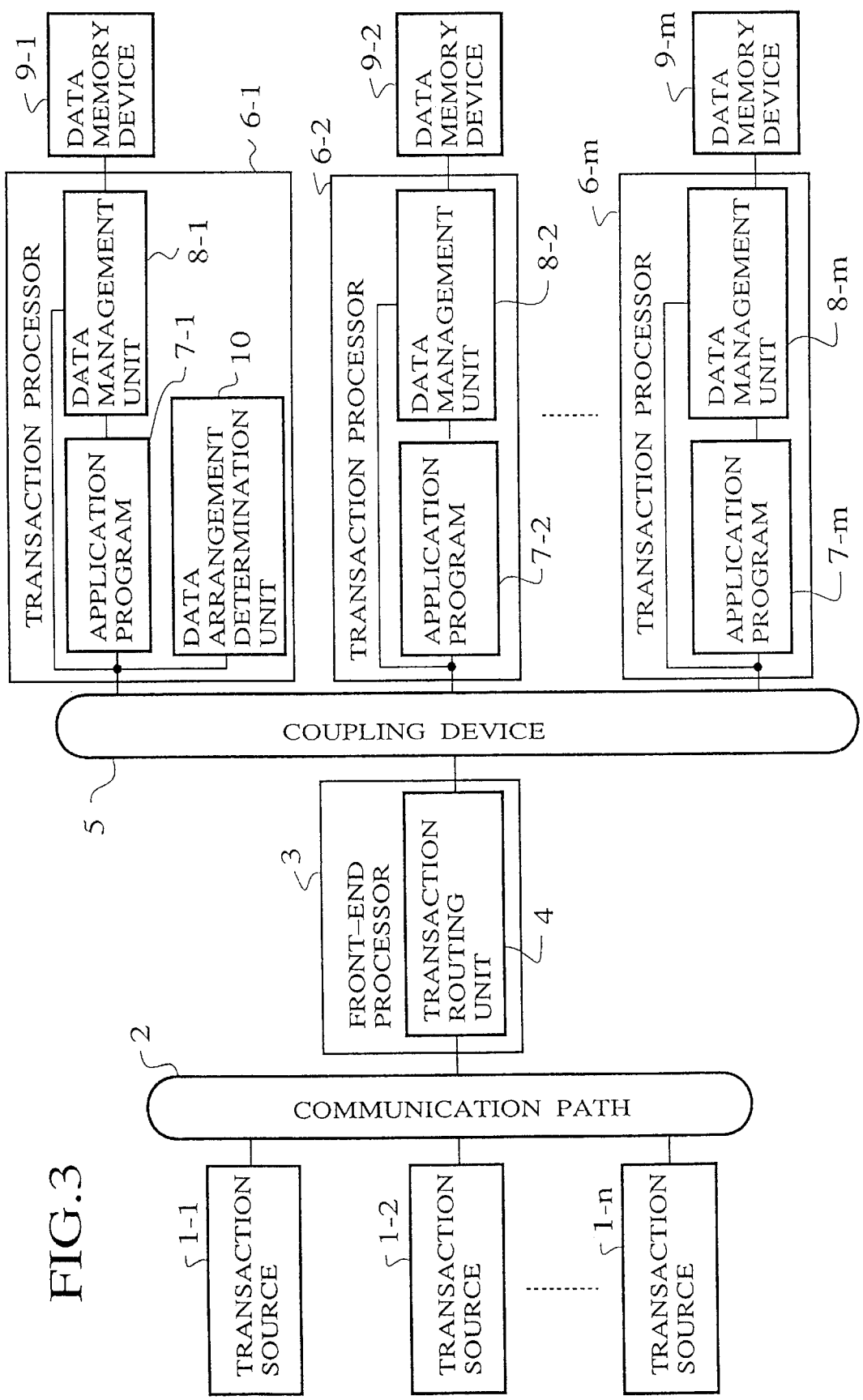
FIG. 3 is a schematic block diagram of a first embodiment of a multiple processor transaction processing system according to the present invention.

Referring now to FIG. 3, the first embodiment of the multiple processor transaction processing system according to the present invention will be described.

In this first embodiment, the system comprises a plurality of transaction processors 6-1 to 6-m having application programs 7-1 to 7-m for processing transactions and data management units 8-1 to 8-m for managing the data necessary for executing the application programs 7-1 to 7-m, respectively, a plurality of data memory devices 9-1 to 9-m connected with the transaction processors 6-1 to 6-m for storing the data distributedly, at least one front-end processor 3 having a transaction routing unit 4 which is connected with a number of transaction sources 1-1 to 1-n which generates the transactions through a communication path 2, and a coupling device 5 for coupling the front-end processor 3 with the transaction processors 6-1 to 6-m. Here, it suffices to provide at least one data memory device 9, and each data memory device 9 may be connected with all or some of the transaction processors 6-1 to 6-m.

In this configuration of FIG. 3, it is possible to realize the high performance transaction processing system using parallel processing by a plurality of transaction processors 6-1 to 6-m, while distributing the loads of a number of transactions among a plurality of transaction processors so as to be able to cope with the high load transaction processing.

The transaction routing unit 4 provided in the front-end processor 3 receives each transaction generated by any of the transaction sources 1-1 to 1-n through the communication path 2, and routes this transaction selectively to one of the transaction processors 6-1 to 6-m which has the application program 7 appropriate for processing this transaction.

In addition, one of the transaction processors 6-1 to 6-m (transaction processor 6-1 in FIG. 3) has a data arrangement determination unit 10 which receives the information concerning the data accesses from the data management unit 8 of each transaction processor 6, calculates the optimum data arrangement according to this information, and commands the change of the data arrangement to each transaction processor 6. It is to be noted that this data arrangement determination unit 10 may be provided in any one or more of the front-end processor 3, the transaction processors 6, and additional processors which are neither the front-end processors nor the transaction processors.

Moreover, the data management units 8 of all the transaction processors 6 and the data arrangement determination unit 10 are capable of directly communicating through the coupling device 5. Then, when the operation target data is not present on the data memory device connected to the transaction processor of this data management unit, the data management unit requests the data operation to the data management unit of the transaction processor which has the relevant data, whereas when the operation target data is present on the data memory device connected to the transaction processor of this data management unit, the data operation is carried out locally, such that all the data are transparently accessible from any application program on any transaction processor.

In a case of using a plurality of data memory devices 9-1 to 9-m, the data are distributedly stored among the data memory devices 9-1 to 9-m. Here, in order to distribute the data, the data may be classified by using keys for example and the classified data may be stored separately on different data memory devices 9-1 to 9-m.

In arranging the data distributedly among the data memory devices 9, the data may be arranged by being divided up without any overlap, or the data may be arranged such that copies of a part or a whole of the data are provided redundantly and stored in the data memory devices different from the data memory devices storing the originals, so as to improve the anti-obstruction property.

Each data memory device 9 can be formed by any of various known memory devices such as a hard disk, a semiconductor memory, a magnetic tape, floppy disk, CD-ROM, and MO (Magneto-Optical).

Now, this transaction processing system of the first embodiment operates as follows.

The transaction is transmitted from the transaction source 1 to the transaction routing unit 4 on the front-end processor 3 through the communication path 2, and then the transaction routing unit 4 routes the transaction selectively to the optimum transaction processor for processing this transaction.

Here, the optimum transaction processor for processing this transaction is the transaction processor which can process this transaction at the lowest cost, where the cost can be indicated by the time required in processing this transaction. The cost may be indicated by the other quantity such as a number of communications required in processing this transaction for example.

The scheme for selecting the optimum transaction processor for processing the transaction can be provided by the transaction routing scheme described in detail below as the second embodiment of the present invention. In short, in this transaction routing scheme, the processing history indicating how much cost had been required in the past when which transaction was processed by which transaction processor is stored for each transaction, and whenever a new transaction arrives, the processing history is looked up to determine which transaction processor can process this transaction at the lowest cost. Usually, the routing of the transaction to the transaction processor which has the data necessary for processing this transaction requires the lowest cost.

In this transaction routing scheme, the optimum transaction processor is selected according to the past processing history, so that this is the probabilistic approach which does not necessarily guarantee the selection of the truly optimum transaction processor. Here, however, the system of FIG. 3 has a configuration in which all the data are transparently accessible from any application program on any transaction processor, so that the use of the probabilistic transaction routing scheme does not cause the failure to process each transaction even when the routed transaction processor is not truly optimum one.

In a case it is possible to select the optimum transaction processor by the deterministic algorithm according to which data is present in which data memory device of which transaction processor, it is also possible to implement such a deterministic algorithm as a program in the transaction routing unit.

The transaction routed to the transaction processor is then processed by the application program provided on this transaction processor. Here, because the system of FIG. 3 has a configuration in which all the data are transparently accessible from any application program on any transaction processor, the same application program may be provided in all the transaction processors. Consequently, it is possible in this first embodiment to realize the parallel processing while utilizing the application programs developed on the conventional single processor transaction processing system without any change.

The data management unit receives the data operation request for the data required in executing the application program from the application program, and carries out the requested data operation. Here, when the operation target data is not present on the data memory device connected to the transaction processor of this data management unit, the data management unit requests the data operation to the data management unit of the transaction processor which has the relevant data. On the other hand, when the operation target data is present on the data memory device connected to the transaction processor of this data management unit, the data operation is carried out locally. In this data operation, the operation target data is usually specified by the key. Consequently, by providing a table recording which transaction processor has each data when the value of the specified key is within which range, it is possible to judge whether the data operation is to be carried out locally or to be requested to the data management unit of the other transaction processor. Here, the scheme for carrying out the data operation can be provided by the known data access scheme.

Now, because of the use of the probabilistic transaction routing scheme, the processing time of each transaction may vary depending on the data arrangement, and the load balance among the transaction processors may be unstable. For this reason, the data arrangement determination unit acquires statistical information concerning an access to which data is involved in the processing of which transaction, and the frequency of this access from the data management unit of each transaction processor. Then, the data arrangement determination unit obtains the optimum data arrangement by considering what arrangement of the data can make the loads on the transaction processors balanced and the cost required for processing each transaction can be lowered, according to the statistical information acquired from the data management units. The scheme for determining the data arrangement can be provided by the data arrangement scheme described in detail below as the third embodiment of the present invention.

Then, based on this determination, the data management units are commanded to move the managed data to realize the optimum data arrangement. Here, the moving of the data can be carried out by commanding the data management unit of each transaction processor from the data arrangement determination unit, or by manually according to the new data arrangement obtained by the data arrangement determination unit.

The timings for the data arrangement determination unit to carry out the rearrangement of the data by determining the optimum data arrangement can be any one of the timings specified to the data arrangement determination unit by the operator, or prescribed timings with prescribed intervals, or the timings at which the prescribed amount of the statistical information are acquired, or the timings at which the bias in the number of data accesses made by the transaction processors becomes recognizable from the statistical information, or the timings at which the bias in the load information for the transaction processors arises, or the timings specified by the transaction routing unit when the bias in the routed transaction processors arises.

By this automatic optimum data arrangement by the data arrangement determination unit, the data arrangement can be optimized by following the change of the dynamic characteristics of the system as a whole such as the change of the data to be accessed by each transaction and the change of the frequency of occurrences of each transaction.

Moreover, in accordance with this optimized data arrangement, the transaction routing unit can route each transaction to the optimum transaction processor for processing each transaction, so that by means of the feedback loop relationship between the transaction routing operation according to the data arrangement and the data rearrangement operation, the loads of the transaction processing can be balanced automatically while achieving the optimization in terms of the costs as well, without requiring the new data arrangement or the transaction routing scheme based on this new data arrangement to be specified every time the data arrangement is change. As a consequence, the tuning of the transaction processing system as a whole can also be made automatic, and the system management can be simplified.

Moreover, even in a case the optimum transaction routing strategy is not apparent at the transaction routing unit or a case the optimum distributed data arrangement is not apparent at the data arrangement determination unit, by distributedly arranging the data in an arbitrary manner, it can be guaranteed to be operable as the transaction processing system even though there are some possibilities for the load balancing of the transaction processing to be unsuccessful.

Figure 4:
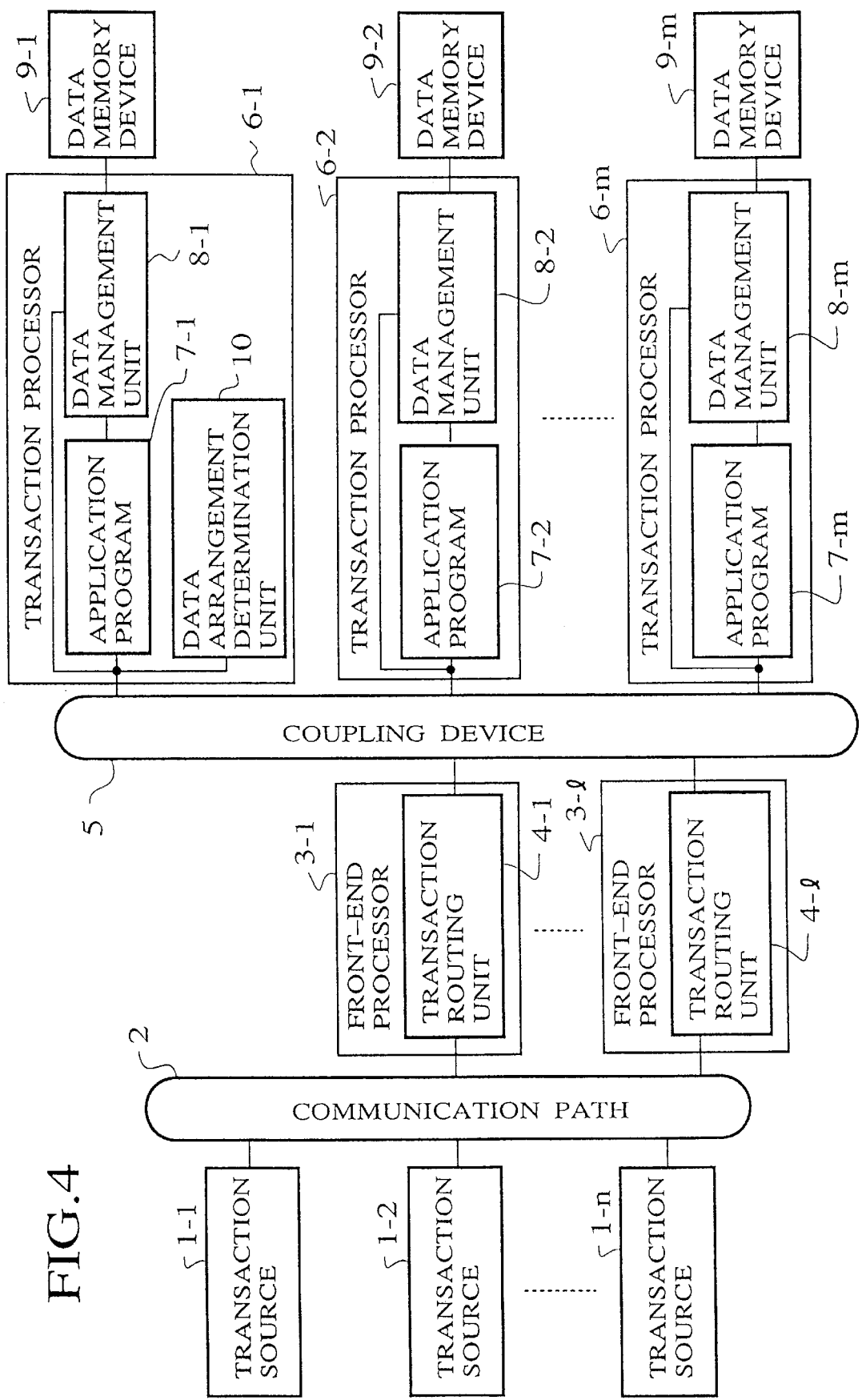
FIG. 4 is a schematic block diagram of one possible modified configuration for the system of FIG. 3.

It is possible to modify the configuration of FIG. 3 as shown in FIG. 4, in which a plurality of front-end processors 3-1 to 3-l are provided instead of just one in FIG. 3. By providing a plurality of front-end processors 3-1 to 3-l between the communication path 2 and the coupling device 5, it becomes possible to replace the disabled or malfunctioning front-end processor by the other front-end processor, so that the anti-obstruction property can be improved. Also, in a case the processing power required for the transaction routing operation cannot be obtained by just one front-end processor, the load of the transaction routing operation can be distributed over a plurality of the front-end processors. Moreover, the different front-end processors may be connected with different communication paths.

It is to be noted that this transaction processing system of the first embodiment is equally applicable to the on-line transaction processing as well as to the other on-line processing.

Figure 5:
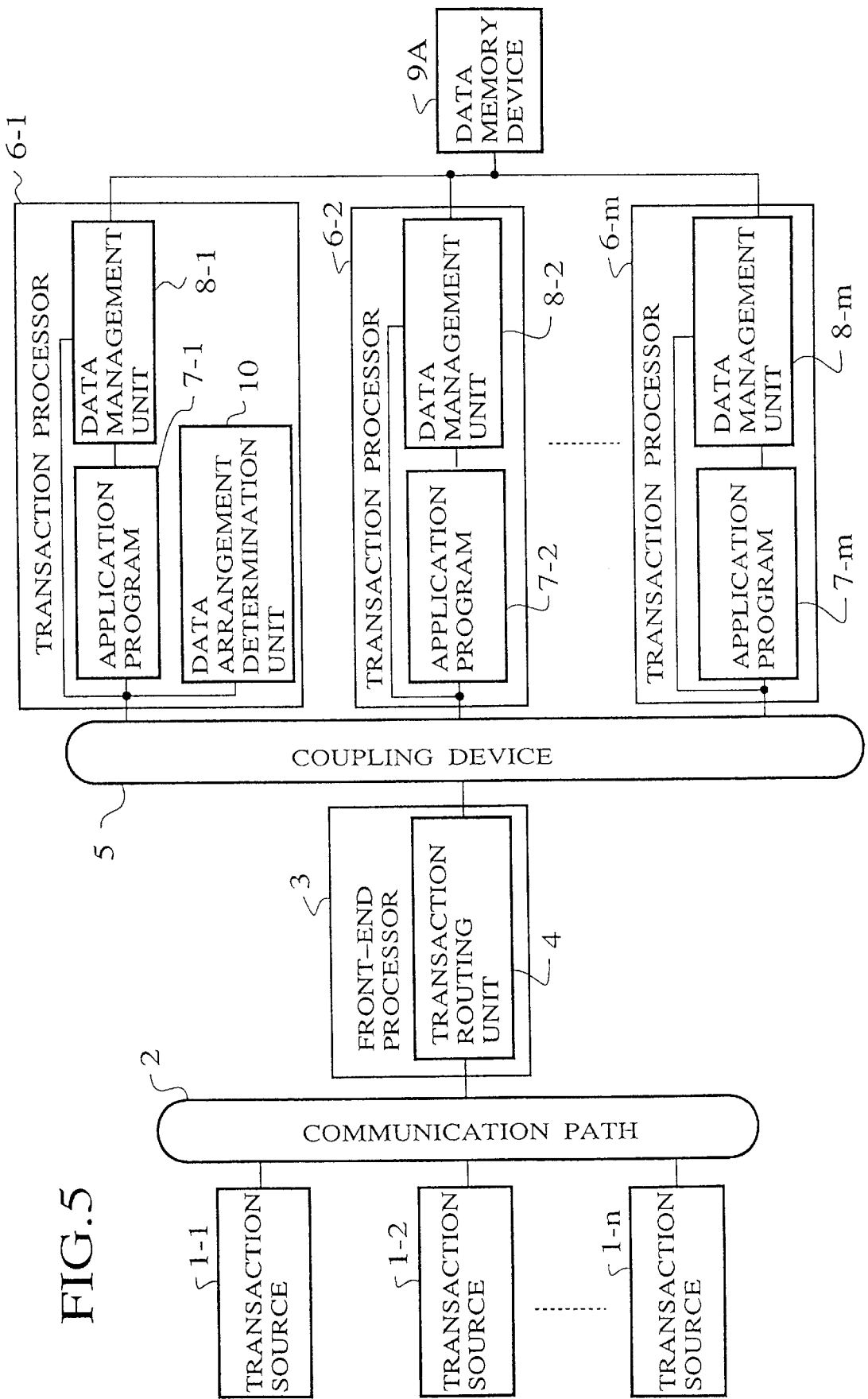
FIG. 5 is a schematic block diagram of another possible modified configuration for the system of FIG. 3.

It is also possible to modify the configuration of FIG. 3 as shown in FIG. 5, in which only one data memory device 9A is provided and commonly shared by all the transaction processors 6, so that each transaction processor is accessible to any desired data stored in this data memory device 9A.

In this case, the data management unit checks whether the operation target data to be accessed has already been accessed by the other data management unit or not. If not, this operation target data is read into the region provided within the data management unit, and then the requested data operation is carried out on this region. After the requested data operation is finished, the operation target data may be returned to the data memory device, or in a case there is a high probability for making access to this same data again, this data may be retained in the region within the data management unit. In the latter case, the other data management unit will be unable to make a direct access to this data and the access to this data have to be requested to this data management unit.

As a consequence, in this case, the data arrangement determination unit determines which data management unit of which transaction processor may retain which data on the region within that data management unit, rather than which data is to be arranged in which data memory device.

In this manner, it is possible to apply the transaction processing system of the present invention to the data sharing type configuration as well.

Figure 6:
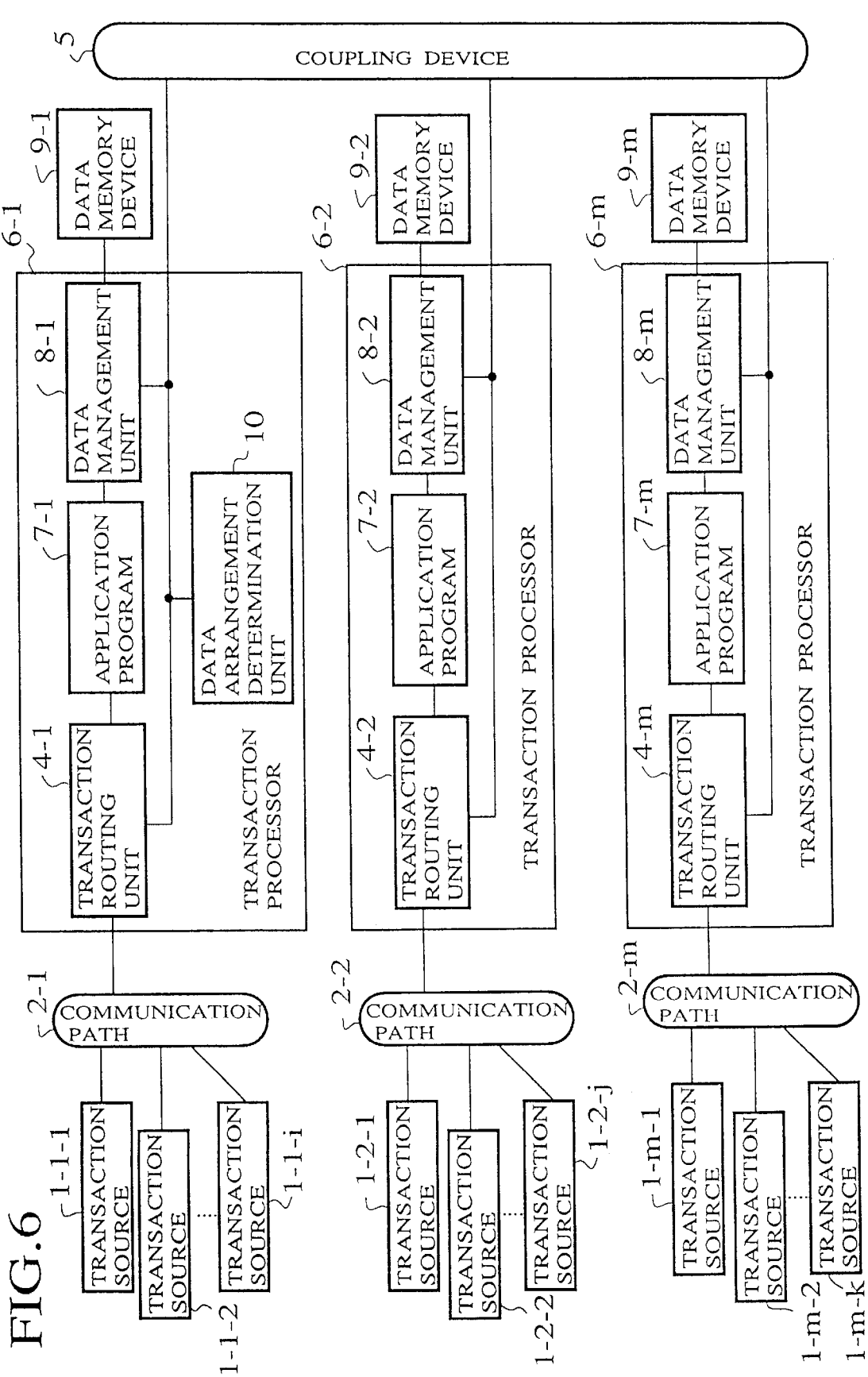
FIG. 6 is a schematic block diagram of another possible modified configuration for the system of FIG. 3.

It is also possible to modify the configuration of FIG. 3 as shown in FIG. 6, in which a plurality of transaction routing units 4-1 to 4-m are provided in the transaction processors 6-1 to 6-m and connected with the transaction sources 1-1-1 to 1-m-k through different communication paths 2-1 to 2-m on one hand and with the coupling device 5, the application programs 7 and the data management unit 8 on the other hand, while omitting the front-end processor 3.

Here, all or some of the transaction processors may be connected with the same communication path if desired. Also, it is not necessary for the transaction routing units to be provided in all the transaction processors, and may be provided only on one or some of the transaction processors.

Figures 7, 8:
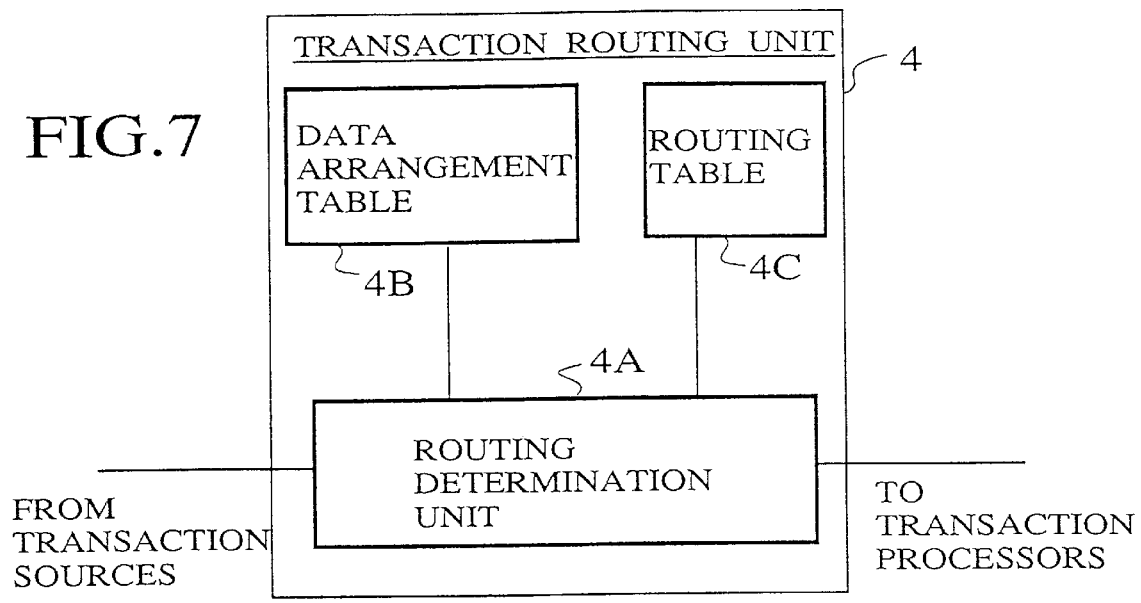
FIG. 7 is a schematic block diagram of a transaction routing unit in one modification of a multiple processor transaction processing system according to the present invention.
FIG. 8 is a diagrammatic illustration of a data arrangement table in the transaction routing unit of FIG. 7.

It is also possible to further modify this configuration of FIG. 8 in the data sharing type configuration similarly as in FIG. 5.

It is also possible to modify the first embodiment described above as follows. Namely, instead of using the processing history, the transaction routing unit can use the data arrangement information indicating how data are stored in which data memory device of each transaction processor, such that when the new transaction is received, the transaction processor on which the appropriate application program for processing this transaction is selected by looking up the data arrangement information, and the processing of the transaction is commanded accordingly.

In this case, the transaction routing unit 4 has a configuration as shown in FIG. 7, which comprises a data arrangement table 4B storing the data arrangement information, a routing table 4C storing the routing scheme for each type of transaction, and a routing determination unit 4A for determining the transaction processor for processing the newly arrived transaction according to the data arrangement table 4B and the routing table 4C and commanding the processing of the transaction accordingly.

The data arrangement table 4B has a configuration as shown in FIG. 8, where each entry indicates, for each database, data with the key having a value in which range are stored in which data memory device of which transaction processor. For instance, the example shown in FIG. 8 indicates that, for the database called "ACCOUNT", the data with the key having the value in a range of 0 to 999 are stored in the data memory device of the transaction processor No. 0.

This data arrangement table may be produced manually and given to the transaction routing unit if desired. Alternatively, this data arrangement table may be produced by recording the information concerning the new data arrangement whenever the data arrangement determination unit determines the new data arrangement, or by recording the information concerning which data are going to be managed by each data management unit supplied from each data management unit to the transaction routing unit.

Figures 9, 10:
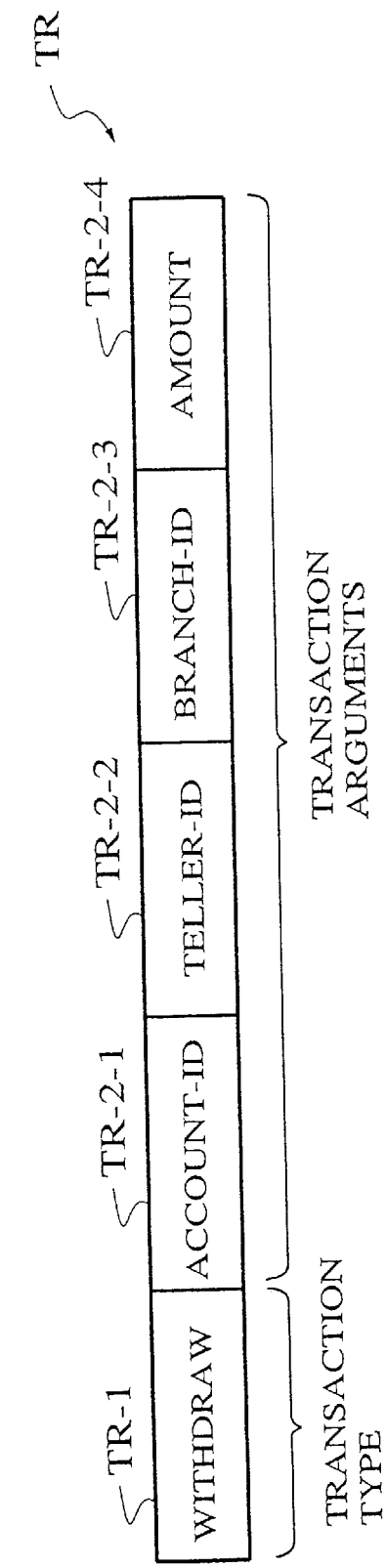
FIG. 9 is a diagrammatic illustration of a routing table in the transaction routing unit of FIG. 7.
FIG. 10 is a diagrammatic illustration of a transaction in one modification of a multiple processor transaction processing system according to the present invention.

The routing table 4C has a configuration as shown in FIG. 9, where each entry indicates, for each type of transaction which can be processed by the application programs on the transaction processors, a name of the argument to be used in making the transaction routing and name of the database to be used in making the transaction routing.

Also, in this case, each transaction TR is given in a form shown in FIG. 10, which includes a header TR-1 indicating the type of transaction and a number of arguments TR-2-1 to TR-2-4 required in processing this transaction. For instance, the example of FIG. 10 shows the transaction called "WITHDRAW" which carries out the withdrawal of the deposit from the bank account, and which has four arguments including "ACCOUNT_ID" indicating the bank account number, "TELLER_ID" indicating the number assigned to the automatic teller machine, "BRANCH_ID" indicating the number assigned to the branch of the bank, and "AMOUNT" indicating an amount to be withdrawn from the deposit.

The example of the routing table shown in FIG. 9 indicates that, for the transaction "WITHDRAW", the transaction routing is made by looking up the argument "ACCOUNT_ID" and the database "ACCOUNT". Namely, when the transaction "WITHDRAW" arrives at the transaction routing unit, the routing determination unit 4A looks up the routing table 4C to ascertain that this transaction "WITHDRAW" is to be routed according to the values of argument "ACCOUNT_ID" and the database "ACCOUNT". Then, the value of the argument "ACCOUNT_ID" in the transaction is taken out. Then, the transaction routing unit looks up the data arrangement table 4B to check whether there exists the data in the database "ACCOUNT" which has the whose value is the same as the value of the argument "ACCOUNT_ID" of the transaction or not. Then, the processing of the transaction is commanded to the transaction processor checked in this manner.

The routing table may be produced manually and recorded in the transaction routing unit.

It is to be noted that in this case, the transaction routing unit is operated by the deterministic algorithm which can always select the optimum transaction processor when the routing table and the data arrangement table are given correctly, rather than the probabilistic algorithm used in the first embodiment described above. Consequently, in a case of using the deterministic algorithm, there is an advantage that it is possible to obtain the transaction routing according to the new data arrangement immediately after the data arrangement is changed. On the other hand, in a case of using the probabilistic algorithm, there is an advantage that it is unnecessary to provide the information concerning the transaction routing such as that in the routing table to the transaction routing unit.

Figure 11:
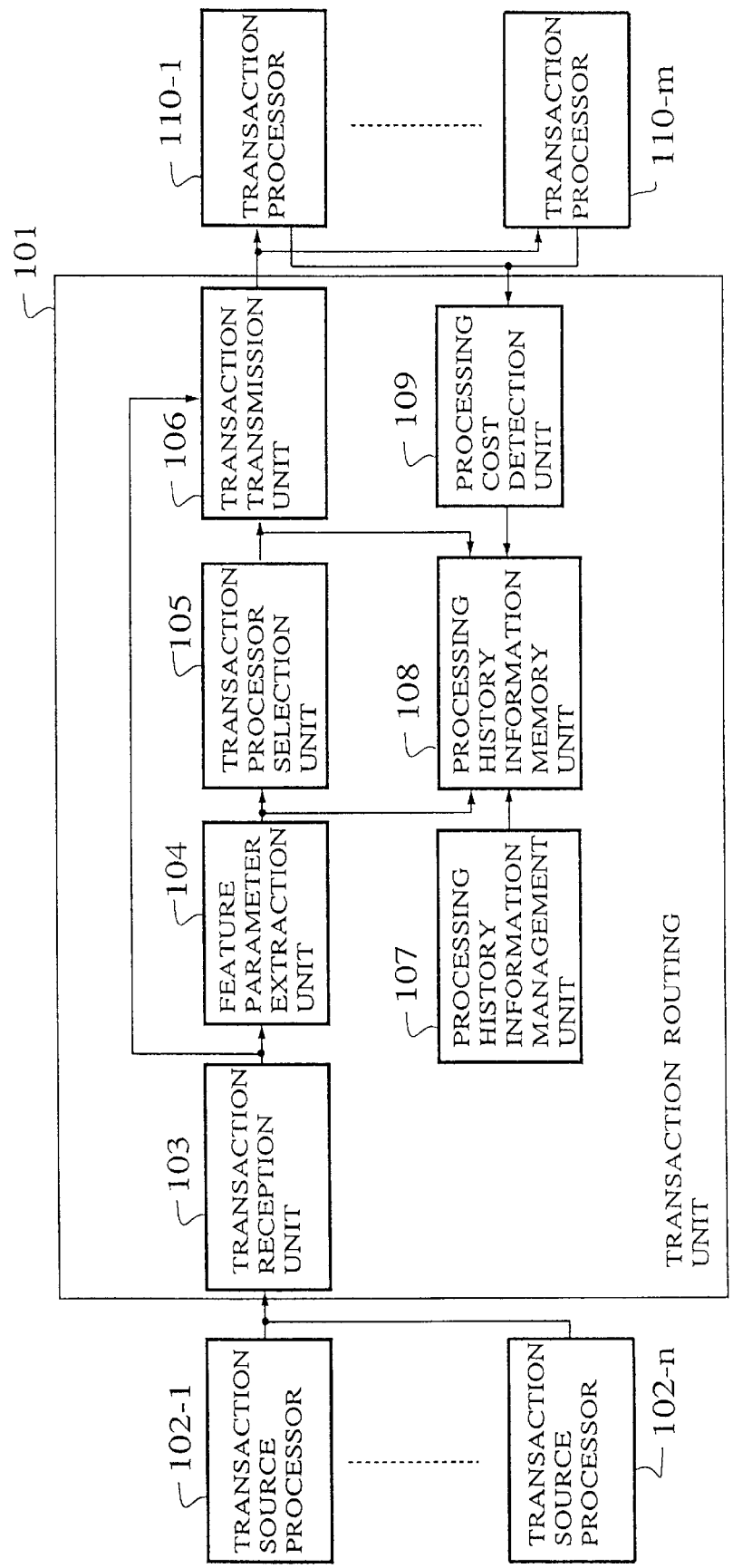
FIG. 11 is a block diagram of a transaction routing unit in a second embodiment of a multiple processor transaction processing system according to the present invention.

Referring now to FIG. 11, the second embodiment of the multiple processor transaction processing system according to the present invention will be described in detail. This second embodiment mainly concerns with the transaction routing scheme which is suitable for use in the transaction routing unit in the first embodiment described above.

In this second embodiment, the system has a configuration as shown in FIG. 11 or FIG. 12, which generally comprises at least one transaction source processors 102-1 to 102-n and a plurality of transaction processors 110-1 to 110-m which are connected through a transaction routing unit 101 or 111. The transaction routing unit 101 or 111 receives the transactions generated by the transaction source processors 102-1 to 102-n, selects the optimum transaction processor for processing each transaction among the transaction processors 110-1 to 110-m, and selectively routes each received transaction to the selected transaction processor. The transaction routing unit 111 of FIG. 12 differs from the transaction routing unit 101 of FIG. 11 in its internal configuration, and in the following, the description concerning the transaction routing unit 101 of FIG. 11 as a whole equally applies to the transaction routing unit 111 of FIG. 12 as a whole.

As shown in FIG. 13, the system has a physical configuration in which the transaction source processors 102-1 to 102-n are coupled with the transaction routing unit 101 through a coupling path 114-1 such as an exchanger, channel, or network, while the transaction processors 110-1 to 110-m are also coupled with the transaction routing unit 101 through another similar coupling path 114-2, and the transaction routing unit 101 is connected between the coupling paths 114-1 and 114-2. Here, the transaction source processors 102-1 to 102-n can be the terminal devices such as the automatic teller machines which generate the some kinds of transactions.

It is possible to use another physical configuration shown in FIG. 14 in which a plurality of transaction routing units 101-1 to 101-l are provided to share the load of the transaction routing processing, such that a number of transaction routing processings can be carried out simultaneously. In this case, when one transaction routing unit is broken, another transaction routing unit can be used as a substitute, so that it is possible to construct the system which is well protected against any accident.

It is also possible to use another physical configuration shown in FIG. 15 in which each one of the plurality of transaction routing units 101-1 to 101-l is coupled with a number of transaction source processors 102 independently from the other transaction routing units through one of a plurality of coupling paths 114-1-1 to 114-1-l.

Figure 16:
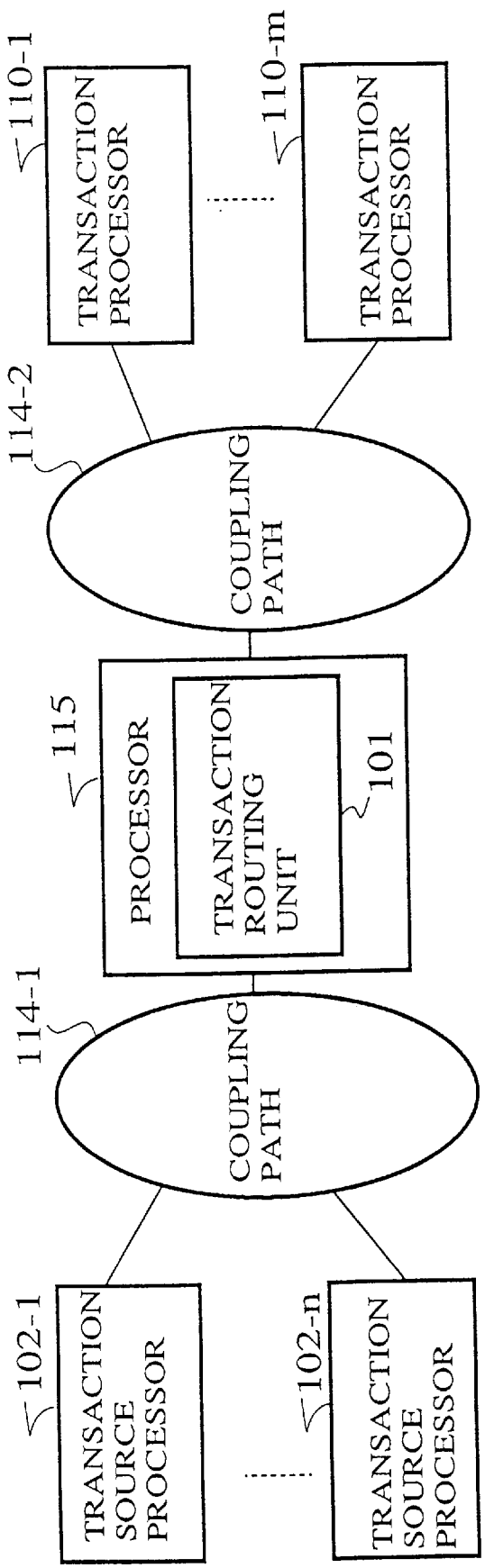
FIG. 16 is a schematic block diagram of another possible system configuration for the second embodiment of the present invention.

Instead of providing the transaction routing unit 101 as an independent device as in FIG. 13, It is also possible to realize this transaction routing unit 101 as a function provided by a processor 115 connected between the coupling paths 114-1 and 114-2, as shown in FIG. 16, either by means of software or hardware.

Figure 17A:
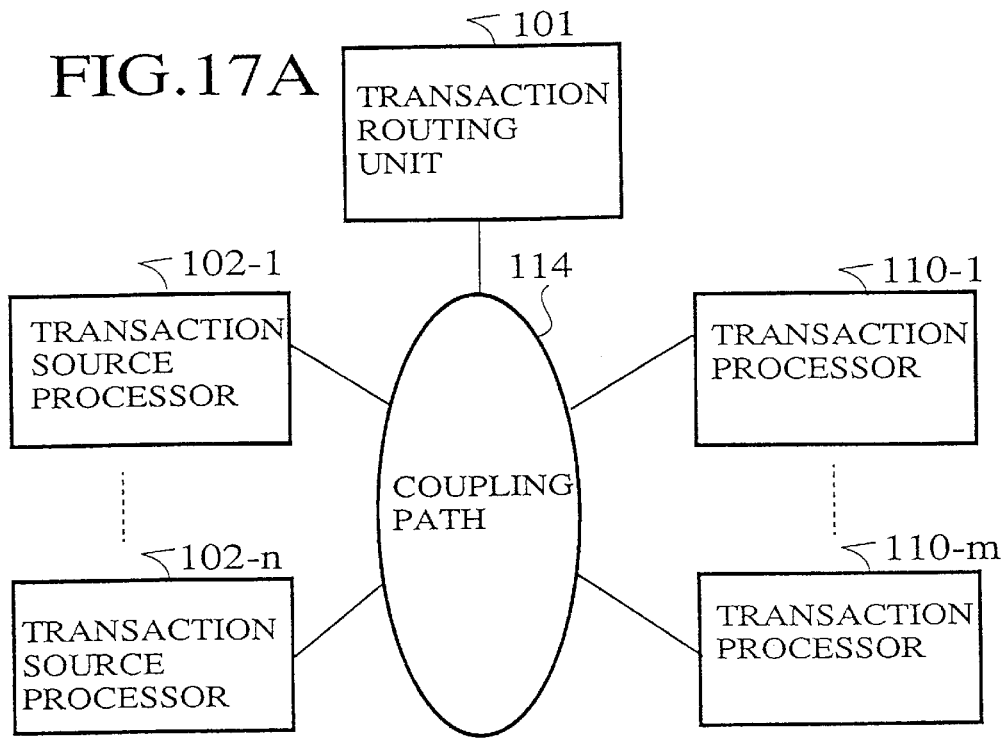
FIG. 17A is a schematic block diagram of another possible system configuration for the second embodiment of the present invention.
Figure 17B:
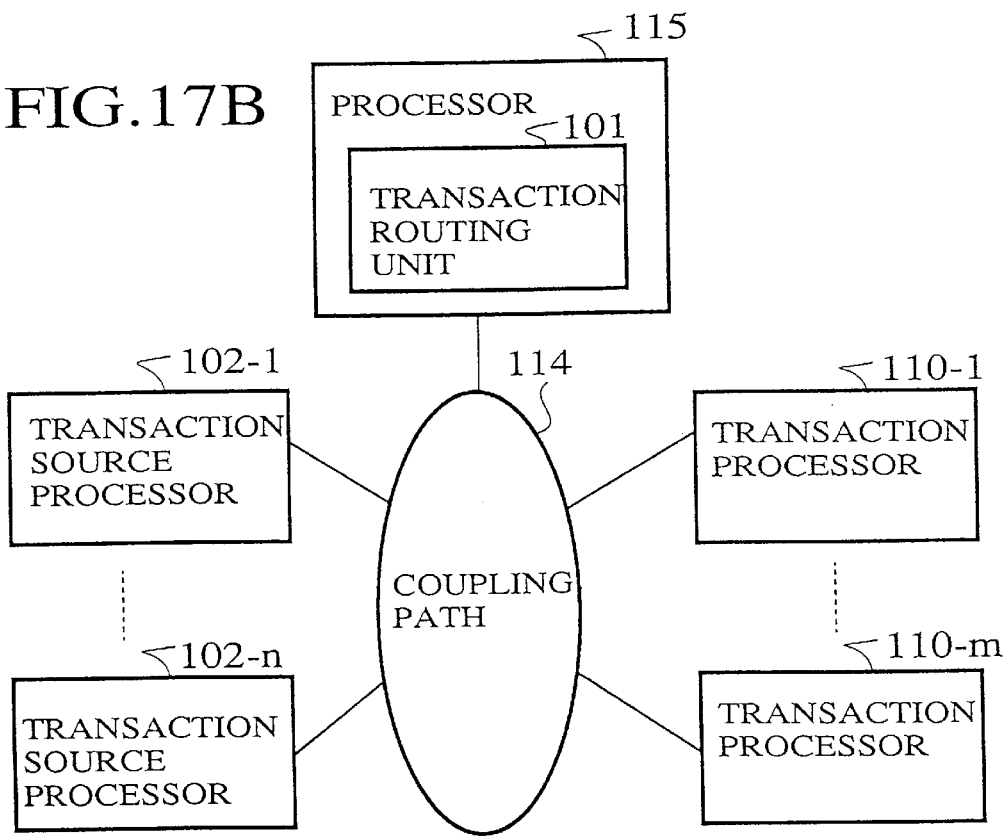
FIG. 17B is a schematic block diagram of another possible system configuration for the second embodiment of the presentinvention.

The coupling paths 114-1 and 114-2 for coupling the transaction source processors 102-1 to 102-n and the transaction processors 110-1 to 110-m with the transaction routing unit 101 may not necessarily be provided separately as in FIG. 13 or FIG. 16, and as shown in FIG. 17A, a common coupling path 114 can be used in coupling all of the transaction source processors 102-1 to 102-n, the transaction processors 110-1 to 110-m, and the transaction routing unit 101. Further, as shown in FIG. 17B, the transaction routing unit 101 may be realized as a function of the processor 115 connected with the transaction source processors 102-1 to 102-n and the transaction processors 110-1 to 110-m through the common coupling path 114.

In a case of realizing the transaction routing unit 101 as a function of a processor, this processor for providing the function of the transaction routing unit 101 may not necessarily be an additional processor 115 as in FIG. 16 or FIG. 17B, and can be any of the transaction source processors 102 or the transaction processors 110 as follows.

Figure 18A:
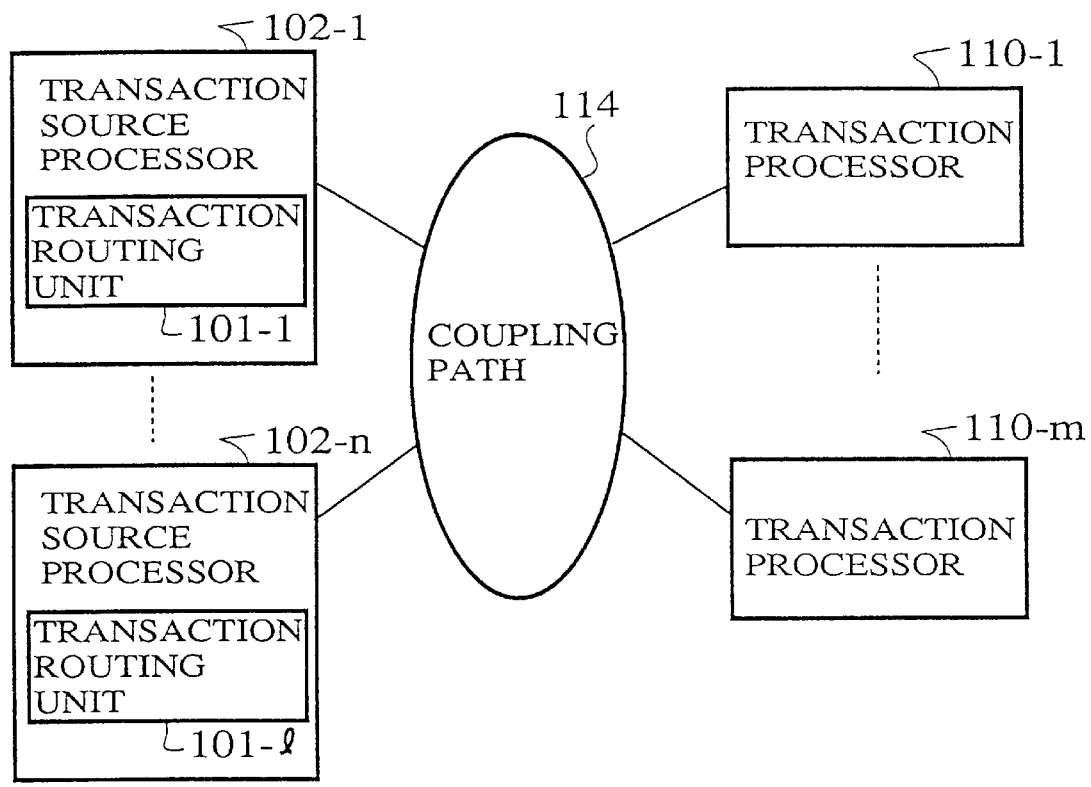
FIG. 18A is a schematic block diagram of another possible system configuration for the second embodiment of the present invention.

Namely, as shown in FIG. 18A, a plurality of transaction routing units 101-1 to 101-l can be provided as functions of all or some of a plurality of transaction source processors 102-1 to 102-n, where each transaction source processor 102 directly transmits the transaction to one of the transaction processors 110 selected by the transaction routing unit 101 provided therein through the common coupling path 114.

Figure 18B:
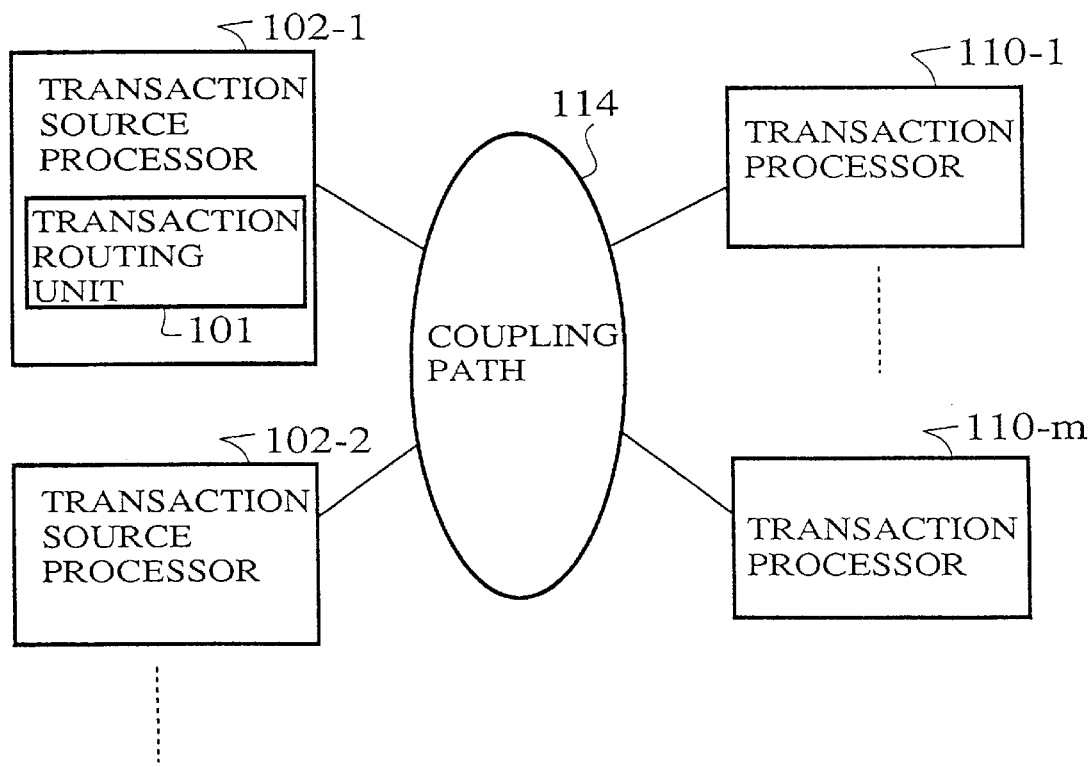
FIG. 18B is a schematic block diagram of another possible system configuration for the second embodiment of the present invention.

It is also possible to provide the transaction routing unit 101 as a function of only one of a plurality of transaction source processors 102-1 to 102-n as indicated in FIG. 18B. In this case, each transaction source processor 102 which does not have the transaction routing unit 101 therein directly transmits the transaction to this one transaction source processor (102-1 in FIG. 18B) which has the transaction routing unit 101 through the common coupling path 114.

Figure 19A:
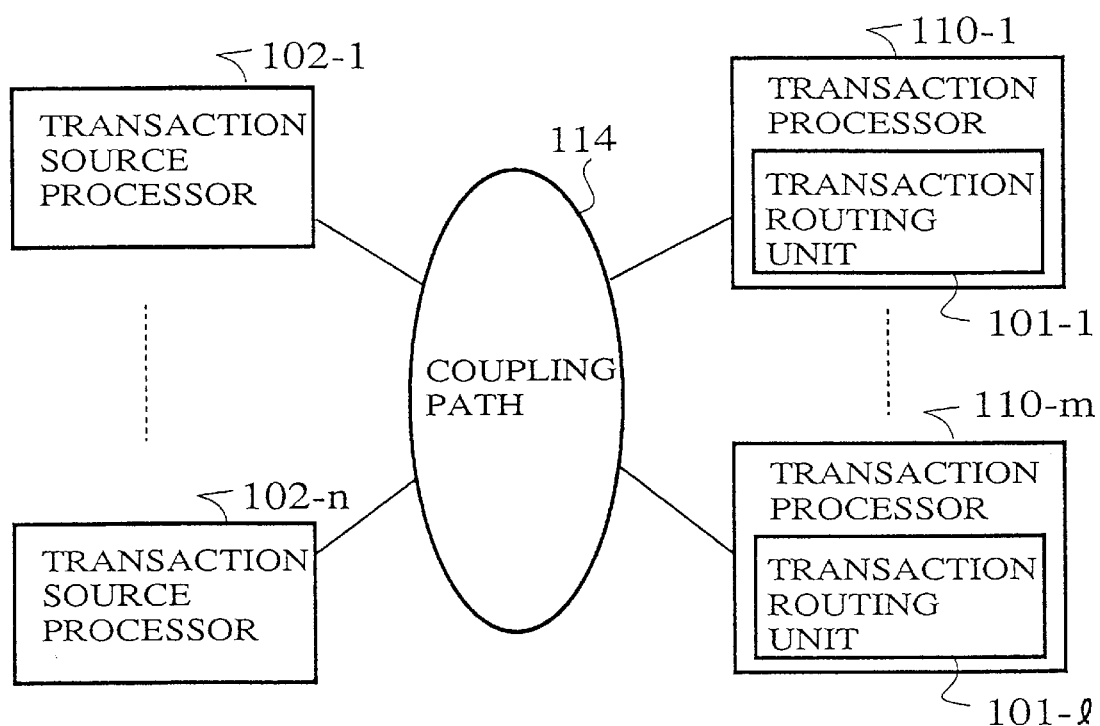
FIG. 19A is a schematic block diagram of another possible system configuration for the second embodiment of the present invention.

On the other hand, as shown in FIG. 19A, a plurality of transaction routing units 101-1 to 101-l can be provided as functions of all or some of a plurality of transaction processors 110-1 to 110-n. In this case, each transaction source processor 102 directly transmits the transaction to an arbitrary one of the transaction processors 110. Then, the transaction routing unit 101 provided in this one transaction processor 110 determines the optimum transaction processor 110 for processing this transaction, and the transaction is processed in this one transaction processor 110 if the determined optimum transaction processor is this same transaction processor 110 itself, whereas otherwise the transaction is transferred to the determined optimum transaction processor through the common coupling path 114.

Figure 19B:
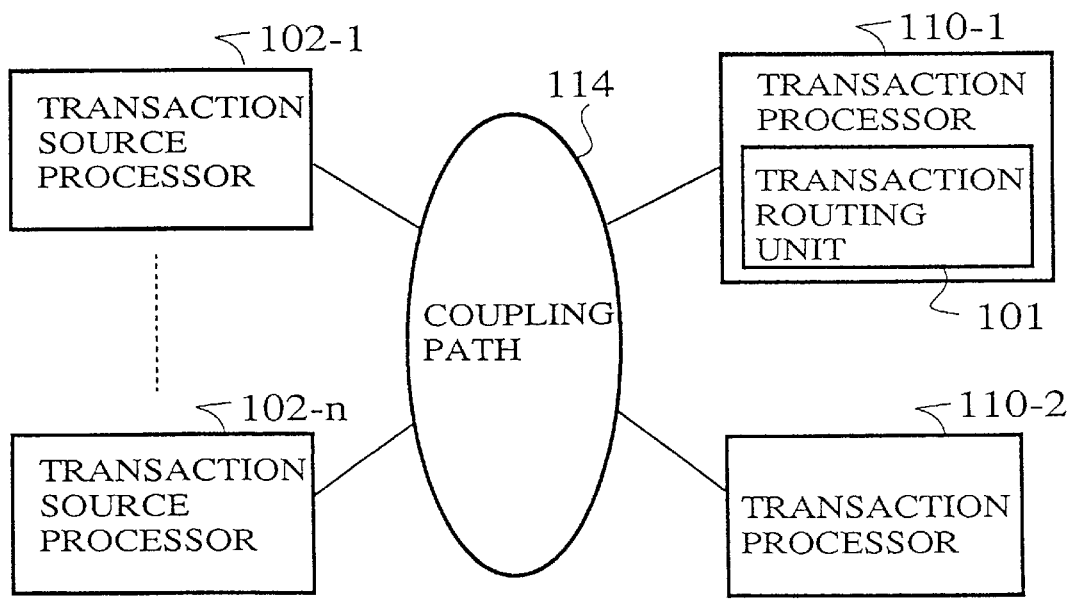
FIG. 19B is a schematic block diagram of another possible system configuration for the second embodiment of the present invention.

It is also possible to provide the transaction routing unit 101 as a function of only one of a plurality of transaction processors 110-1 to 110-m as indicated in FIG. 19B. In this case, each transaction source processor 102 directly transmits the transaction to this one transaction processor (110-1 in FIG. 19B) which has the transaction routing unit 101 through the common coupling path 114.

Next, the manner of processing the transaction at each transaction processor 110 to which the transaction has been routed by the transaction routing unit 101 or 111 will be described. As shown in FIG. 20, each transaction processor 110 is equipped with an application program (transaction processing unit) 116 for processing the transaction, and a data manager (data management unit) 117 for managing the data necessary in executing the application program 116, and associated with a data memory device 118 such as a disk device for storing the data.

In FIG. 20, the application program 116 which received the transaction and started its execution requests the reading/writing of the data necessary in its execution to the data manager 117. The data manager 117 which received the request for data reading/writing carries out the requested data reading/writing operation when the target data is stored in the data memory device 118 associated with its own transaction processor 110, or requests the data manager 117 of the other transaction processor 110 to carry out the requested data reading/writing when the target data is stored in the data memory device 118 associated with the other transaction, processor 110. For this reason, it is not necessary for the application program 116 to be conscious about which data is present on which transaction processor, but a case of carrying out the data reading/writing on the other transaction processor has an overhead as it is more time consuming compared with a case of carrying out the data reading/writing on its own transaction processor.

FIG. 21 shows another manner of processing the transaction at each transaction processor 110 to which the transaction has been routed by the transaction routing unit 101 or 111, in which the application program 119 which received the transaction and started its execution itself requests the reading/writing of the data necessary in its execution to the data manager 120 of the transaction processor 110 on which the target data is present. In this manner of FIG. 21, there is also an overhead in a case of carrying out the data reading/writing on the other transaction processor similarly as in FIG. 20, and it is necessary for the application program 119 itself to be conscious about which data is present on which transaction processor.

Figure 22:
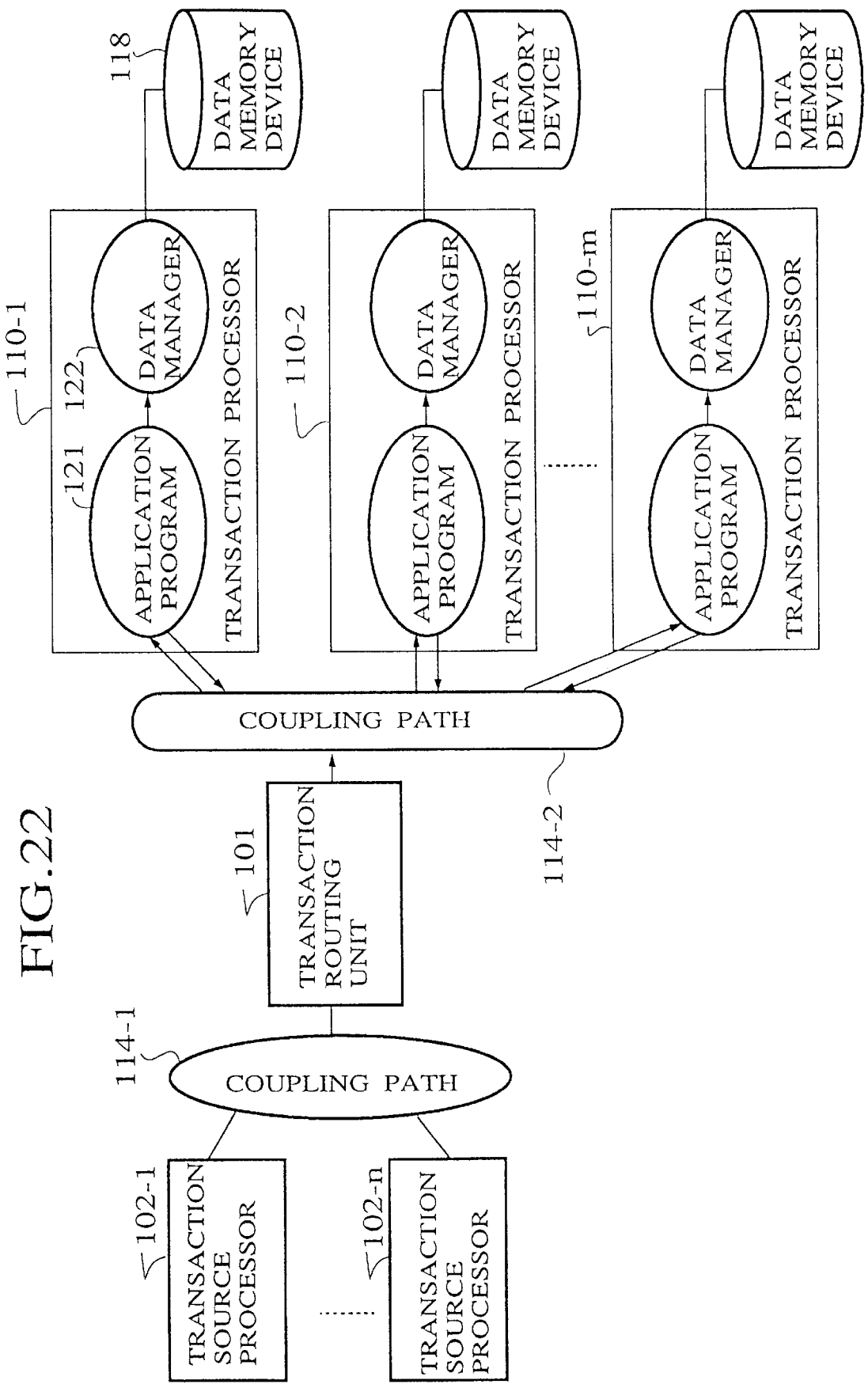
FIG. 22 is a schematic block diagram of another possible system configuration for the second embodiment of the present invention.

FIG. 22 shows another manner of processing the transaction at each transaction processor 110 to which the transaction has been routed by the transaction routing unit 101 or 111, in which the application program 121 which received the transaction judges whether the received transaction should be processed on its own transaction processor or not. When it is judged that the transaction should be processed on the other transaction processor, the transaction is transferred to that other transaction processor, whereas when it is judged that the transaction should be processed on its own transaction processor, its execution is started. The reading/writing of data necessary for its execution is requested to the data manager 122 on its own transaction processor, and the reading/writing of the data on the other transaction processor can be requested from the data manager 122 to the data manager of the other transaction processor as in a case of FIG. 20, or from the application program 121 itself to the data manager of the other transaction processor as in a case of FIG. 21.

Figure 23:
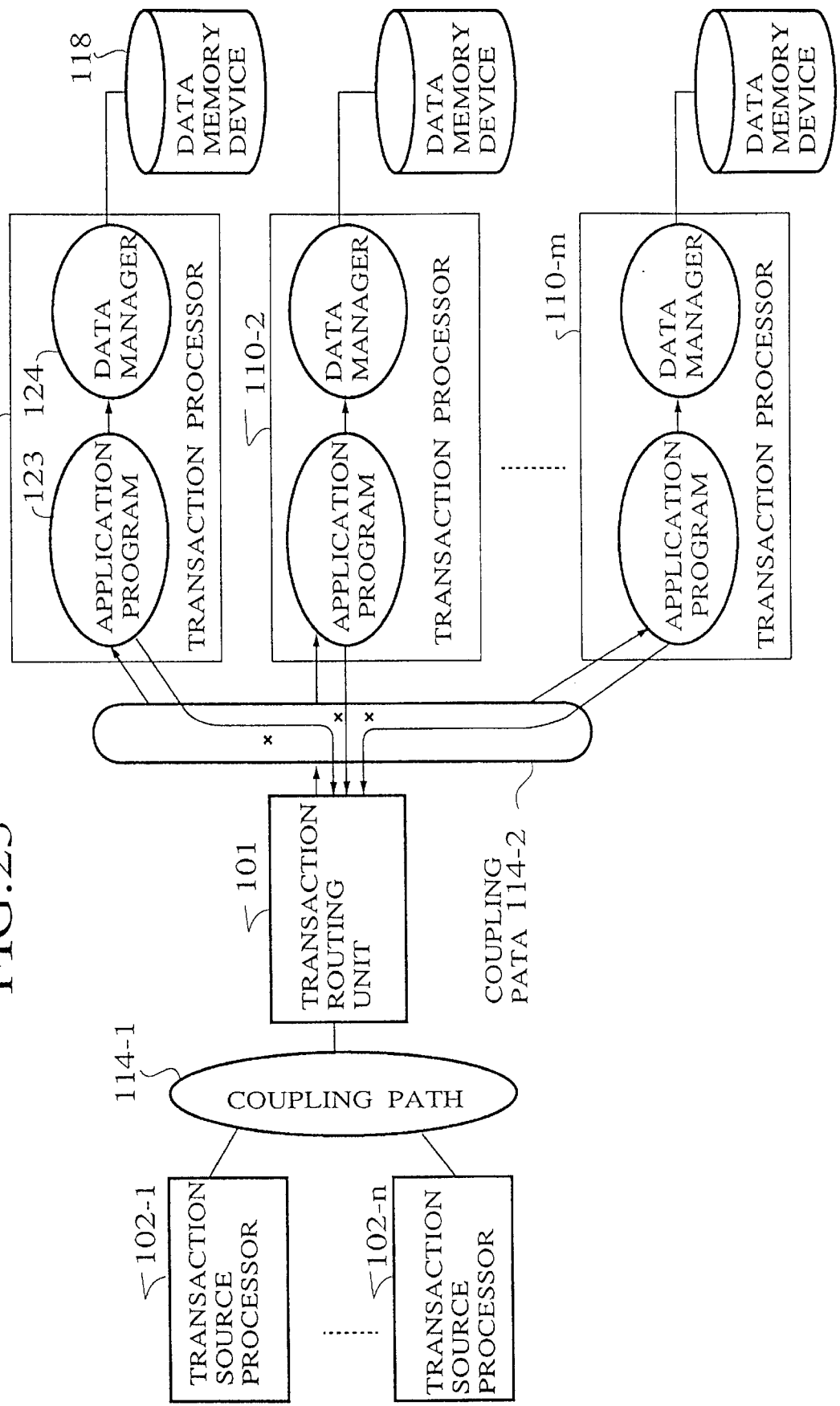
FIG. 23 is a schematic block diagram of another possible system configuration for the second embodiment of the present invention.

FIG. 23 shows another manner of processing the transaction at each transaction processor 110 to which the transaction has been routed by the transaction routing unit 101 or 111, in which the application program 123 which received the transaction judges whether the received transaction should be processed on its own transaction processor or not. When it is judged that the transaction should be processed on the other transaction processor, the application program 123 notifies the transaction routing unit 101 that this transaction cannot be processed there. In response to this notice, the transaction routing unit 101 stores the fact that this transaction cannot be executed in that transaction processor in the processing history information by setting the processing cost for this transaction at that transaction processor to be infinitely large, and routes this transaction to another new optimum transaction processor. On the other hand, when it is judged that the transaction should be processed on its own transaction processor, the execution of the application program 123 is started. The reading/writing of data necessary for its execution is requested to the data manager 124 on its own transaction processor, and the data reading/writing of the data on the other transaction processor can be requested from the data manager 124 to the data manager of the other transaction processor as in a case of FIG. 20, or from the application program 123 itself to the data manager of the other transaction processor as in a case of FIG. 21.

Now, the internal configuration of the transaction routing unit in the system of FIGS. 11 and 12 will be described in detail.

In the transaction routing unit 101 of the system shown in FIG. 11, the transaction transmitted from the transaction source processor 102 is received by the transaction reception unit 103, which supplies the received transaction to the feature parameter extraction unit 104 and the transaction transmission unit 106. The feature parameter extraction unit 104 extracts the feature parameters from the supplied transaction, and supplies it to the transaction processor selection unit 105 as well as to the processing history information memory unit 108 in which it is stored as the feature parameters of this transaction. The transaction processor selection unit 105 compares the values of the feature parameters supplied from the feature parameter extraction unit 104 and the processing history information of the past recorded in the processing history information memory unit 108, to select the optimum transaction processor for processing the transaction, and notifies the selected transaction processor to the transaction transmission unit 106 as well as to the processing history information memory unit 108 in which it is stored as the transaction processor which processed this transaction. The transaction transmission unit 106 transmits the transaction supplied from the transaction reception unit 103 to the transaction processor 110 notified from the transaction processor selection unit 105, to complete the transaction routing processing.

The processing history information management unit 107 manages the processing history information stored in the processing history information memory unit 108, and delete the old processing history information stored in excess to a prescribed period of time or a prescribed number of processings. The transaction processor 110 which received the transaction from the transaction routing unit 101 then processes this transaction, and notifies the processing cost required in actually processing this transaction to the processing cost detection unit 109 of the transaction routing unit 101. The processing cost detection unit 109 then supplies the received processing cost to the processing history information memory unit 108 in which it is stored as the processing cost for this transaction. Then, whenever necessary, the transaction processor 110 transmits the processing result of this transaction to the transaction source processor 102 by using an appropriate communication device.

The transaction routing unit 111 of the system shown in FIG. 12 similarly as the transaction routing unit 101 of the system shown in FIG. 11 up to a point at which the transaction is transmitted from the transaction transmission unit 106 to the transaction processor 110.

The transaction processor 110 which received the transaction from the transaction routing unit 111 then processes this transaction, but unlike the case of FIG. 11, the processing cost required in actually processing this transaction is not explicitly notified to the transaction routing unit 111. Instead, the transaction processor 110 returns the processing result of this transaction to the transaction routing unit 111, in which the returned processing result is received by the processing result reception unit 112 and supplied to the processing result transmission unit 113 while notifying the fact concerning the reception of the processing result to the processing cost detection unit 109. The processing result transmission unit 113 which received the processing result then returns the processing result of this transaction to the transaction source processor 102 which generated this transaction.

On the other hand, the processing cost detection unit 109 which is notified about the reception of the processing result obtains the cost required in processing this transaction accordingly, and supplies the obtained processing cost to the processing history information memory unit 108 in which it is stored as the processing cost for this transaction. In the processing cost detection unit 109, the processing cost can be obtained by a scheme for setting a time difference between a time at which the transaction is received and a time at which the processing result for this transaction is received as the processing cost, or a scheme for setting a number of transactions which were received after this transaction and for which the processings were completed before the processing of this transaction was completed as the processing cost.

Figure 24A:
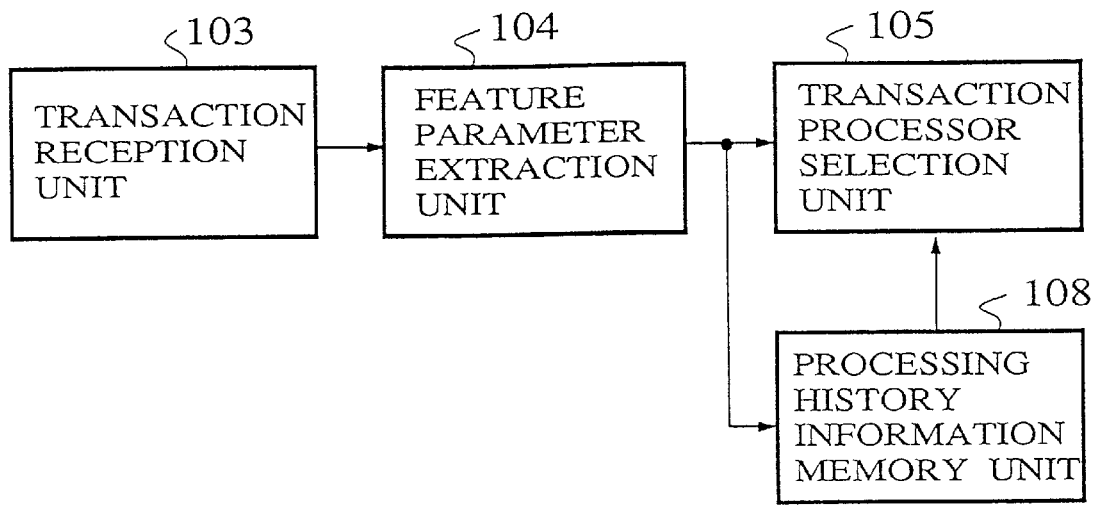
FIG. 24A is a block diagram of a partial configuration in the transaction routing unit of FIG. 11.

In the configurations of FIG. 11 and FIG. 12, the feature parameters extracted from the received transaction are stored in the processing history information memory unit 108, and the transaction processor selection unit 105 selects the optimum transaction processor according to the feature parameters of the past processing history recorded in the processing history information memory unit 108, as indicated in FIG. 24A.

Figure 24B:
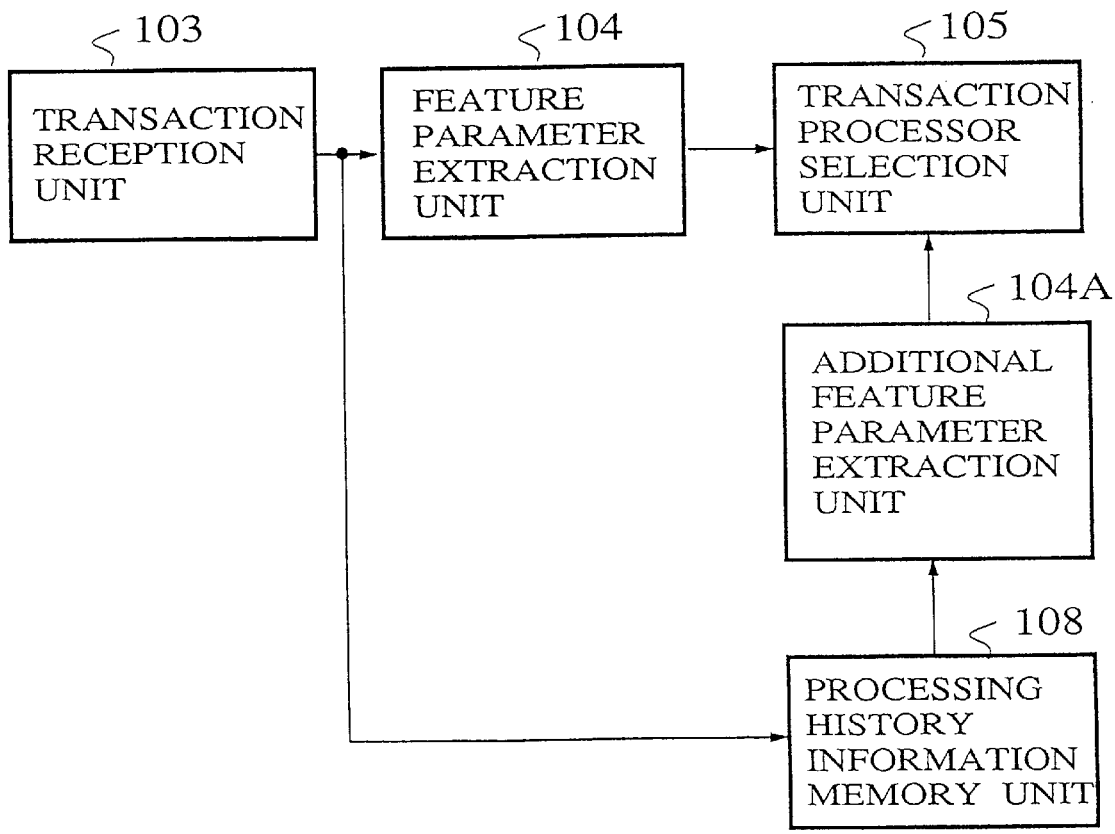
FIG. 24B is a block diagram of a modified configuration for the partial configuration of FIG. 24A.
Figure 25:
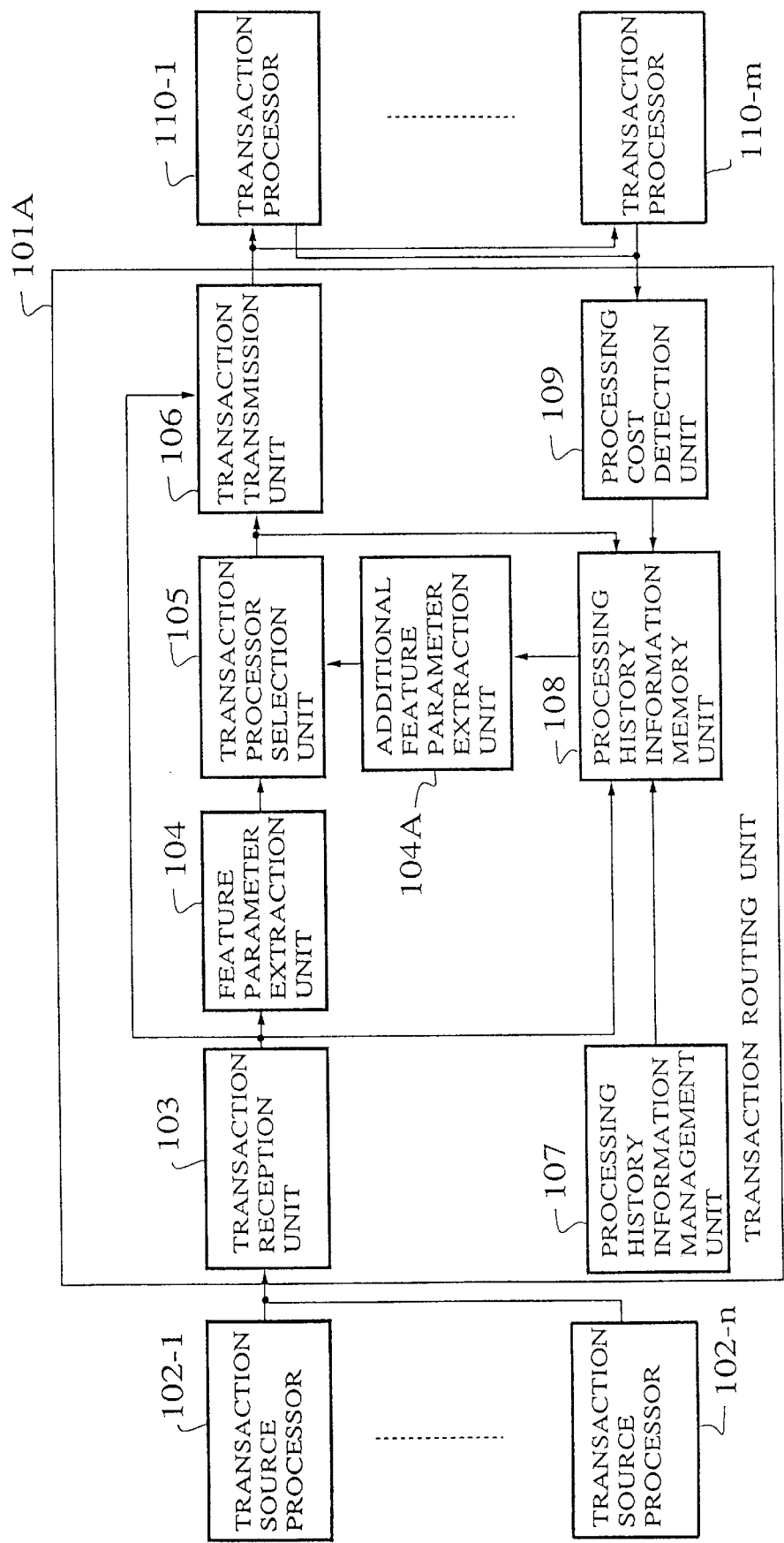
FIG. 25 is a block diagram of one possible modified configuration for the transaction routing unit of FIG. 11 incorporating the modified configuration of FIG. 24B.

Alternatively, it is also possible to store the transaction itself in the processing history information memory unit 108 instead of the feature parameters. In this case, as indicated in FIG. 24B, the the transaction reception unit 103 stores the received transaction as it is into the processing history information memory unit 108, and the transaction processor selection unit 105 looks up the processing history information through additional feature parameter extraction unit 104A provided between the transaction processor selection unit 105 and the processing history information memory unit 108 which extracts the feature parameters from the transaction stored in the processing history information memory unit 108 and supplies it to the transaction processor selection unit 105. When this modification is incorporated into the configuration of FIG. 11, the system has the transaction routing unit 101A in a modified configuration as shown in FIG. 25. Similarly, when this modification is incorporated into the configuration of FIG. 12, the system has the transaction routing unit 111A in a modified configuration as shown in FIG. 28.

Now, the operation principle of the transaction routing unit in this second embodiment of the present invention will be described in detail.

In the transaction routing unit of this second embodiment, when the new transaction is received, the feature parameters of this transaction are extracted first. Here, the feature parameters are given as a set of a plurality of values for each transaction in general.

Then, the feature parameters of the new transaction and the feature parameters in the stored processing history information for the past transactions are compared, to select out the processing history information which has the feature parameter value closest to that of the new transaction, for each transaction processor and for each feature parameter.

Namely, when there are M transaction processors which can process this new transaction, the feature parameters comprise a set of N values, and the feature parameters of this new transaction are set as X[n] ($0 \leq n < N$), M×N pieces of the processing history information H[m, n] ($0 \leq m < M$, $0 \leq n < N$) are selected out such that the following condition is satisfied.

$$H[m, n] \in A \land node(H[m, n]) = m \land$$

$$\forall (F: F \in A \land node(F) = m) \; |H[m, n][n] - X[n]| \leq |F[n] - X[n]|$$

where A is a set of all the processing history information currently stored, H[m, n][p] is a p-th value in the set of feature parameter values for the processing history information H[m, n], and node(F) is a transaction processor number of the transaction processor which had processed the transaction recorded in the processing history information F.

Then, among M×N pieces of the processing history information H[m, n] selected out in this manner, the transaction processor P[n] ($0 \leq n < N$) which can be a candidate for processing the transaction is selected for each feature parameter such that the following condition is satisfied.

$$\exists \; (k: 0 \leq k < M) \; P[n] = node(H[k, n])$$

$$\land \; \forall \; (i: 0 \leq i < M) \; cost(H[k, n]) \leq cost(H[i, n])$$

where cost(F) is the processing cost of the transaction recorded in the processing history information F.

In other words, among a plurality of selected processing history information H[m, n], for each feature parameter, the processing history information with the lowest cost is selected, and the transaction processor which had processed this transaction corresponding to this selected processing history information is set as a candidate transaction processor P[n]. Here, in a case the processing cost of the processing history information H[P[n], n] selected as the candidate is significantly lower than the processing costs of the other processing history information having the same feature parameter, there is no problem in selecting this processing history information as the appropriate candidate transaction processor.

However, in a case the processing cost of the processing history information H[P[n], n] has no significant difference from the processing costs of the other processing history information, even when the processing history information with the lowest cost is simply selected, the possibility for this to be actually the appropriate candidate transaction processor is small. Consequently, in order to remove such processing history information with small possibility from the consideration of the candidate transaction processor, the candidate transaction processor which does not satisfy the following condition is removed from the candidate transaction processors.

$$V[n]/cost(H[P[n], n]) > T$$

where $$V[n] = \left( \sum_{i=0}^{n-1} cost(H[i, n]) \right) / M$$

In other words, when the average value of the costs of the processing history information H[m, n] having the same feature parameter is larger than the cost of the processing history information H[P[n], n] for the selected candidate transaction processor P[n] by as many times as a prescribed number T, it is considered that there is a significant difference, and otherwise this selected candidate transaction processor is removed from the candidate transaction processors. Here, the number T has a value such as 1.1 for instance. In this algorithm, when there is no candidate transaction processor, the value of P[n] is set to a value such as –1 which is actually invalid as the transaction processor number.

Then, among N candidate transaction processors P[N] selected in this manner, the actual optimum transaction processor is selected. Here, the weight information W[N] for each feature parameter is used. Each element W[k] of the weight information W[N] indicates the strength of correlation between the k-th feature parameter value of the corresponding transaction and the transactions processor for processing that transaction. When the corresponding elements of P[N] and W[N] arranged in an order of largeness of the value of W[N] are set as PP[N] and WW[N], the actual procedure for selecting out the optimum transaction processor for processing the transaction can be described in the C language as follows.

```
pickednode = –1:
for (i=0; i<N; i++)
    if ((PP[i]! = –1)&&(WW[i]>random())){
        pickednode = PP[i]:
        break:
    }
if (pickednode == –1) pickednode = random()*M:
``` where random() is a function which generates a random number in a range of the real number values between 0 and 1, and "pickednode" is a variable for substituting the transaction processor number for processing the transaction, whose initial value is –1 that does not corresponds to any transaction processor. In an order of the largeness of the weight, the random number is generated and when its value is less than the weight, this transaction is selected, whereas otherwise the above selection procedure is continued for the next candidate. In a case the candidate cannot be determined eventually, the transaction processor for processing this transaction is selected by an appropriate manner. In the exemplary procedure described here, one of the M transaction processors is selected by the random number.

In the following, the exemplary case of applying the transaction routing scheme of this second embodiment to the remote procedure call (RPC) based transaction processing system will be described in detail.

Figure 26:
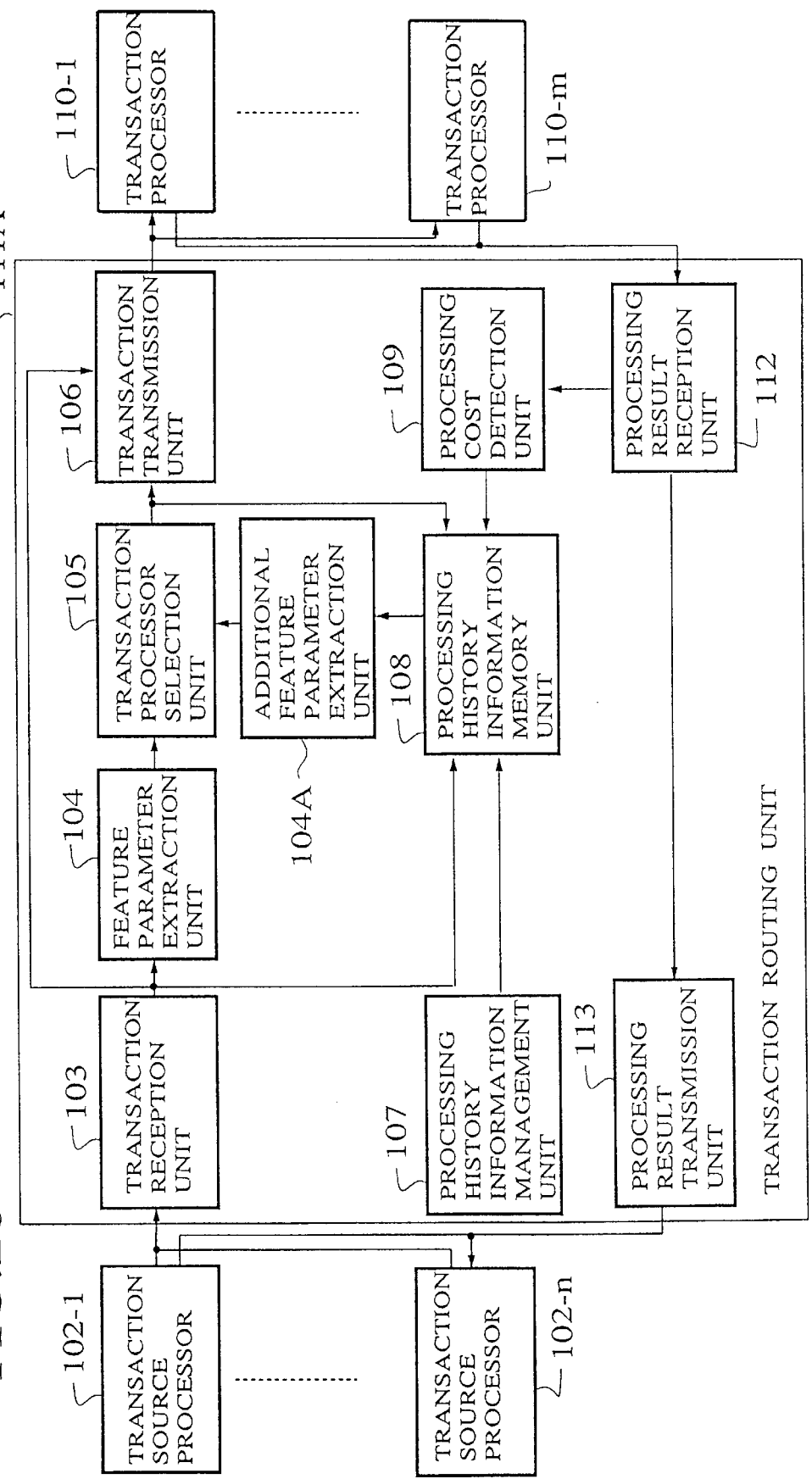
FIG. 26 is a block diagram of another possible modified configuration for the transaction routing unit of FIG. 12 incorporating the modified configuration of FIG. 24B.
Figure 27:
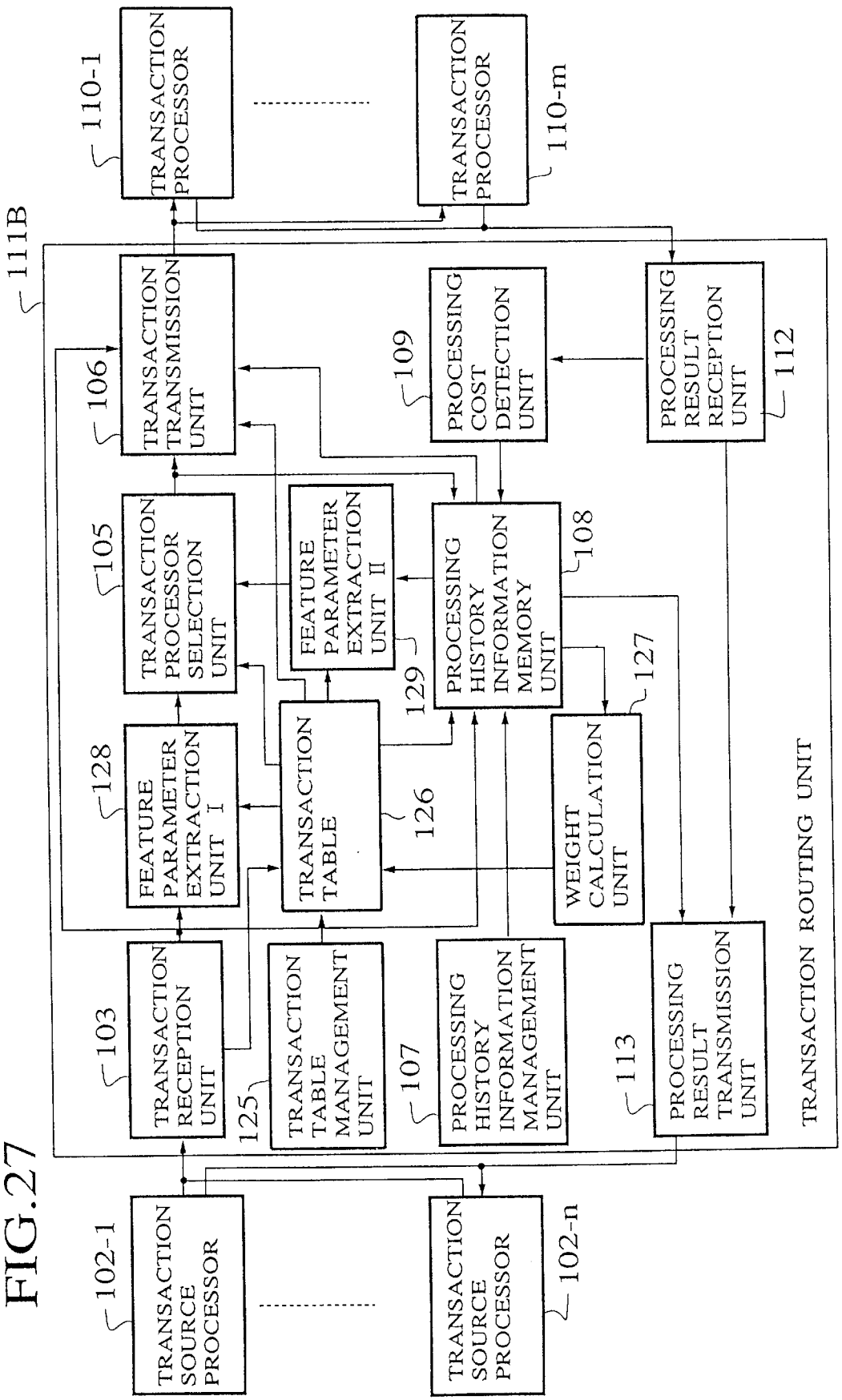
FIG. 27 is a block diagram of a further modified configuration for the transaction routing unit of FIG. 26 in a case of an application to the remote procedure call.

In this case, the system has a configuration as shown in FIG. 27, which differs from the configuration of FIG. 26 described above in that the weight calculation unit 127, the transaction table 126 and the transaction table management unit 125 are additionally provided, while the feature parameter extraction unit 104 and the additional feature parameter extraction unit 104A are renamed as the feature parameter extraction unit I 128 and the feature parameter extraction unit II 129 in the transaction routing unit 111B. Namely, in this configuration of FIG. 27, the configuration of FIG. 26 which is for the transaction routing for only one type of transaction is expanded to be capable of dealing with more than one types of transaction.

Figure 28A:
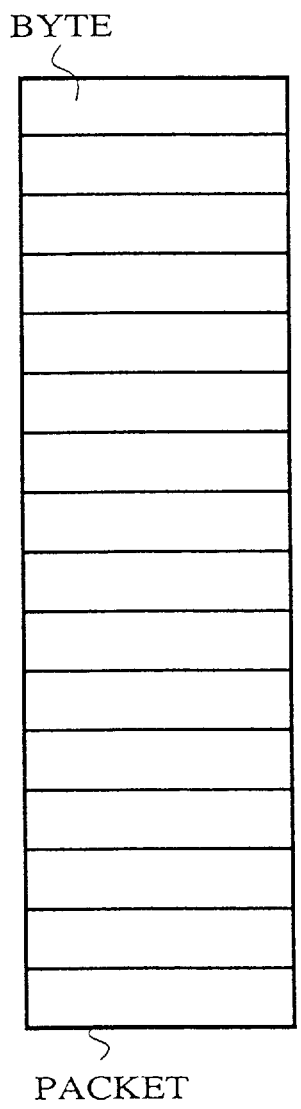
FIG. 28A is a diagrmmatic illustration of a byte sequence structure of the packet used in the configuration of FIG. 27.
Figure 28B:
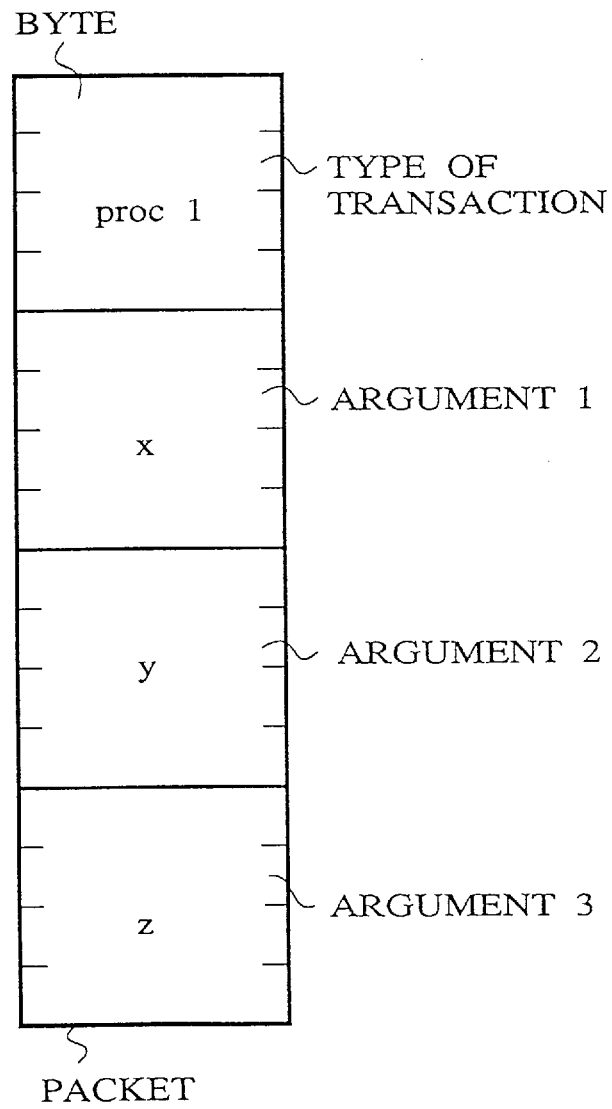
FIG. 28B is a diagrmmatic illustration of a data structure of the packet used corresponding to the byte sequence structure of FIG. 28A.

In this configuration of FIG. 27, the transaction reception unit 103 receives the transaction packet transmitted from the transaction source processor 2 through a coupling path. In a case the coupling path is provided by the ethernet, the packet arriving at the particular port of the UDP protocol is received. Here, the packet is the data having the byte sequence structure as shown in FIG. 28A, and in the transaction packet of the RPC, this byte sequence of FIG. 28A will be interpreted as the data of the structure as indicated in FIG. 28B. Namely, the top of the packet has the data indicating the type of transaction. Actually, a unique identification number corresponding to "proc1" is registered as a numerical value occupying the top 4 bytes of the packet. Thereafter, as many arguments associated with the transaction as necessary are registered. In the example of FIG. 28B, three 4 bytes length data x, y, and z are arranged there. There are many other packet structures for the RPC, and the present invention is applicable to any packet structure other than that shown in FIG. 28B.

A position of the type of transaction in the packet of the RPC is fixed, so that the transaction reception unit 103 which received the packet can extract the type of transaction from the received packet, and the transaction reception unit 103 supplies the extracted type of transaction to the transaction table 126. Here, it is also possible to provide a configuration in which the transaction reception unit 103 can receive the transaction packets arriving at a plurality of ports. In such a case, it is also possible to produce the transaction table for recording the information concerning the transactions arrived at that port for each port, such that when the packet is received, the transaction reception unit 103 supplies the type of transmission to the transaction table corresponding to the port from which this transaction has been received.

Figure 29:
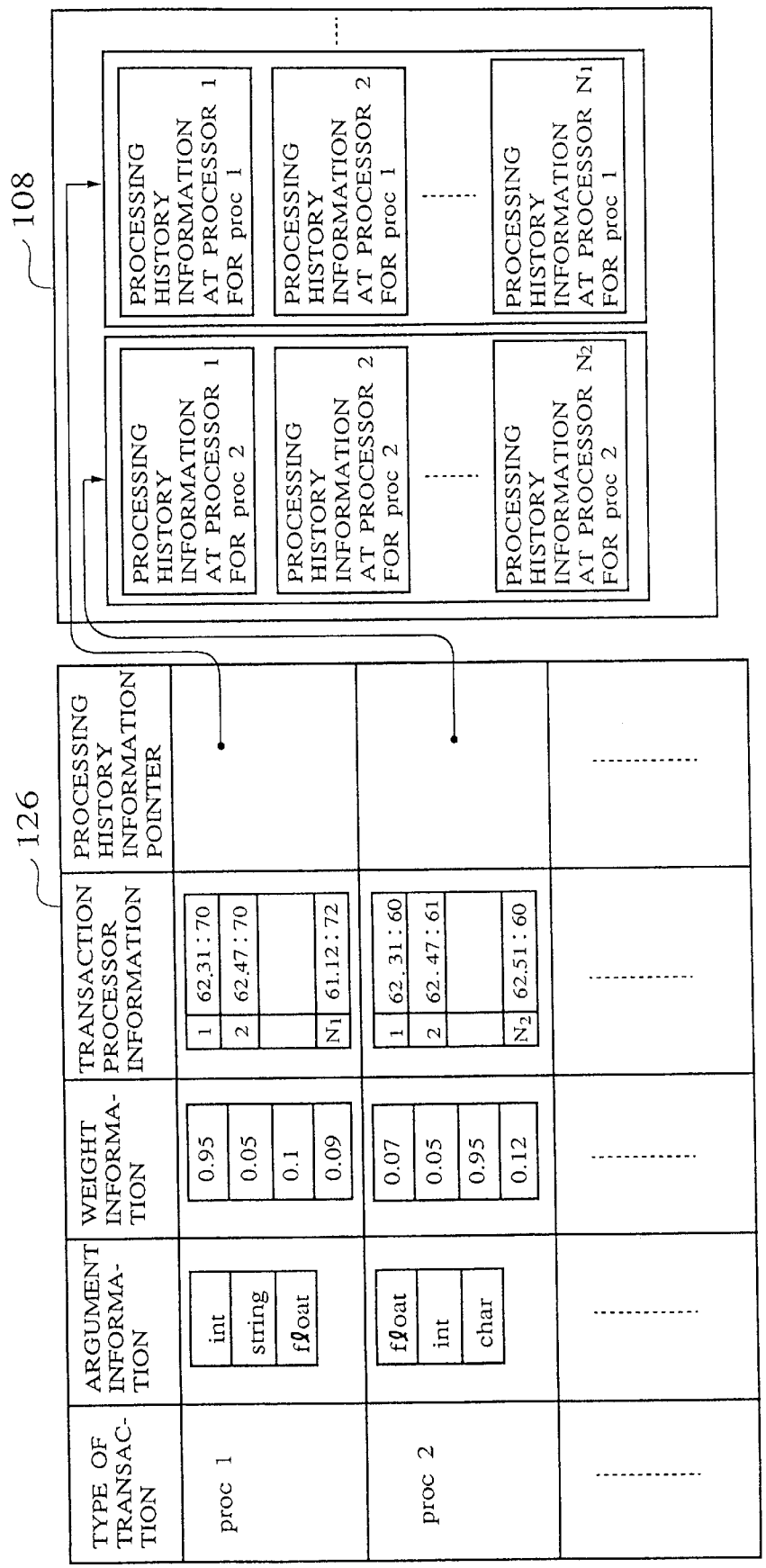
FIG. 29 is a diagrmmatic illustration of a transaction table and a processing history information memory unit in the transaction routing unit of FIG. 27.

The transaction table 126 is in a form shown in FIG. 29 in which each entry has five fields for registering the type of transaction, the argument information, the weight information, the transaction processor information, and the processing history information pointer pointing to the processing history information in the processing history information memory unit 108 in correspondence.

The type of transaction is given by a value indicating the type of transaction at the top of the transaction packet. In the example shown in FIG. 29. "proc1" and "proc2" are the values indicating the types of transaction, and actually the numerical values corresponding to these "proc1" and "proc2" are registered. The argument information registers the data types of the arguments of the transaction for each type of transaction. In the example shown in FIG. 29, the type of transaction "proc1" has three arguments, whose data types are "int" (integer type), "string" (character string type), and "float" (floating point type). Actually, an array of numerical values assigned to "int", "string", and "float" are registered.

Figures 30A, 30B, 30C, 30D, 30E, 31:
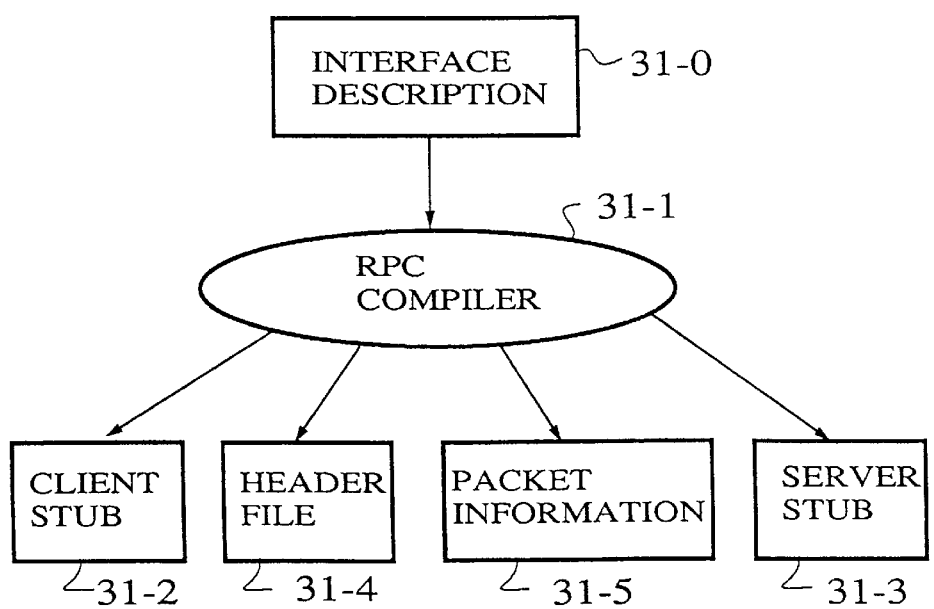
FIGS. 30A to 30E are illustrations of exemplary data types for the argument in the transaction used in the transaction routing unit of FIG. 27.
FIG. 31 is a schematic diagram for an operation of an RPC compiler used in the transaction routing unit of FIG. 27.

It is to be noted that the data types such as "int", "string", and "float" used in FIG. 29 are all in a form without any structure, but in a case of using a structural entity as indicated in FIG. 30A as an argument, the argument information is given, as shown in FIG. 30B, as a set of a numerical value for "struct" which indicates that it is a structural entity, a number of members constituting this structural entity such as "2", and numerical values for the data types of the members such as "int" and "char". Also, in a case of using an array as indicated in FIG. 30C, the argument information is given, as shown in FIG. 30D, as a set of a numerical value for "array" which indicates that it is an array, a number of elements of the array such as "10", and a numerical value for the data type of each element such as "int". It is also possible for such a structural entity or an array to have its constituent element given by a structural entity or an array.

In many RPC systems, the format of the packet to be used for the actual communication is determined from the interface description as shown in FIG. 30E. This is usually done by the program called RPC compiler, which operates as indicated in FIG. 31. Namely, the RPC compiler 31-1 takes the RPC interface description 31-0 as input, and outputs a client stub 31-2 for the purpose of transmitting the transaction in the packet format corresponding to the interface description, a server stub 31-3 for the purpose of receiving this transaction packets and a header file 31-4 describing the information commonly used by the client and the server. This RPC compiler 31-1 is provided as a program "rpcgen" in the ONC RPC, and as a program "idl" in the DCE RPC.

Figure 32:
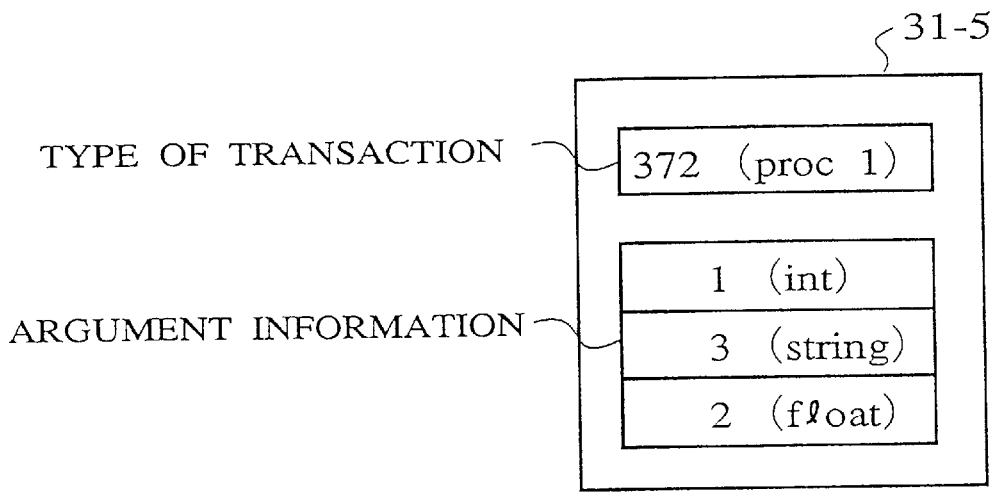
FIG. 32 is a diagrammatic illustration of a packet information obtained by the RPC compiler of FIG. 31.

In addition, in this second embodiment, the RPC compiler 31-1 also outputs a packet information 31-5 in a form shown in FIG. 32, which includes data to be registered as the type of transaction and the argument information in the transaction table 126. Namely, when the interface description shown in FIG. 30E is given, the type of transaction "proc1" and the argument information "int", "string", and "float" are generated. Here, as described above, "proc1", "int", "string", and "float" are actually given by the uniquely assigned numerical values. In the configuration of FIG. 27, the transaction table management table 125 reads this packet information, and registers the type of transaction and the argument information contained therein into the transaction table 126.

The weight information in the transaction table 126 of FIG. 29 is a set of numerical values indicating weights for the arguments of each type of transaction. This weight information indicates which element of the feature parameters is to be given more consideration in a case of predicting the transaction processor to which the transaction is to be routed, and is in a form of an array having elements in one-to-one correspondence to the elements of the feature parameters. In the example of FIG. 29, the type of transaction "proc1" has three arguments but the weight information is in a form of a vector having four elements, because the feature parameters include all the arguments as well as a numerical value in which a bit position is changed in a part of these arguments. More specifically, in this example, a numerical value in which a bit position is changed for the argument of the integer type is also included in the feature parameters, so that the weight information is in a form of a vector having four elements.

The method for extracting the feature parameters from the RPC packet, the method for changing the bit position, and the method for determining an element of the feature parameters for which the bit position changed value is to be included in the feature parameters will be described later.

The transaction processor information in the transaction table 126 of FIG. 29 enumerates the transaction processors which can process each type of transaction, which are actually expressed by the network address of the transaction processors and the port number on the transaction processors which are used at a time of transferring the transactions. In the example of FIG. 29, the first transaction processor information for "proc1" indicates that the network address of the transaction processor is 62.31 and the port number is 70.

Figure 33:
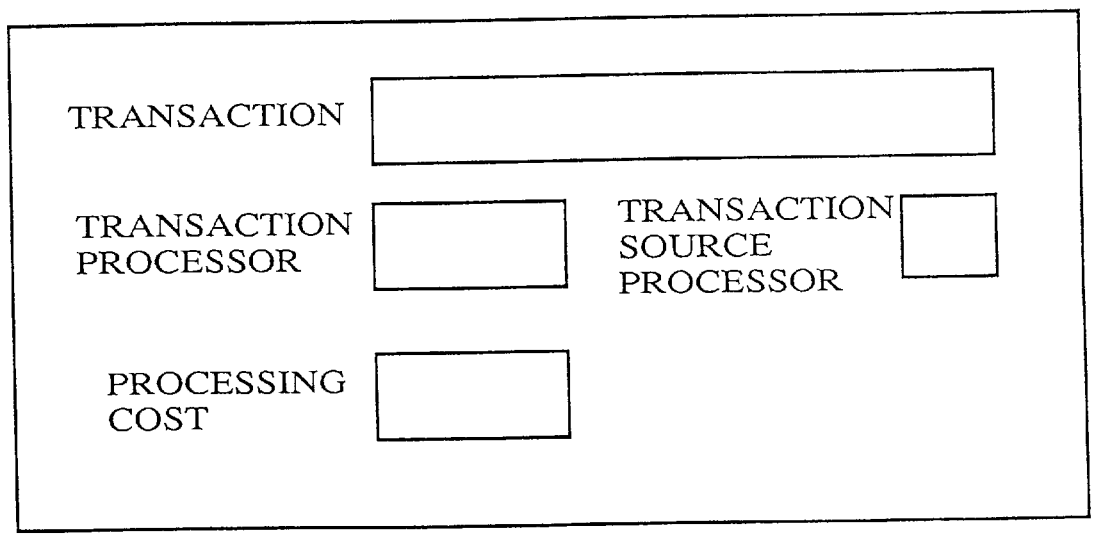
FIG. 33 is a diagrammatic illustration of a processing history information used in the transaction routing unit of FIG. 27.

The processing history information pointer in the transaction table 126 of FIG. 29 is pointing to a group of those processing history information stored in the processing history information memory unit 108 which belong to the each type of transaction. As shown in FIG. 33, each processing history information comprises a content of the transaction, the processor number of the transaction processor which processed the transaction, the processing cost (time in this example) required in processing the transaction, and an information on the transaction source processor which is necessary at a time of returning the processing result and which can be given by the network address and the port number for example. Here, rather than recording the transaction as it is, the feature parameters extracted from the transaction or only the elements of the feature parameters having large weights which significantly contributes to the prediction of the transaction processor may be recorded if desired.

Figure 34:
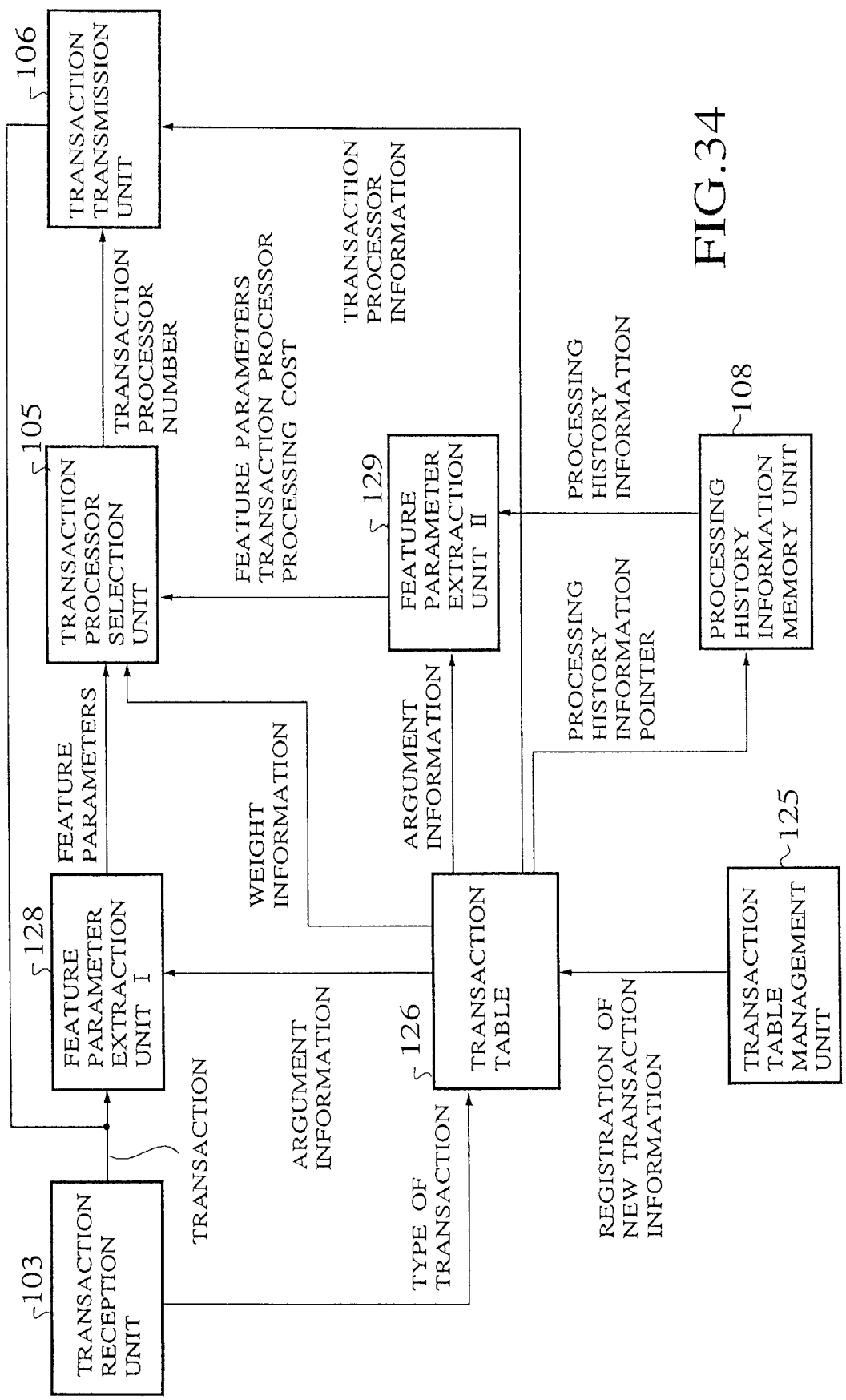
FIG. 34 is a block diagram of a part of the transaction routing unit of FIG. 27 for showing flow of information among elements.

FIG. 34 shows the flow of the information centered around the transaction table 126 in the configuration of FIG. 27. In this FIG. 34, only those modules in the configuration of FIG. 27 which contribute to the determination of the transaction processor are selectively shown, and the information exchanged among these modules is indicated.

The information recorded in the transaction table 126 is generated as the packet information by the RPC compiler of FIG. 31. This packet information is generated in a form of the file, read by the transaction table management unit 125, and registered in the transaction table 126. Here, the initial values of the weight information in the transaction table 126 may be given by a programmer or a system manager, or set to a particular initial value such as 0.9 for all the elements. The transaction processor information may be given by a programmer or a system manager, or registered by a name server which checks the transaction processors which can process the transaction. It is also possible to use a scheme in which each transaction processor 110 reports the types of transaction that can be processed thereon to the transaction routing unit and the transaction processor information is registered into the transaction table 126 according to this report. The initial value of the processing history information pointer in the transaction table 126 is set to point any processing history information of the relevant type of transaction still left in the processing history information memory unit 108, or to a set of empty processing history information when there is none left in the processing history information memory unit 108.

When the transaction reception unit 103 received the RPC packet of the transaction from the transaction source processor 102, this transaction packet is supplied to the feature parameter extraction unit I 128 and the transaction transmission unit 106 of the next stage. Also, the transaction and the transaction source processor which generated this transaction are registered in the processing history information memory unit 108 as a new processing history information. In addition, the information indicating the type of transaction which is present at the top of the received transaction packet is extracted and supplied to the transaction table 126.

The transaction table 126 is looked up by using the type of transaction received from the transaction reception unit 103 as a key, and as a result, the argument information is supplied to the feature parameter extraction unit I 128 and the feature parameter extraction unit II 129, the weight information is supplied to the transaction processor selection unit 105, the transaction processor information is supplied to the transaction transmission unit 106, and the processing history information pointer is supplied to the processing history information memory unit 108.

The feature parameter extraction unit I 128 which received the transaction packet and the argument information from the transaction reception unit 103 and the transaction table 126, respectively, then extracts the feature parameters of the received transaction and supplies them to the transaction processor selection unit 105.

Figure 35:
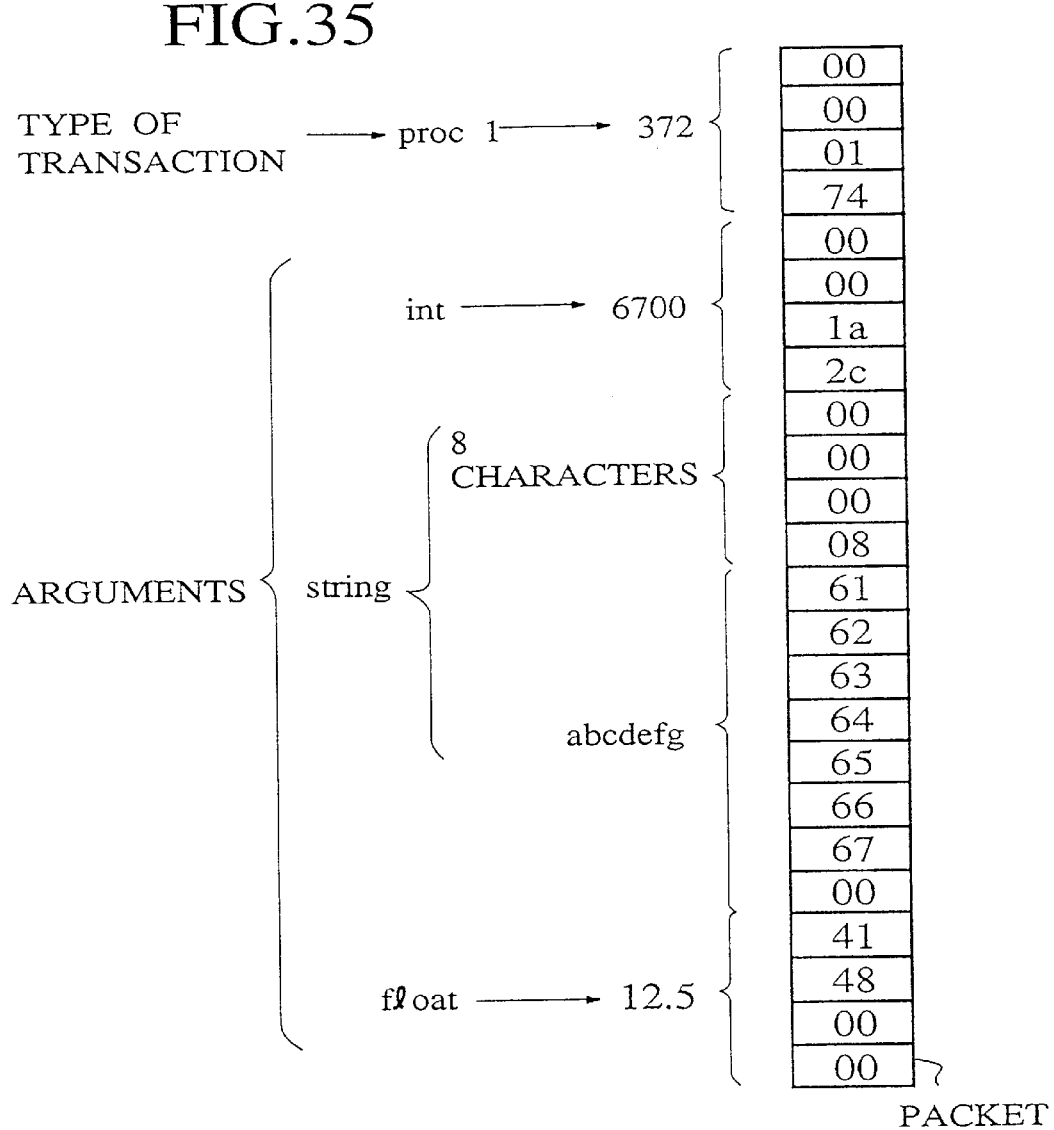
FIG. 35 is a diagram of a byte sequence for the transaction packet used in the transaction routing unit of FIG. 27.

Here, the transaction packet is in a form of the byte sequence as shown in FIG. 35, which has the data indicating the type of transaction at its top. For example, when the top one word (4 bytes) indicates the type of transaction, the numerical value "372" in decimal ("174" in hexadecimal) indicates the type of transaction, where "372" indicates "proc1" in this example. After the data indicating the type of transaction, the arguments associated with the transaction are indicated. In a case of "proc1", as also given as the argument information in the transaction table 126, the first argument is the integer type ("int"), the second argument is the character string type ("string"), and the third argument is the real number type ("float").

There are many manners for expressing each of these data types on the network packet, and the present invention is applicable to any of these manners. In this example, the integer and the real number are expressed as 4 byte data, while the character string is expressed by 4 byte integer indicating the character string length followed by 1 byte indicating a series of characters. For instance, in FIG. 35, the first argument is the integer value "6700", the second argument is the character string "abcdefg", and the third argument is the real number value "12.5".

Figure 36:
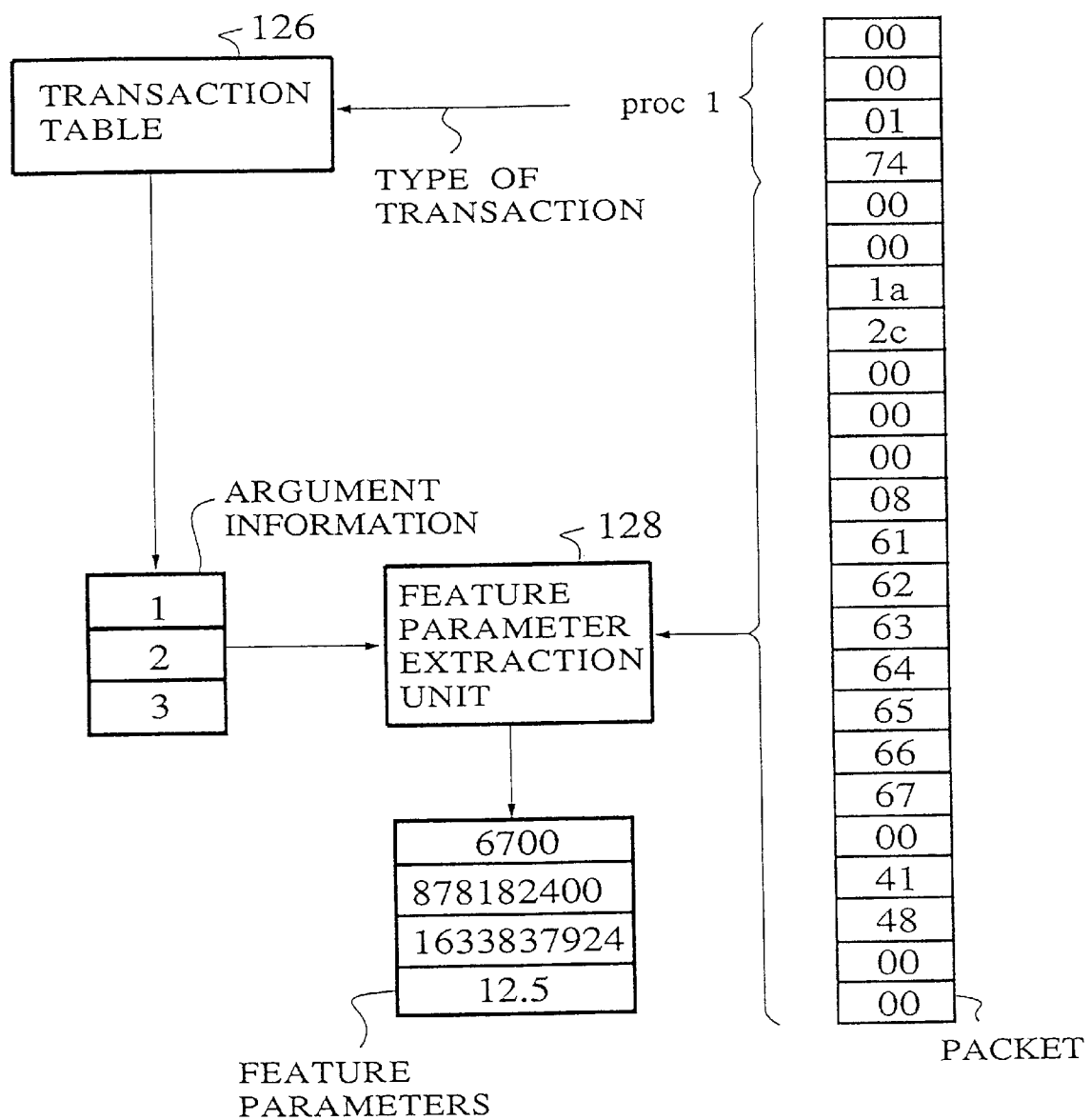
FIG. 36 is a diagram for showing a manner of extracting feature parameters from the byte sequence of FIG. 35.

The argument information which is another input data of the feature parameter extraction unit I 128 is an array indicating the data types of the arguments for each type of transaction. This argument information is an example of the information on the data structure of the transaction, and with reference to this information, the basic data units are extracted from the transaction and set as the feature parameters. For instance, as indicated in FIG. 36, when the data types are coded such that the integer type is represented by a value 1, the real number type is represented by a value 2, and the character string type is represented by a value 3, then the argument information of "proc1" is in a form of a vector (or array) having three values of 1, 3, and 2 in this order.

The feature parameter extraction unit I 128 which received these transaction packet and argument information then extracts the feature parameters by the operation according to the flow chart of FIG. 37, and supplies it to the transaction processor selection unit 105. Namely, the feature parameter extraction unit I 128 takes the argument portion of the transaction packet P and the argument information T as its inputs (step 3701), and unless the argument information T is empty (step 3702), the feature parameter extraction unit I 128 extracts the argument portion of the transaction packet corresponding to each element t of the argument information sequentially (step 3703). Then, according to the data type of the element t of the argument information (step 3704), the feature parameter extraction unit I 128 obtains and outputs the corresponding feature parameter values sequentially as follows.

Namely, in a case the data type of the argument registered in the argument information is the integer type (represented by a value t=1), the top 4 byte data I is extracted from the argument portion of the transaction packet and converted into the integer (step 3705), and then this data I is outputted as the feature parameter value given by the one word integer value as it is (step 3706). Although not shown in FIG. 37, the character type and the enumeration type arguments are similarly handled by extracting the data of a necessary number of bytes, reading it as the integer value, and outputting that integer value as the feature parameter.

In a case of the real number type (represented by a value t=2), the top 4 byte data F is extracted from the argument portion of the transaction packet and interpreted as the real number value (floating point number) of the single precision (step 3708). and then this value of the data F is outputted as the feature parameter value (step 3709). The same procedure can also be used for the case of the real number value of the double precision.

In a case of the character string type (represented by a value t=3). several schemes can be used. In the example of FIG. 37, the top 4 byte data L is extracted from the argument portion of the transaction packet and converted into the integer (step 3710). Then, the top L byte data S is extracted from the argument portion of the transaction packet (step 3711) while supplementing 0 or blank space when it is less than 4 bytes, and the top 4 byte data I is extracted from the L byte data S and converted into the integer (step 3712). Then, this data I is outputted as the feature parameter value given by the one word integer value as it is (step 3713).

In this manner, the character string is cut off at a predetermined length, and read as if it is a numerical value so as to obtain the feature parameter. Here, the cutting off the character string is done by a manner of extracting a prescribed length from the top of the character string, or a manner of extracting a prescribed length from the end of the character string, or a manner of extracting a prescribed length from the top and the end of the character string and combining them. Moreover, there is also a scheme for including the length of the character string as the feature parameters in addition to the extracted character string. Furthermore, there is also a scheme in which the character string is supplied to the transaction processor selection unit 105 as it is as the feature parameter instead of setting it into the numerical value, such that the selection of the transaction processor can be made by comparing this feature parameter in a dictionary-like order.

Although not shown in FIG. 37, the data type used in the argument information also includes the composite type such as an array or a structural entity. In a case of the array of a fixed length, the simplest scheme is to extract the feature parameters of all of its elements and set them as the feature parameters of the array. In a case of the array of a fixed length or a variable length, just as in a case of the character string type, a prescribed number of them from the top, or a prescribed number of them from the end, or a combination of a prescribed number of them from the top and the end can be used as the feature parameters. Moreover, in a case of the array of a variable length, it is also possible to include the size of the array as the feature parameters. In a case of a structural entity, the feature parameters of the constituting elements are sequentially extracted and they are set as the feature parameters of the structural entity. The feature parameters can be obtained in the similar manner even in a case of the combinations of the above described cases such as those of the array of structural entities or the array of character strings.

In this second embodiment, the value in which a bit position is permutate in some element of the feature parameters is also included in the feature parameters. This inclusion of a bit position inverted value in the feature parameters is effective when there is a correlative relationship between the upper bit values of the argument of the transaction and the optimum transaction processor for processing this transaction, as it becomes possible to make the feature parameter values of the transactions which are preferably processed by the same transaction processor to be close to each other, and therefore the judgment at the transaction processor selection unit 105 can be strengthened by utilizing this fact. Also, the bit position inverted value in the feature parameters of the argument having a correlative relationship with the optimum transaction processor is going to be the random feature parameter which has no correlative relationship with the optimum transaction processor. On the contrary, in a case the bit position inverted value in the feature has a correlative relationship with the optimum transaction processor, the value before the bit position inversion is going to be the random feature parameter which has no correlative relationship with the optimum transaction processor.

Consequently, by the inclusion of a bit position inverted value in the feature parameters, the random component which can be a reference in comparing the correlative relationship between each feature parameter value and the optimum transaction processor is going to be always present in the feature parameters. Then, by the presence of such a random component, it becomes possible to eliminate the situation in which it is difficult to judge if there is a correlative relationship between each element of the feature parameters and the optimum transaction processor uniformly, or if there is no correlative relationship between all the elements of the feature parameters and the optimum transaction processor uniformly.

Figure 38:
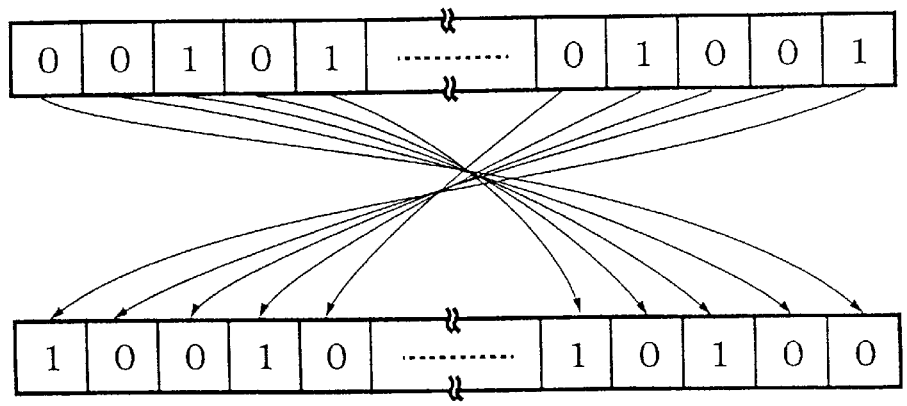
FIG. 38 is a diagram for showing a manner of reversing bit position in the feature parameter.

As for a scheme for inverting the bit position, there are many possible schemes, and any such schemes can be utilized in the present invention. The most promising scheme for inverting the bit position is a bit reverse scheme for reversing the bit position as indicated in FIG. 38. Namely, the feature parameter value is obtained by reversing the upper bits and the lower bits of the feature parameter, and reading the resulting bit sequence as if it is a numerical value.

As a scheme for determining the argument whose bit position inverted value should be included in the feature parameters, there are a scheme for including the bit position inverted value of every element of the feature parameters, a scheme for including the bit position inverted values of those elements of the feature parameters which are in a prescribed particular data type, and a scheme for including the bit position inverted values of those arguments which are specified by a programmer or a system manager.

In the example of FIG. 37, a scheme for including the bit position reversed value for the arguments of the integer type in the feature parameters is used. Thus, in a case the data type of the argument registered in the argument information is the integer type (represented by a value t=1), after the step 3706, the bit position reversed value for the data I is also outputted as the feature parameter value (step 3707).

The feature parameter extraction unit II 129 which receives the argument information and the processing history information from the transaction table 126 and the processing history information memory unit 108, respectively, carries out the feature parameter extraction by the same procedure as the feature parameter extraction unit I 128 described above. The processing history information memory unit 108 sequentially transmits a plurality of processing history information belonging to the particular type of transaction specified by the processing history information pointer received from the transaction table 126 to the feature parameter extraction unit II 129. Then, the feature parameter extraction unit II 129 which received the processing history information extracts the feature parameters from the transaction recorded therein by the same scheme as the feature parameter extraction unit I 128, and supplies it to the transaction processor selection unit 105. At this point, the transaction processors and the processing costs recorded in the processing history information for that transaction are also supplied to the transaction processor selection unit 105.

Figure 39:
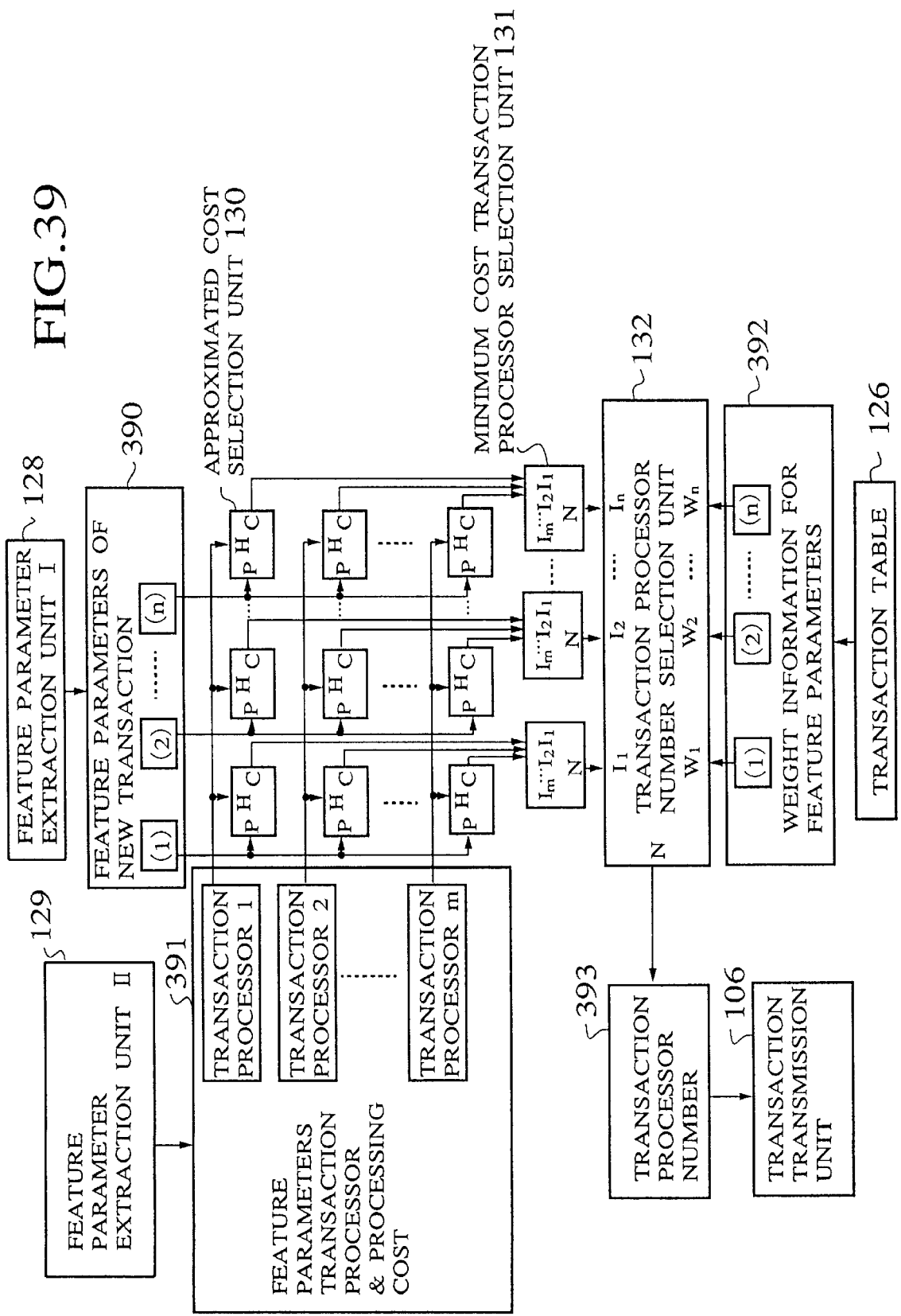
FIG. 39 is a block diagram of a transaction processor selection unit in the transaction routing unit of FIG. 27.

The transaction processor selection unit 105 has a configuration as shown in FIG. 39. This transaction processor selection unit 105 receives the feature parameters of the newly arrived transaction 390 from the feature parameter extraction unit I 128, and the feature parameters, the transaction processor, and the processing cost 391 taken out from the processing history information having the same type of transaction that had been processed in the past sequentially from the feature parameter extraction unit II 129, and supplies them to the respective approximated cost selection units 130.

For one of a plurality of feature parameters and for one of a plurality of transaction processors which had processed the transaction of the same type in the past, each approximated cost selection unit 130 selects out the processing cost of one of the processing history information processed by that transaction processor in the past for which the corresponding feature parameter value is closest. Namely, the approximated cost selection unit 130 for the i-th feature parameter and the j-th transaction processor carries out the operation according to the flow chart of FIG. 40 as follows.

First, the feature parameter number i and the transaction processor number j of this approximate cost selection unit 130 set out (step 401). Then, the i-th feature parameter value of the feature parameters of the newly arrived transaction is set to be P while a set of the processing history information for transactions of the same type which had been processed in the past by the j-th transaction processor is set to be H (step 402). Then, the approximate cost C and the difference "diff" are initialized to 0 and ∞, respectively (step 403). Then, unless the set H becomes empty (step 404) in which case the current value of the approximated cost C is outputted (step 405), each processing history information h of the set H is taken out (step 406), and an absolute value of the difference between P and the i-th feature parameter value of the processing history information h taken out by the feature parameter extraction unit II 129 is obtained and set as "tmp" (step 407). Then, when the obtained value "tmp" is smaller than the difference "diff" (step 408), this value "tmp" is set as a new value for the difference "diff", while the approximated cost C is changed to the processing cost of the processing history information h (step 409). Then, either when "tmp" is not smaller than the difference "diff" at the step 408 or after the step 409, the steps 404 and below are repeated for the next element h of the set H.

In this manner, the processing cost of the processing history information for which the resulting difference is the smallest is output as the approximated cost C. In this scheme of FIG. 40, when there is no transaction which had been processed by the transaction processor, the processing cost is set to be 0.

Figure 40:
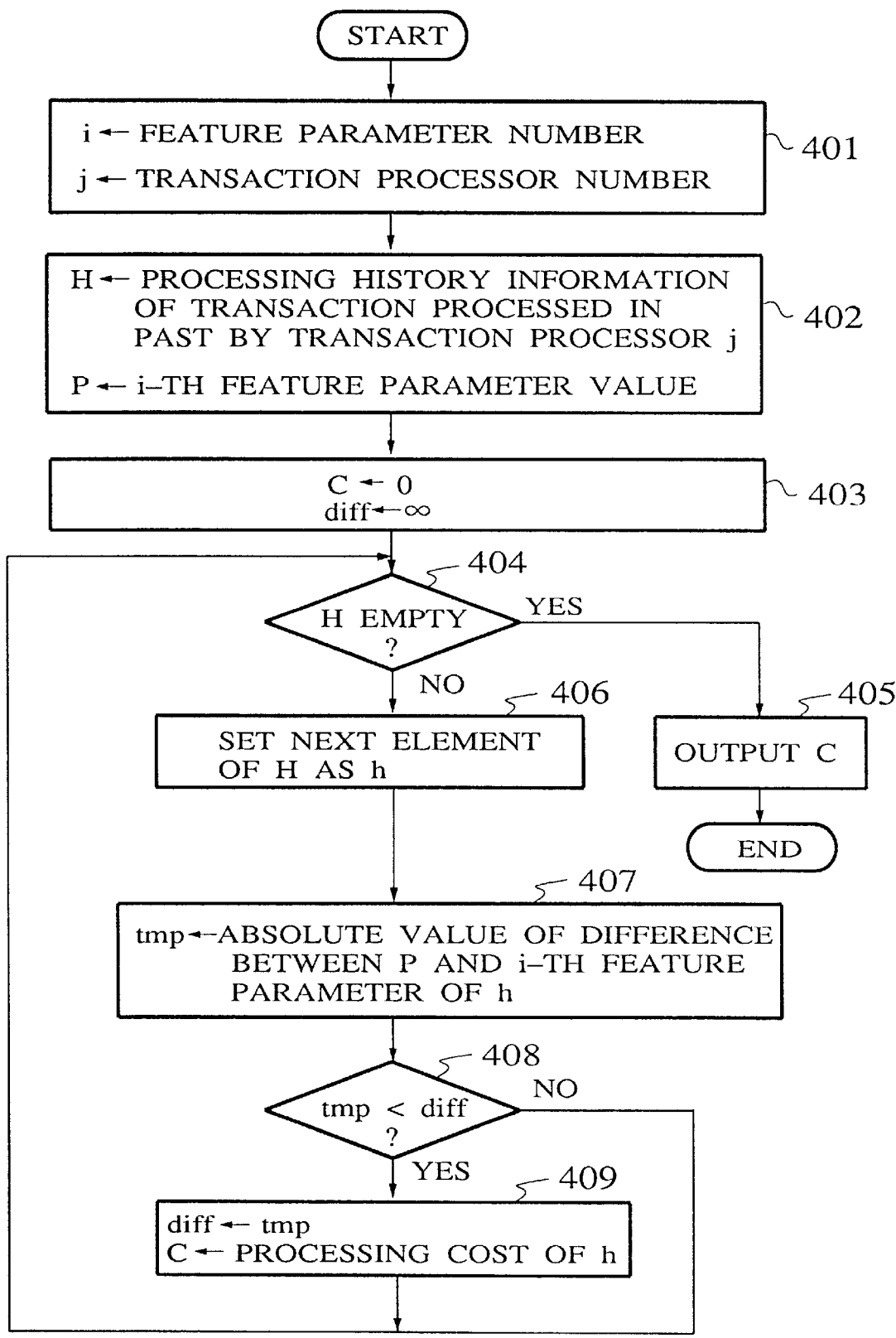
FIG. 40 is a flow chart for the operation of an approximated cost selection unit in the transaction processor selection unit of FIG. 39.
Figure 41:
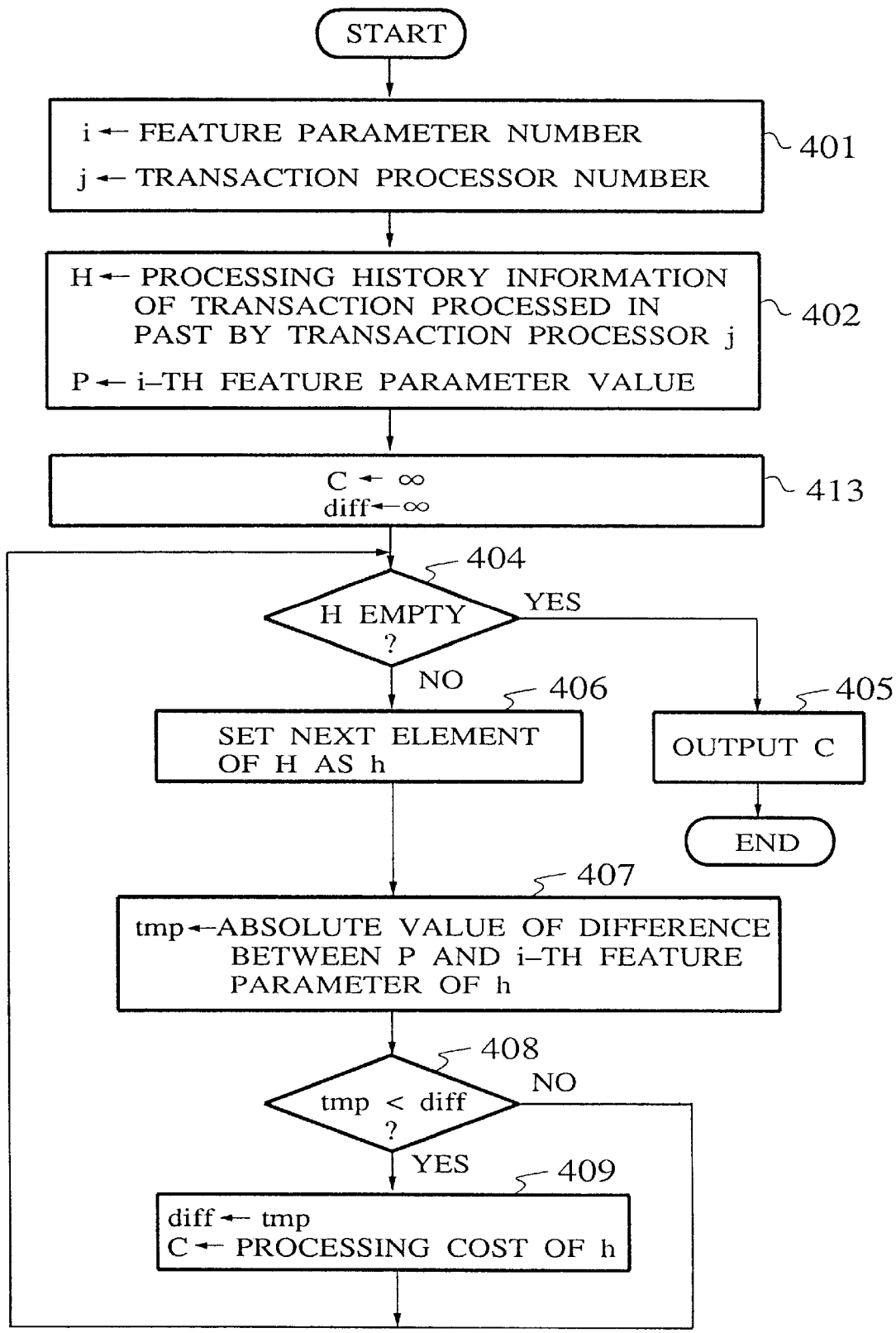
FIG. 41 is a flow chart for the alterntive operation of an approximated cost selection unit in the transaction processor selection unit of FIG. 39.

On the other hand, the approximated cost selection unit 130 for the i-th feature parameter and the j-th transaction processor may carry out the operation according to the flow chart of FIG. 41, where there is no transaction which had been processed by the transaction processor, the processing cost is set to be ∞ at the step 413 replacing the step 403 in FIG. 40. Thus, when the processing cost is 0, the transaction is routed to that transaction processor at the highest priority, whereas when the processing cost is ∞, the transaction is not going to be routed to that transaction processor. In the scheme of FIG. 40 or FIG. 41, the comparison of the feature parameter values is made arithmetically. It is also possible to utilize the Hamming distance in this comparison. It is also possible for the character string that the comparison based on a dictionally-like order can be used. It is further possible to utilize a plurality of the above described schemes in parallel.

Apart from the above described scheme in which the transaction processor selection unit 105 uses all the feature parameters in selecting the optimum transaction processor, it is also possible to use a scheme for using only a predetermined number of feature parameters from the top alone, or a scheme for using a predetermined number of feature parameters which have relatively heavier weights alone, or a scheme for using the feature parameters having weights heavier than a prescribed value alone.

The approximated costs obtained by the approximated cost selection units 130 are collected at the minimum cost transaction processor selection unit 131 for each feature parameter separately. Each minimum cost transaction processor selection unit 131 then selects the transaction processor which gives the lowest approximated cost among the collected approximated costs, and outputs the selected transaction processor as the minimum cost transaction processor N for each feature parameter.

Figure 42:
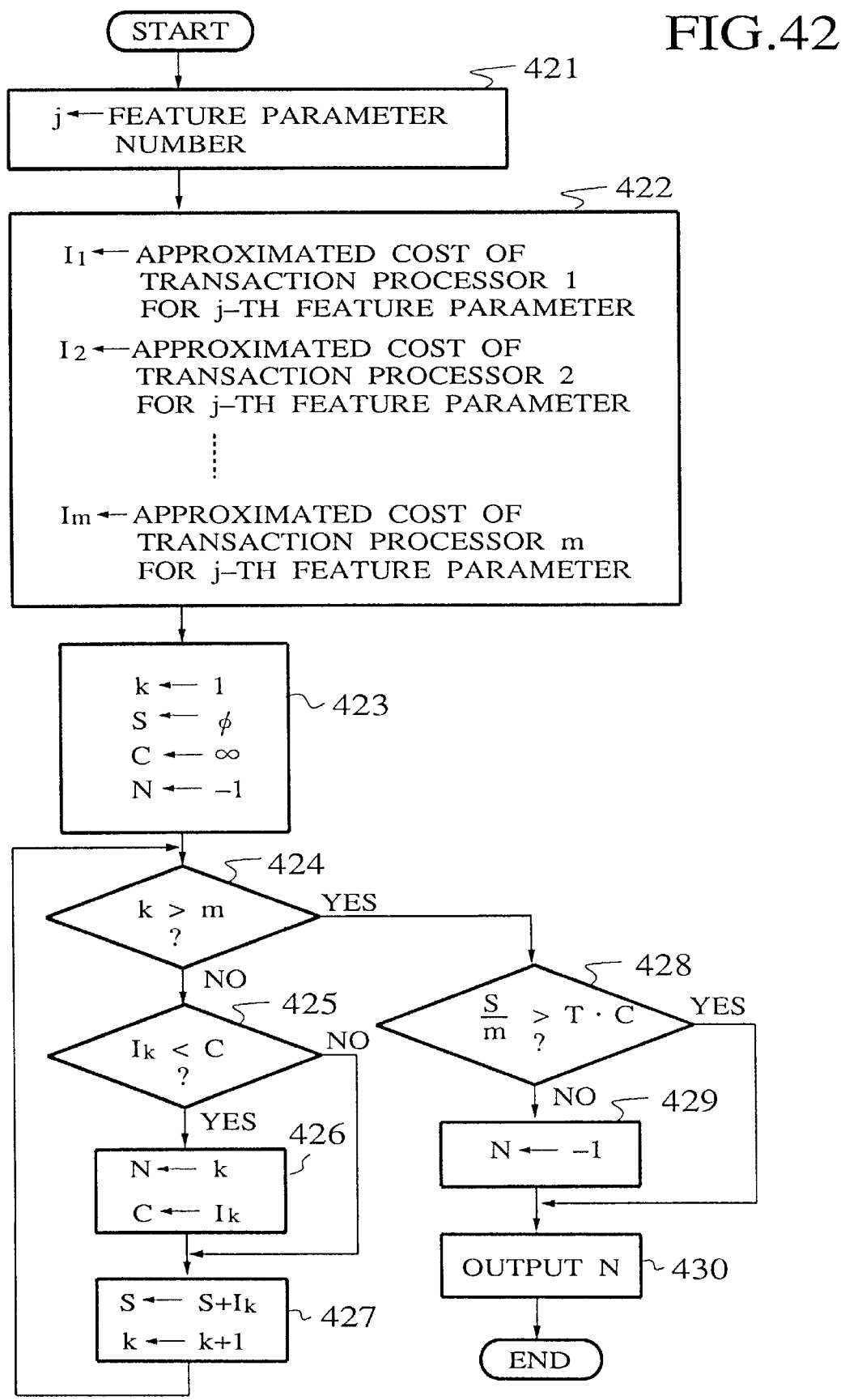
FIG. 42 is a flow chart for the operation of a minimum cost transaction processor selection unit in the transaction processor selection unit of FIG. 39.

Here, the minimum cost transaction processor selection unit 131 operates according to the flow chart of FIG. 42 as follows. Namely, the feature parameter number j is set out first (step 421). and the approximated costs I1 to Im of the transaction processors No. 1 to No. m for the j-th feature parameter are entered from the approximated cost selection units 130 (step 422). Then, the variables k, S, C, and N are initialized to 1, φ, ∞, and −1, respectively (step 423). and if k>m is determined (step 424). If this is not the case, next if Ik<C is determined (step 425). If this is the case, N and C are updated to k and Ik, respectively (step 426), whereas otherwise N and C are left unchanged. In either case, next S and k are updated to S+Ik and k+1, respectively (step 427) and the steps 424 and below are repeated. On the other hand, when k>m at the step 424, if S/m>T·C is determined (step 428), and if this is not the case, N is updated to −1, whereas otherwise N is left unchanged. In either case, N is then outputted (step 430) and the process terminates.

In this manner, the transaction processor number which gives the minimum approximated cost is selected out at the steps 424 to 427, while whether the minimum approximated cost is the significant one or not is judged at the steps 428 to 430. Namely, when the approximated cost supplied from the approximated cost selection unit 130 for the k-th transaction processor to the minimum cost transaction processor selection unit 131 for the j-th feature parameter is set to be Ik, the steps 424 to 427 select out the lowest cost among the approximated costs I1 to Im for all the transaction processors No. 1 to No. m, and the transaction processor number of the transaction processor which gives that lowest cost is outputted as the candidate transaction processor number N.

Then, according to whether the minimum approximated cost is significantly lower than the other approximated costs or not, the steps 428 to 430 judge whether the minimality of this approximated cost is significant or not. To this end, the sum S of all the approximated costs I1 to Im is obtained at the step 427, and an average value S/m obtained by dividing this sum S by the number of transaction processors m is compared with the minimum approximated cost C of the candidate transaction processor N multiplied by a prescribed constant T (such as 1.1) at the step 428. When the average value S/m is greater, the candidate transaction processor N is outputted as the minimum cost transaction processor for the j-th feature parameter, whereas otherwise the minimality of the minimum approximated cost C of the candidate transaction processor N is judged as insignificant, and the transaction processor number −1 is outputted to indicate that no transaction processor is selected.

Then, according to the candidate transaction processor selected for each feature parameter by the minimum cost transaction processor selection unit 131 in this manner and the weight information for each feature parameter supplied from the transaction table 126, the transaction processor number selection unit 132 selects out the transaction processor number to which the transaction should be routed.

Figure 43:
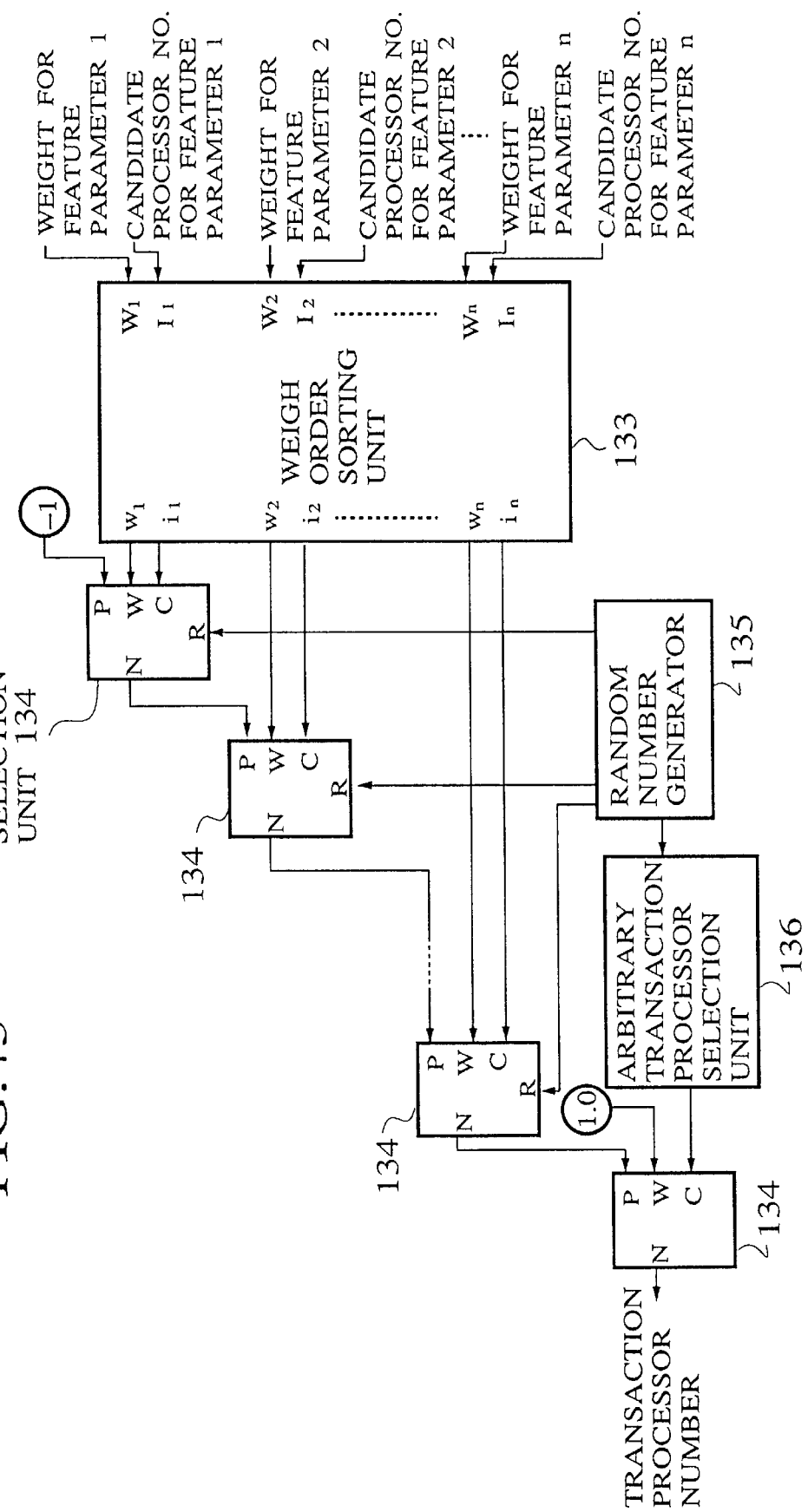
FIG. 43 is a block diagram of a transaction processor number selection unit in the transaction processor selection unit of FIG. 39.

Here, the transaction processor number selection unit 132 has a configuration as shown in FIG. 43, in which the weight order sorting unit 133 rearrange the sets of the candidate transaction processor for each feature parameter and the weight for each feature parameter in an order of the heaviness of the weight, and the rearranged sets are sequentially supplied to the probabilistic selection units 134 in this order, which select the optimum transaction processor number.

Figure 44:
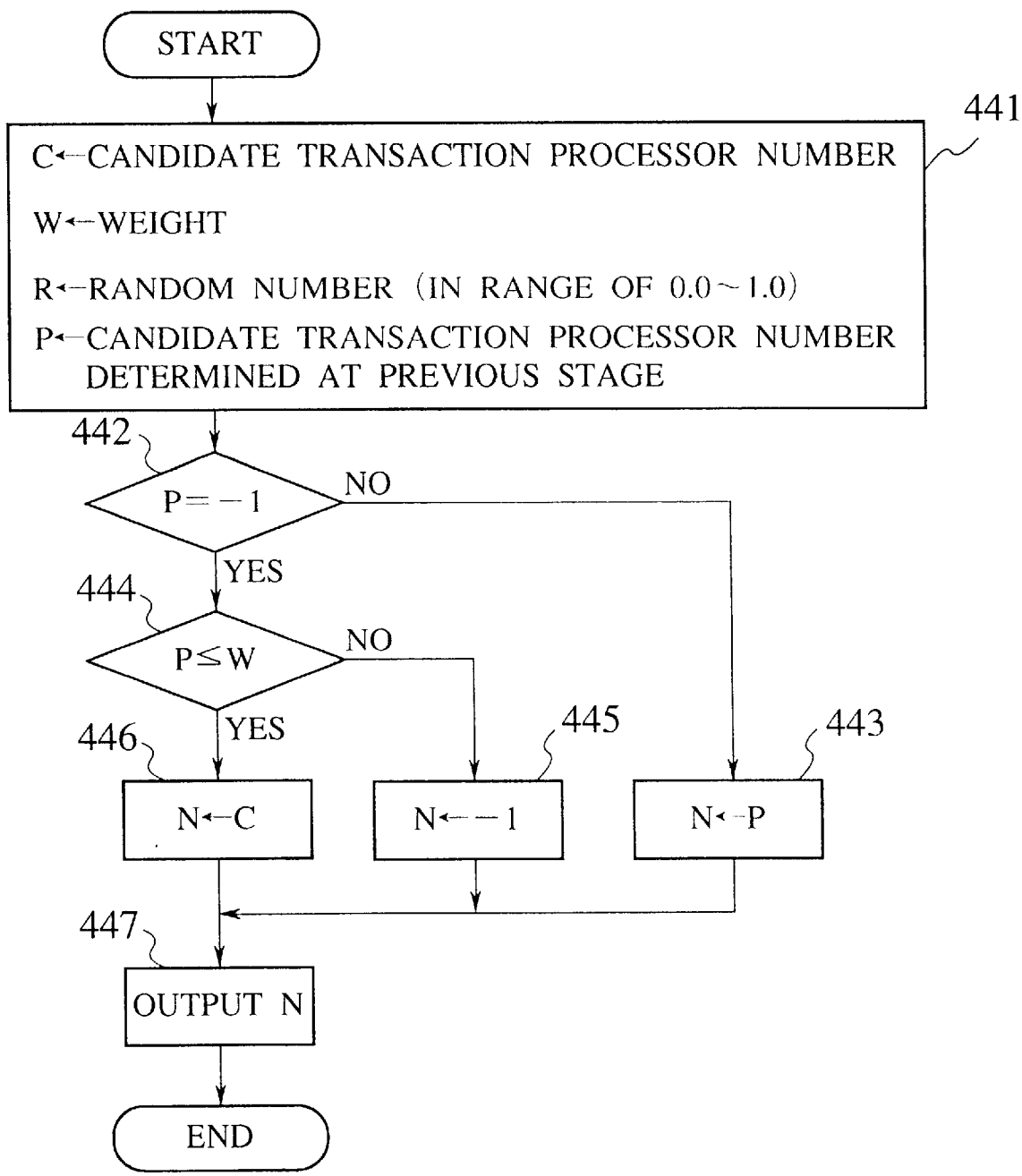
FIG. 44 is a flow chart for the operation of a probabilistic selection unit in the transaction processor number selection unit of FIG. 43.

Each probabilistic selection unit 134 operates according to the flow chart of FIG. 44, in which the candidate transaction processor number C for one feature parameter, the weight W for the same one feature parameter, a random number R in a range between 0.0 to 1.0 generated by the random number generator 135, and the transaction processor number P selected by the probabilistic selection unit 134 of the previous stage are entered as inputs (step 441). Here, the uppermost probabilistic selection unit 134 is given the value −1 for P to indicate that no transaction processor has been selected. Then, if P=−1 is determined (step 442), and if this is not the case N is updated to P (step 443), whereas otherwise if R≦W is determined (step 444). If this is not the case N is updated to −1 (step 445), whereas otherwise N is updated to C. In any case N is then outputted (step 447).

In other words, when the transaction processor number is selected at the previous stage, this transaction processor number is outputted as N, and when this is not the case and the random number R is smaller than the weight W, the candidate transaction processor number C is outputted as N, whereas when both of these are not the case, the value −1 is outputted as N to indicate that no transaction processor is selected. The lowermost probabilistic selection unit 134 uses the value 1.0 as the weight W and the arbitrary transaction processor number selected by the arbitrary transaction processor selection unit 136 according to the random number generated by the random number generator 135 as the candidate transaction processor number C in order to deal with a case in which no transaction processor is selected for all the feature parameters.

The arbitrary transaction processor selection unit 136 functions to select the arbitrary transaction processor in a case no transaction processor is selected by any probabilistic selection unit 134 for any feature parameter. In the configuration of FIG. 43, the arbitrary transaction processor selection unit 136 selects the arbitrary transaction processor by using the random number, so that it is going to be a random routing. It is also possible for the arbitrary transaction processor selection unit 136 to predicts the load of each transaction processor according to the bias of the transaction processors routed up to that moment, and gives a higher priority to a selection of the transaction processor predicted to have a lower load, that is the transaction processor to which the lesser number of transactions had been routed in the past or the transaction processor to which the lesser number of transactions are going to be routed currently. It is also possible for the arbitrary transaction processor selection unit 136 to get the load state of each transaction processor and gives the higher priority to a selection of the transaction processor with a lower load.

The transaction processor number selected in this manner is then supplied to the transaction transmission unit 106. Then, the transaction transmission unit 106 looks up the transaction processor information supplied from the transaction table 126 by using the supplied transaction processor number to pick up the optimum transaction processor, and transmits the transaction supplied from the transaction reception unit 103 to the optimum transaction processor. At the same time, the optimum transaction processor to which the transaction is transmitted is registered in the processing history information for that transaction stored in the processing history information memory unit 108.

The transaction routed to the transaction processor in this manner is then processed by that transaction processor, and the processing result is returned to the transaction routing unit 111. This processing result is received by the processing result reception unit 112, and supplied to the processing cost detection unit 109 and the processing result transmission unit 113.

The processing cost detection unit 109 takes out the processing history information corresponding to the supplied processing result from the processing history information memory unit 108 and records the processing cost. Here, the processing cost is given by the time required in processing the transaction. For this reason, the transaction transmission unit 106 records the time of the timing for transmitting the transaction into the processing cost field of the processing history information for that transaction, and then the processing cost detection unit 109 calculates the time different between the time at which the processing result is received and the time recorded in the processing cost field of the processing history information, and enters this time difference as the processing cost in the processing cost field of the processing history information. Here, instead of using the processing time as the processing cost, the processing cost may be returned from the transaction processor 110 along with the processing result. In this case, any desired data can be used as the processing cost at the transaction processor 110. For example, the number of disk access operations, the number of accesses to the data of the other nodes, the number of waits for the lock, etc. required during the processing can be used as the processing cost.

Apart from the scheme in which the processing result is relayed by the transaction routing unit in returning the processing result to the transaction source processor, it is also possible to use a scheme in which the processing result is directly returned from the transaction processor to the transaction source processor, while the transaction routing unit monitors the communication path between them to detect the processing time by detecting the packet for the processing result.

In this second embodiment, the correspondence between the transaction transmitted to the transaction processor and its processing result is determined by looking up the processing history information. However, this scheme has a drawback in that it is impossible to carry out the multiplexed processing by routing a plurality of packets simultaneously to the same transaction processor. In order to enable such a multiplexed processing, the transaction packet can be given a unique identification number as indicated in FIG. 45A, while the transaction processor returns the processing result by attaching the same identification number as given in the processed transaction as indicated in FIG. 45B. By means of this unique identification number, even when a plurality of transactions are routed simultaneously to the same transaction processor, it becomes possible to make a correspondence between the transaction recorded in the processing history information and the processing result.

Apart from this scheme for distinguishing the transactions at the same transaction processor by means of the identification numbers, it is also possible to distinguish the transactions by using a scheme in which the communication channels connecting the transaction routing unit and the transaction processors are logically multiplexed and the different communication channels are used the transactions routed simultaneously to the same transaction processor.

Figure 46:
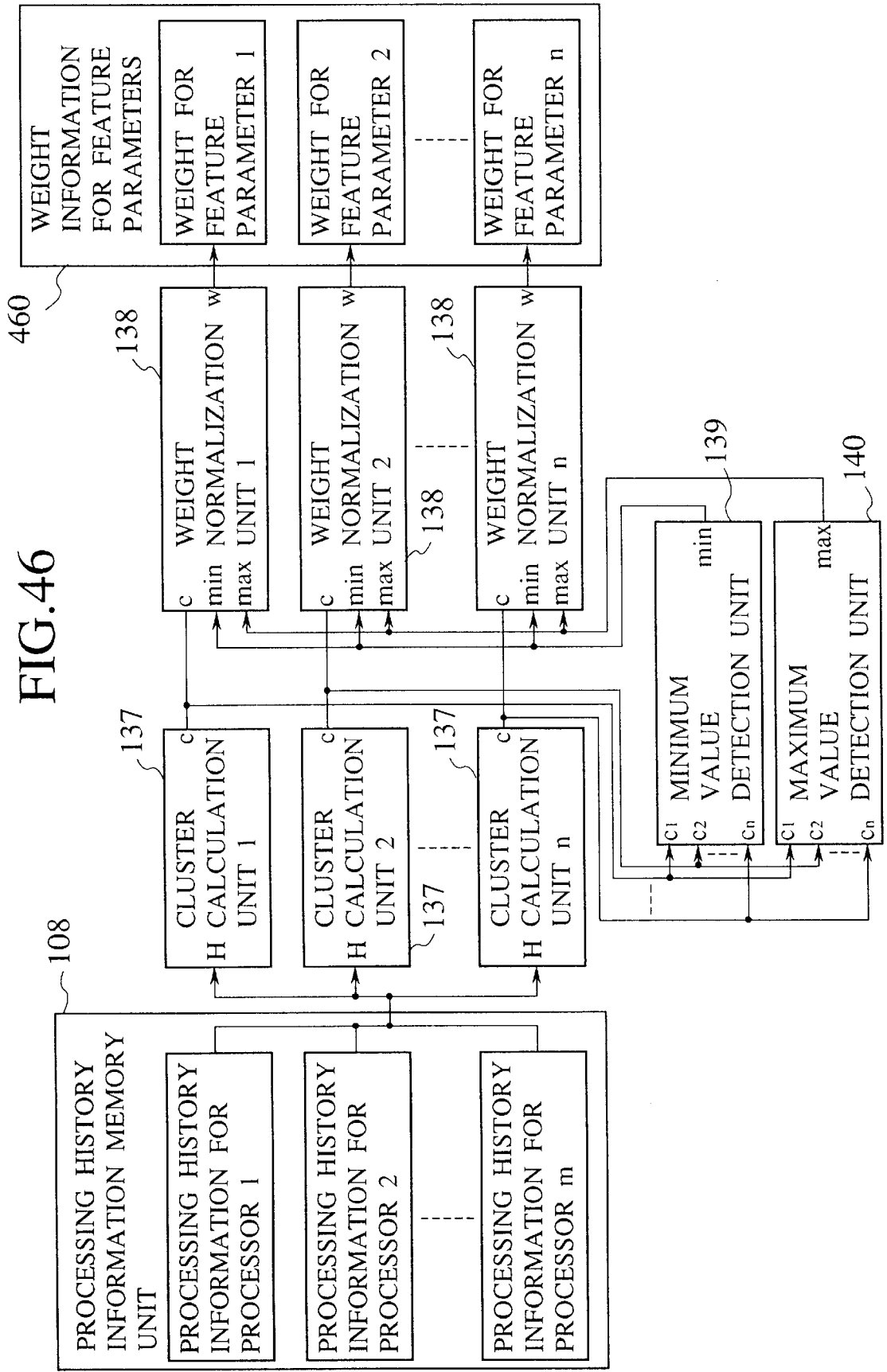
FIG. 46 is a block diagram of a weight calculation unit in the transaction routing unit of FIG. 27.

The weight information for each feature parameter used in selecting the transaction processor to which the transaction is to be routed may be given by a programmer or a system manager, but it is preferable to be able to determine these weights automatically. To this end, the configuration of FIG. 27 also incorporates the weight calculation unit 127 which has a configuration as shown in FIG. 46. In this weight calculation unit 127, according to the processing history information of the past stored in the processing history information memory unit 108, which feature parameter has the stronger correlative relationship with the optimum transaction processor is judged, and the weight is set to be heavier for the feature parameter having the stronger correlative relationship.

The weight calculation unit 127 of FIG. 46 generally comprises cluster calculation units 137 for calculating the cluster number for each feature parameter, and the weight normalization units 138 for converting the cluster numbers calculated by the cluster number calculation units 137 into the weight information by normalizing them.

Figure 47:
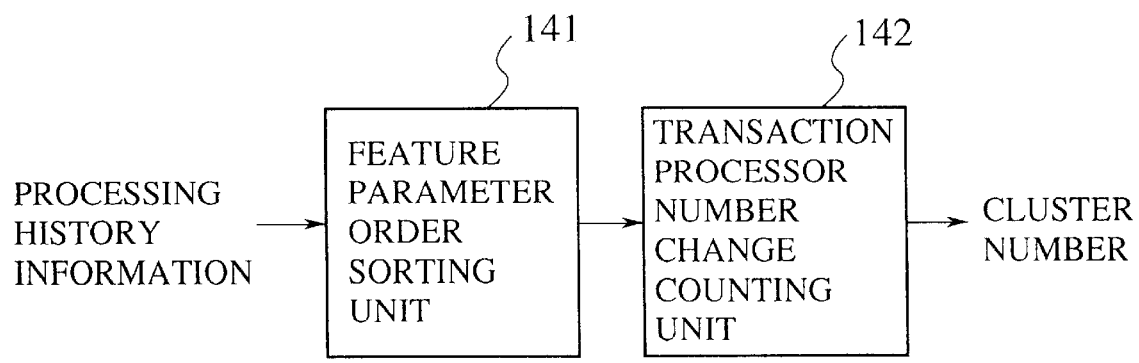
FIG. 47 is a block diagram of a cluster calculation unit in the weight calculation unit of FIG. 46.

The cluster calculation unit 137 for the j-th feature parameter has a configuration as shown in FIG. 47, in which all the the processing history information belonging to the type of transaction for which the weight is to be calculated are entered as its inputs. These processing history information are then supplied to the feature parameter order sorting unit 141 which rearranges the processing history information in an order of the j-th feature parameter values, and sequentially supplies them to the transaction processor number change counting unit 142.

This transaction processor number change counting unit 142 sequentially receives the supplied processing history information, and counts the number of times for which the transaction processor recorded in the processing history information changes as the cluster number, and then outputs the counted cluster number. In a case the j-th feature parameter and the optimum transaction processor has a correlative relationship, there is a higher possibility for the processing history information having the same transaction processor to be arranged one after another by sorting according the j-th feature parameter value, so that the cluster number is going to be smaller.

The cluster number for each feature parameter obtained in this manner is supplied to the weight normalization unit 138 as well as to the minimum value detection unit 139 and the maximum value detection unit 140. The minimum value detection unit 139 obtains the minimum value of the cluster number for each feature parameter while the maximum value detection unit 140 obtains the maximum value of the cluster number for each feature parameter. The weight normalization unit 138 for each feature parameter receives the cluster number C for each feature parameter, the minimum value "min" outputted by the minimum value detection unit 139, and the maximum value "max" outputted by the maximum value detection unit 140 as its inputs, and normalize the cluster number to obtain the weight W for each feature parameter constituting the weight information 460. Here, for example, the normalization processing can be made according to the following equation:

$$W=0.9 \cdot (max-C)/(max-min)+0.05$$

When this equation is used, the cluster number is going to be linearly normalized such that the weight for the feature parameter with the minimum cluster number becomes 0.95 while the weight for the feature parameter with the maximum cluster number becomes 0.05. It is also possible to make the linear normalization to obtain the values in a range of 0.0 to 1.0 by using the similar equation. It is also possible to use a scheme in which the normalization using the nonlinear function is made such that the very little weight is obtained while the cluster number is relatively large.

Among the processing history information stored in the processing history information memory unit 108, the older ones are deleted by the processing history information management unit 107. Here, the processing history information to be deleted include those which had been recorded before a prescribed period of time in the past, or those which are stored in excess to a prescribed number in a case the number of processing history information to be stored in the processing history information memory unit 108 is predetermined.

In this second embodiment, the number of processing history information that can be stored in the processing history information memory unit 108 (the number of preservable records) is set to be constant. This number of preservable records may be given by a programmer or a system manager, but it is preferable to be able to determine this number of preservable records automatically. To this end. It is possible to provide the preservable record number determination unit for automatically adjusting the number of preservable records which has a configuration as shown in FIG. 48.

Figure 48:
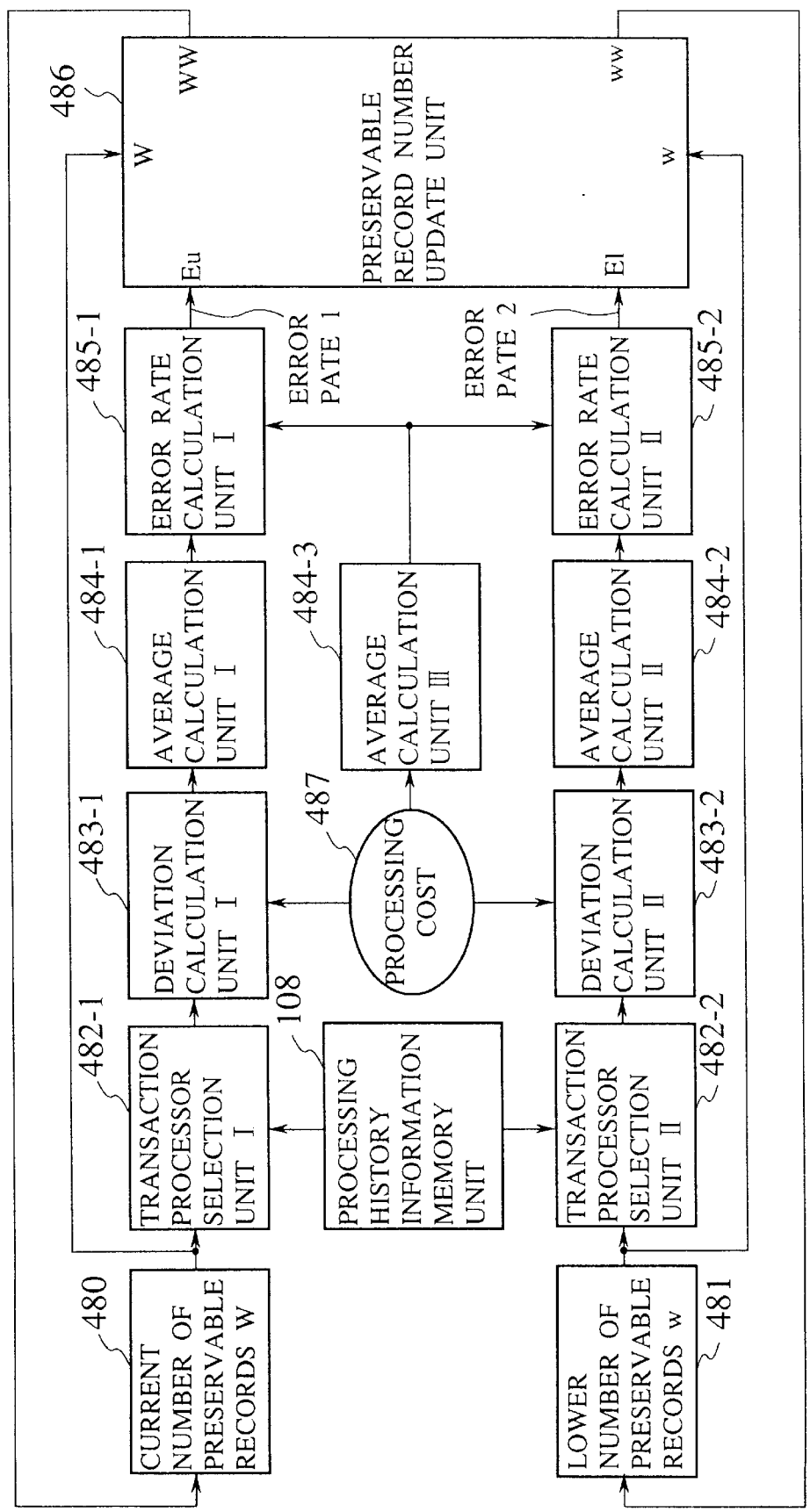
FIG. 48 is a block diagram of a preservable record number determination unit that can be used in the second embodiment of the present invention.

In this preservable record number determination unit of FIG. 48, the currently preserved record number W and the lower preservable record number w are managed, and for each new transaction, the predicted cost in a case the transaction processor is selected by using W pieces of the past processing history information and the predicted cost in a case the transaction processor is selected by using w pieces of the past processing history information are obtained, and then the number of preservable records is changed according to the statistical value of the difference with respect to the processing cost actually required in actually routing and processing the transaction.

Namely, the preservable record number determination unit has the transaction processor selection unit I 482-1 and the transaction processor selection unit II 482-2, each of which is similar to the transaction processor selection unit 105 in the configuration of FIG. 27 and has a configuration similar to that shown In FIG. 39 and FIG. 43, except that its output is the predicted processing cost required in processing the transaction at the selected transaction processor rather than the transaction processor number. Namely, in the configuration of FIG. 39, the minimum cost transaction processor selection units 131 are modified to output the minimum processing costs in addition to the candidate transaction processor numbers. In addition, in the configuration of FIG. 43, not just the candidate transaction processor numbers for each feature parameter but also the processing costs associated with them are sorted by the weight order sorting unit 133, and the candidate transaction processor number and the corresponding processing cost are treated as a set at the probabilistic selection units 134. Here, the transaction processor selection unit I 482-1 can be common to the transaction processor selection unit 105 in the configuration of FIG. 27 if desired.

In this case, when the new transaction is received by the transaction routing unit, the predicted cost I necessary in processing this transaction by using W pieces of the processing history information stored in the processing history information memory unit 108 is obtained by the transaction processor selection unit I 482-2. At this point, the transaction processor number of the transaction processor estimated to be capable of processing the transaction at the predicted cost I is supplied to the transaction transmission unit 106, and the transaction is routed accordingly. At the same time, the predicted cost II necessary in processing this transaction by using w pieces of the processing history information stored in the processing history information memory unit 108 is obtained by the transaction processor selection unit II 482-2. Then, the deviations of the predicted cost I and the predicted cost II so obtained with respect to the processing cost 487 actually required in processing this transaction at the transaction processor selected by the transaction processor selection unit I 482-1 are obtained by the deviation calculation unit I 483-1 and the deviation calculation unit II 483-2, respectively. Here, each of the deviation calculation unit I 483-1 and the deviation calculation unit II 483-2 outputs the absolute value of the arithmetic difference between the predicted cost and the actual processing cost.

Then, the outputs of the deviation calculation unit I 483-1 and the deviation calculation unit II 483-2 are supplied to the average calculation unit I 484-1 and the average calculation unit II 484-2, while the processing cost 487 is supplied to the average calculation unit III 484-3.

Each of the average calculation unit I 484-1, the average calculation unit II 484-2, and the average calculation unit III 484-3 calculates the average value of a prescribed number of values entered in the past. In other words, the average calculation unit I 484-1 and the average calculation unit II 484-2 calculate the average values of the absolute values of the differences of the predicted cost I and the predicted cost II with respect to the actual processing cost, respectively, while the average calculation unit III 484-3 calculates the average value of the actual processing cost. The outputs of the average calculation unit I 484-1 and the average calculation unit II 484-2 are supplied to the error rate calculation unit I 485-1 and the error rate calculation unit II 485-2, respectively, while the output of the average calculation unit III 484-3 is supplied to both the error rate calculation unit I 485-1 and the error rate calculation unit II 485-2.

Then, the error rate calculation unit I 485-1 and the error rate calculation unit II 485-2 calculate the error rates by dividing the average values of the differences between the predicted cost and the actual processing cost supplied from the average calculation unit I 484-1 and the average calculation unit II 484-2 by the average value of the actual processing cost supplied from the average calculation unit III 484-3, and outputs them as the error rate I and the error rate II which can be utilized as the indices indicating how much the predicted costs are deviated from the actual processing cost.

Figure 49:
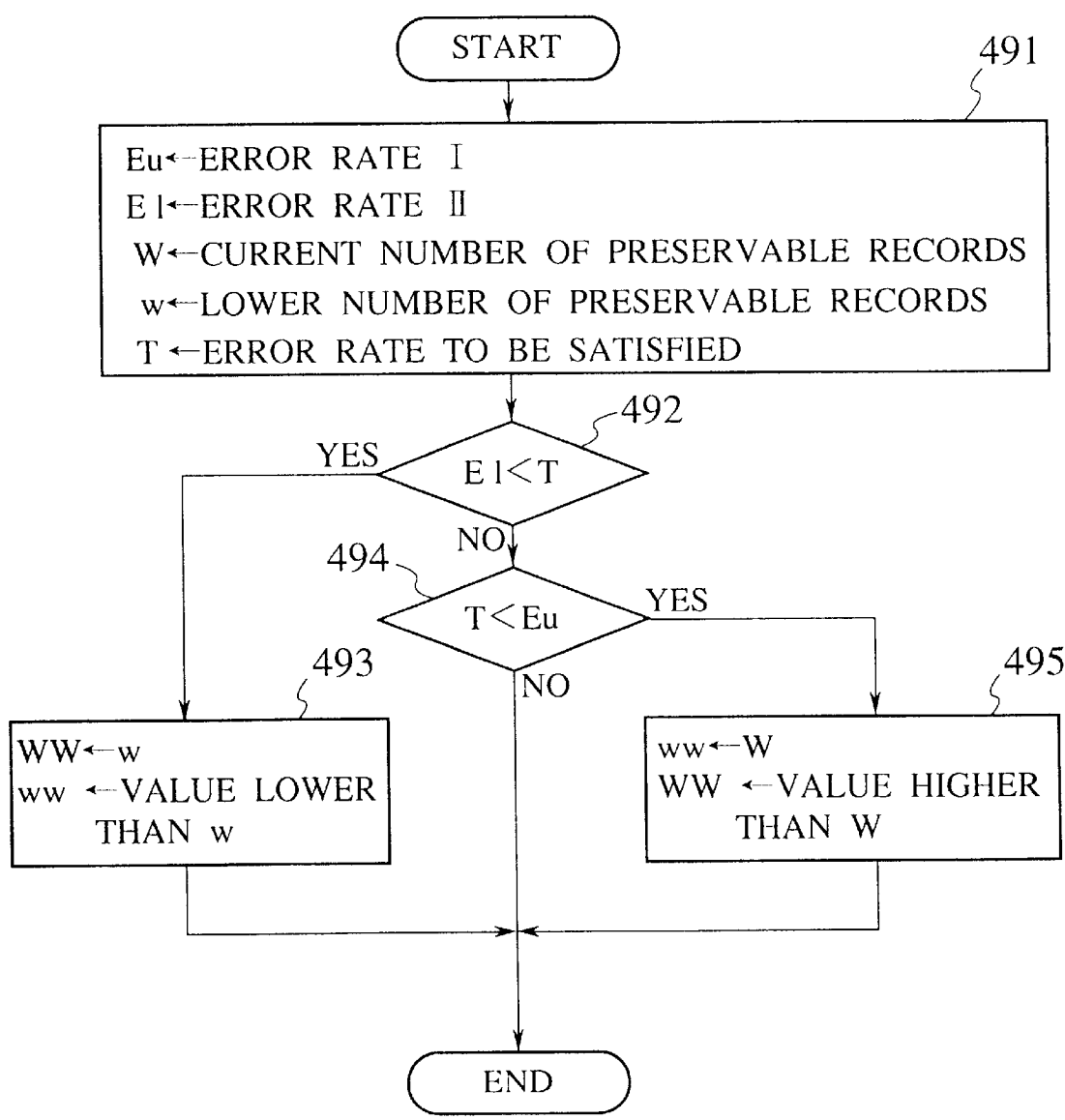
FIG. 49 is a flow chart for the operation of a preservable record number update unit in the preservable record number determination unit of FIG. 49.

The preservable record number update unit 486 receives the error rate I and the error rate II as well as the current number of preservable records W and the lower number of preservable records w as its inputs, and calculates the desirable current number of preservable records WW and the desirable lower number of preservable records ww and updates the current number of preservable records W 480 and the lower number of preservable records w 481 by the calculated new numbers of preservable records WW and ww, respectively, according to the flow chart of FIG. 49 as follows.

Namely, the error rate I and the error rate II are set to be Eu and El and the the current number of preservable records W and the lower number of preservable records w are set out along with the prescribed error rate to be satisfied T (step 491). Then, if El<T is determined (step 492), and if so, it indicates that the current number of preservable records is too large such that the predicted value better than expected is currently obtained. In this case, the lower number of preservable records w is set to the new number of preservable records WW, while a value lower than the lower number of preservable records w which is even smaller than before is set to the new lower number of preservable records (step 493). On the other hand when El≧T at the step 492, next if T<Eu is determined (step 494). If not, nothing is made to update the current number of preservable records W and the lower number of preservable records. On the other hand, when this is the case, it indicates that the current number of preservable records is too small and the predicted value worse than expected is currently obtained. In this case, the current number of preservable records W is set to the new lower number of preservable records ww, while a value higher than the current number of preservable records W which is even larger than before is set to the new number of preservable records WW (step 495).

Now, a case of applying the transaction routing scheme of the second embodiment described above to the routing of the packet whose structure is unknown will be described in detail.

Figure 50:
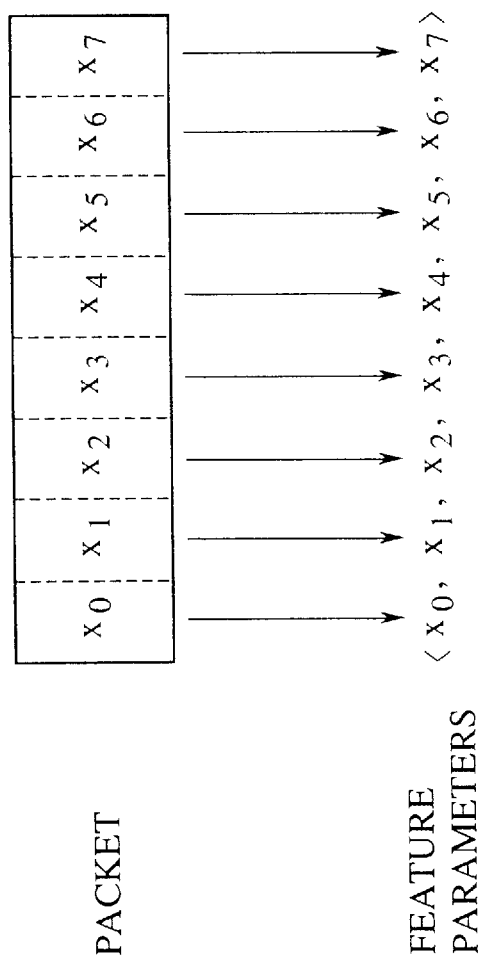
FIG. 50 is a diagrammatic illustration showing one possible manner of obtaining featura parameters from a packet of unknown structure.
Figure 51:
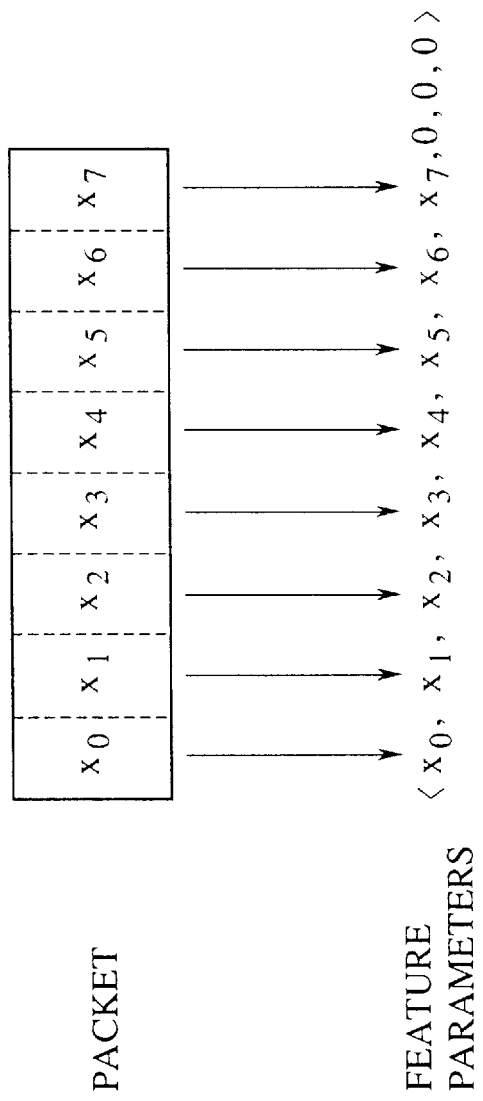
FIG. 51 is a diagrammatic illustration showing another possible manner of obtaning featura parameters from a packet of unknown structure.
Figure 52:
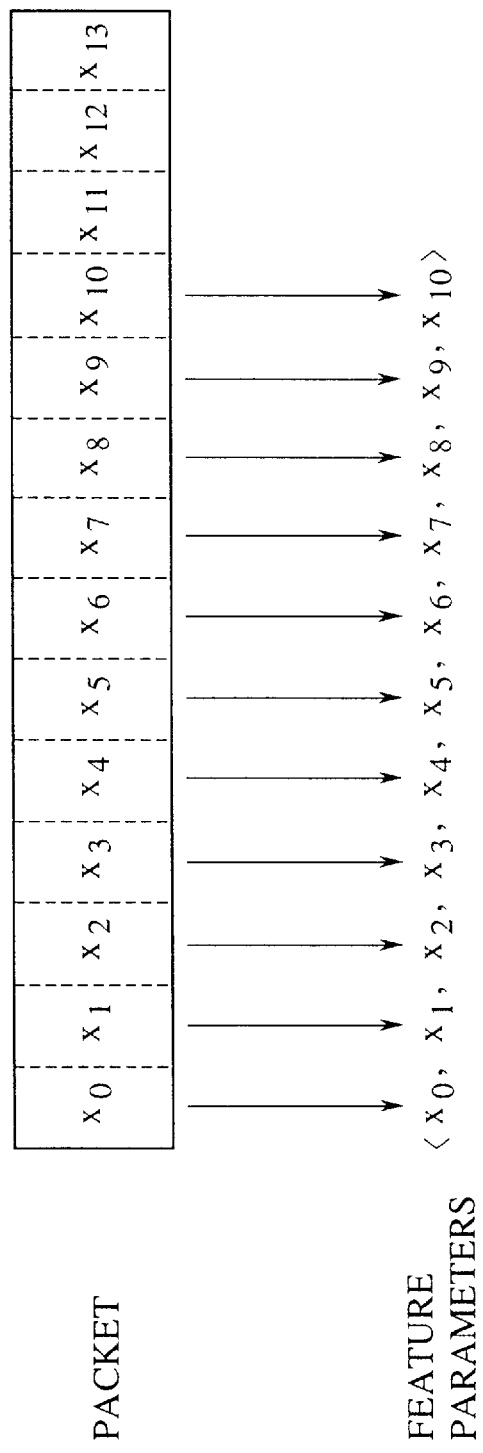
FIG. 52 is a diagrammatic illustration showing another possible manner of obtaning featura parameters from a packet of unknown structure.
Figure 53:
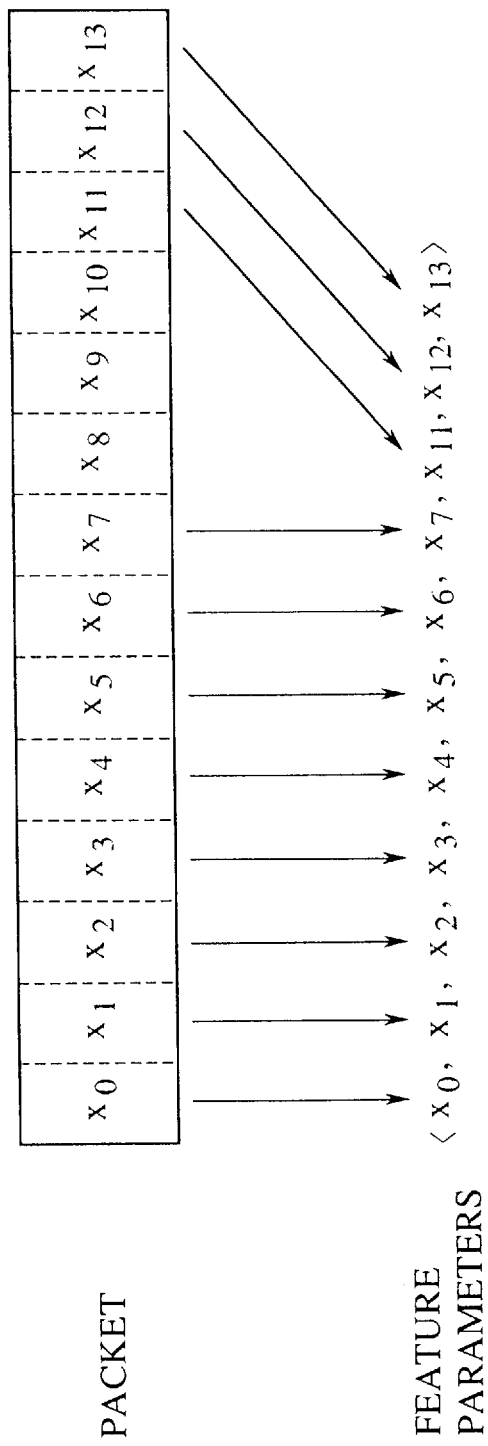
FIG. 53 is a diagrammatic illustration showing another possible manner of obtaning featura parameters from a packet of unknown structure.

In general, the packet can be treated as a byte sequence or a word sequence. For this reason, each word or byte of the packet as shown in FIG. 50 can be utilized as the feature parameters. In this scheme, however, the packet of a fixed length can be handled but the packet of a variable length cannot. Therefore, a number of words or bytes to be extracted as the feature parameters is determined in advance, and in a case of the packet shorter than the predetermined number as shown in FIG. 51, the words or bytes in short are filled out by appropriate value such as 0. On the other hand, in a case of the packet longer than the predetermined number as shown in FIG. 52, only the predetermined number of words or bytes from the top of the packet are extracted as the feature parameters, or as shown in FIG. 53, a predetermined number of words or bytes from the top and the end of the packet are extracted as the feature parameters. It is also possible to use only the predetermined number of words or bytes from the end of the packet as the feature parameters. Thus, the scheme for extracting the feature parameters from the packet is similar to the scheme for extracting the feature parameters from the character string or the array described above.

In a case of the packet of a variable length, the length of the packet can also be used as a feature parameter. FIGS. 54, 55, and 56 shows cases in which the length of the packet is also included in the feature parameters extracted by the schemes of FIG. 51, 52, and 53 described above.

Figure 57A:
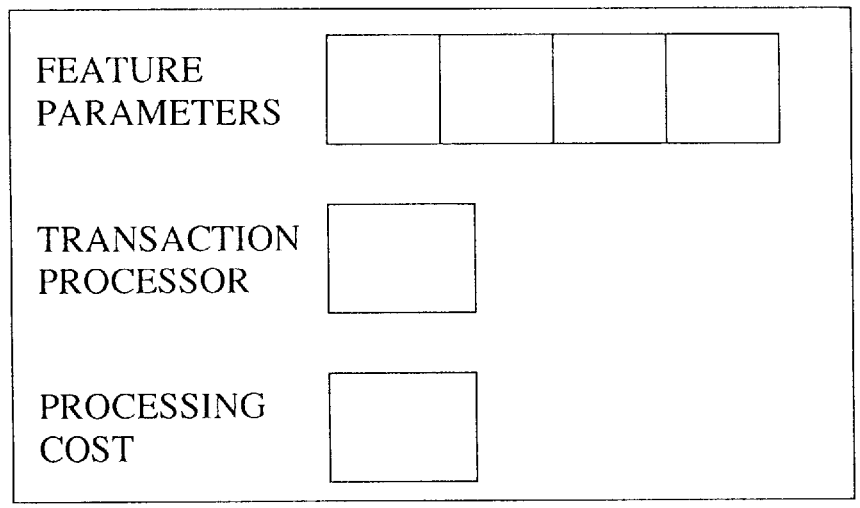
FIGS. 57A and 57B are diagrammatic illustrations of possible forms of a processing history information to be used in a case of routing packets of unknown structure.
Figure 57B:
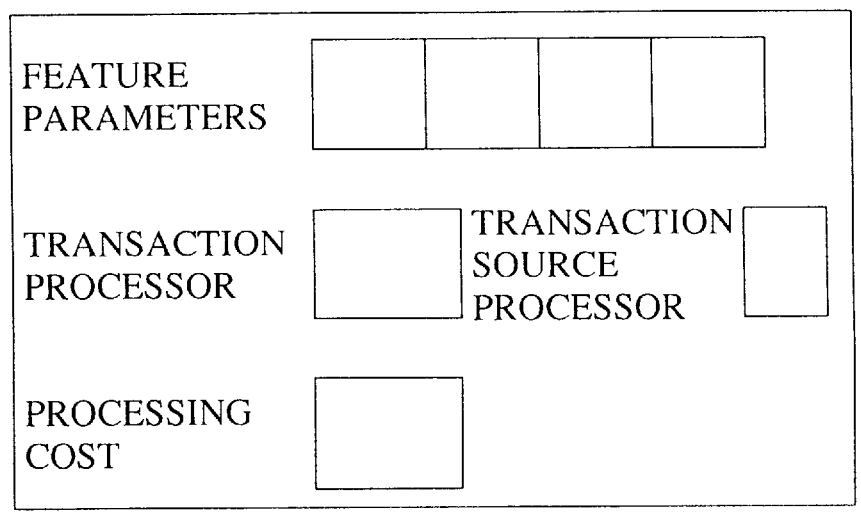

The processing history information to be used in the routing of the packets records the feature parameters, the transaction processor, and the processing cost, as shown in FIG. 57A. Here, as the feature parameters, all the elements of the feature parameters may be recorded or only those elements of the feature parameters which have relatively heavier weights may be recorded. It is also possible to record the packet data itself instead of the feature parameters. The processing cost can be obtained by recording the processing cost reported from the transaction processor which actually processed the transaction, or by recording the time required in processing the transaction by detecting the packet for transmitting the corresponding processing result. In a case of relaying the processing result packet by the transaction routing unit, as shown in FIG. 57B, the information on the transaction source processor indicating from which processor had the packet come is also recorded in the processing history information.

In the above described second embodiment, there is no assumption regarding the content of the packet, when it is known in advance that the type of transaction is registered at the top of the packet as shown in FIG. 58, just as in a case of the routing of the RPC transaction described above, the processing history information or the weight information can be managed for each type of transaction separately.

It is also to be noted that the second embodiment described above is also realizable by the software running on the computer which is connected to the network.

As described, according to the transaction routing scheme of this second embodiment, in the data processing system having a plurality of processors, when there is a correlative relationship between the transaction and the optimum processor for processing this transaction, this correlative relationship is detected automatically and the transaction can be routed to the optimum processor accordingly. Here, the information necessary in routing the transaction is detected automatically, so that there is no need for a programmer or a system manager to provide a routing procedure, and it becomes possible to take the full advantage of the available processing power of the system as a whole very easily.

Figure 59:
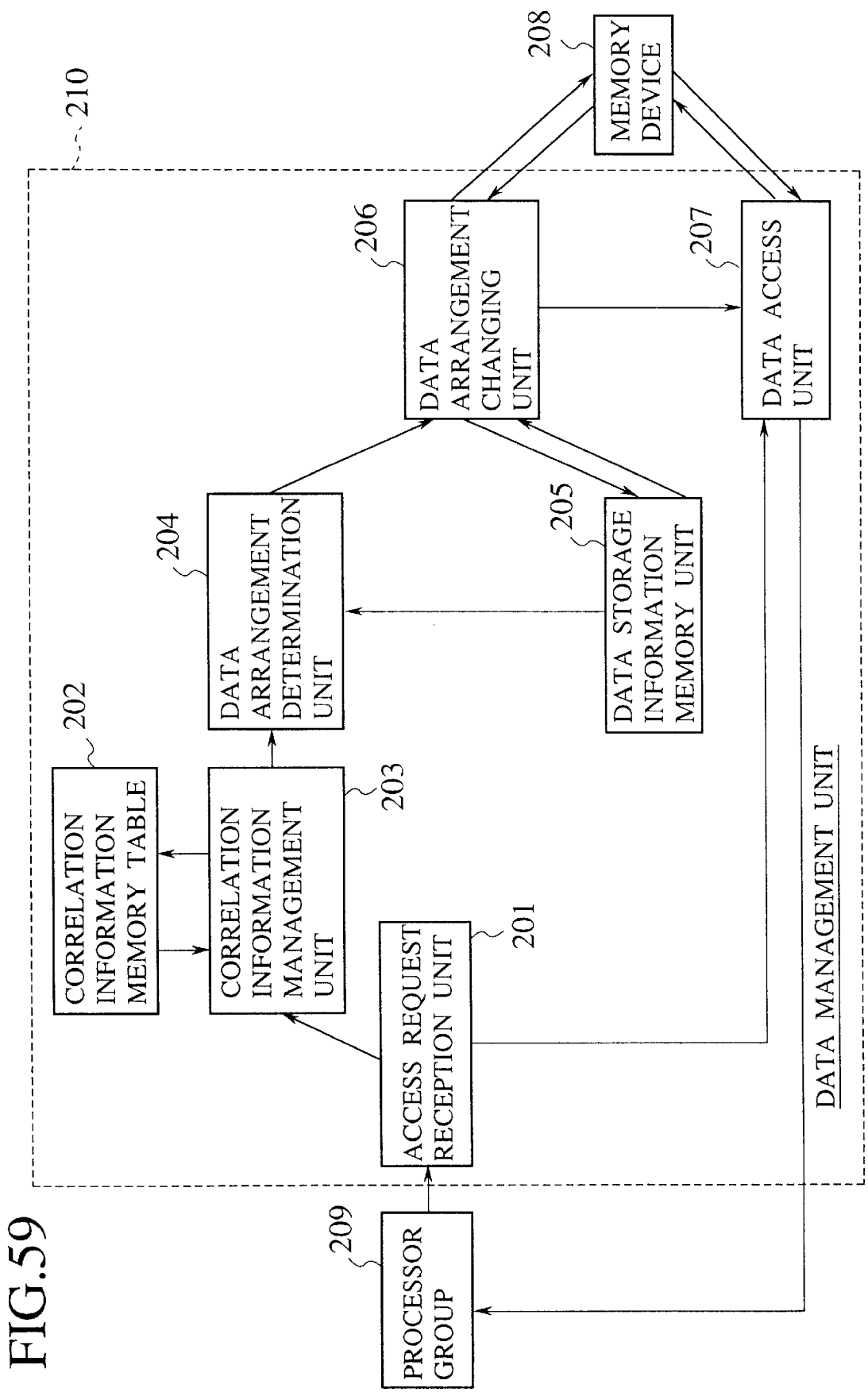
FIG. 59 is a block diagram of a data management unit in a third embodiment of a multiple processor transaction processing system according to the present invention.

Referring now to FIG. 59, the third embodiment of the multiple processor transaction processing system according to the present invention will be described in detail. This third embodiment mainly concerns with the data management scheme which is suitable for use in the data arrangement determination unit in the first embodiment described above.

In this third embodiment, the data management unit for realizing the data management scheme has a configuration as shown in FIG. 59, in which the data management unit 210 connected between a processor group 209 and a memory device 208 comprises: an access request reception unit 201 connected with the processor group 209; a correlation information memory table 202; a correlation information management unit 203 connected with the access request reception unit 201 and the correlation information memory table 202; a data arrangement determination unit 204 connected with the correlation information management unit 203; a data storage information memory unit 205 connected with the data arrangement determination unit 204: a data arrangement changing unit 206 connected with the data arrangement determination unit 204, the data storage information memory unit 205, and the memory device 208; and a data access unit 207 connected with the processor group 209, the access request reception unit 201, the data arrangement changing unit 206, and the memory device 208.

This data management unit 210 receives the data access requests from the transactions processed on the processor group 209, and produces and updates the correlation information among a particular set of data indicating that the accesses have been made to all data in this particular set of data during a series of processings when it becomes possible for the history of the access request to satisfy the predetermined condition, such as when a predetermined number of access requests are received. In this manner, after the sufficient amount of correlation information is acquired, the new data arrangement information is produced according to the correlation information and the data storage information indicating the data storage regions in which the data are stored.

Figure 60:
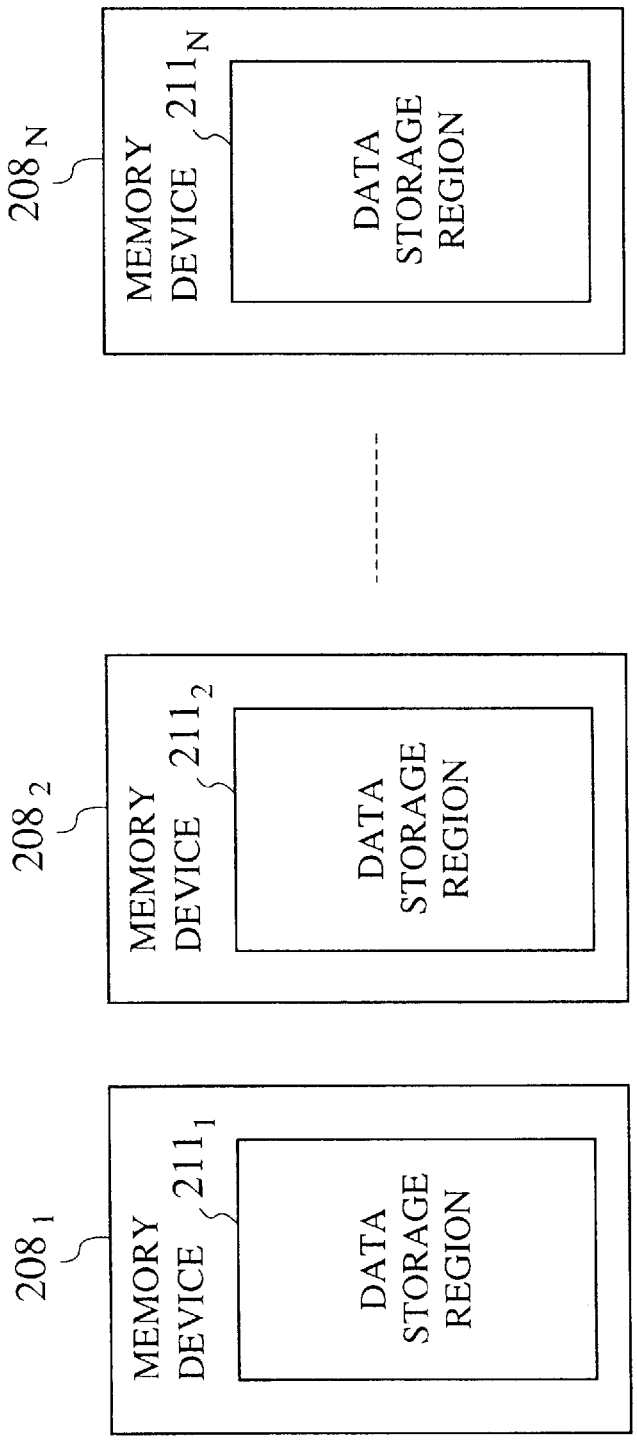
FIG. 60 is a diagrammatic illustration of one possible configuration of data storage regions used in the third embodiment of the present invention.
Figure 61:
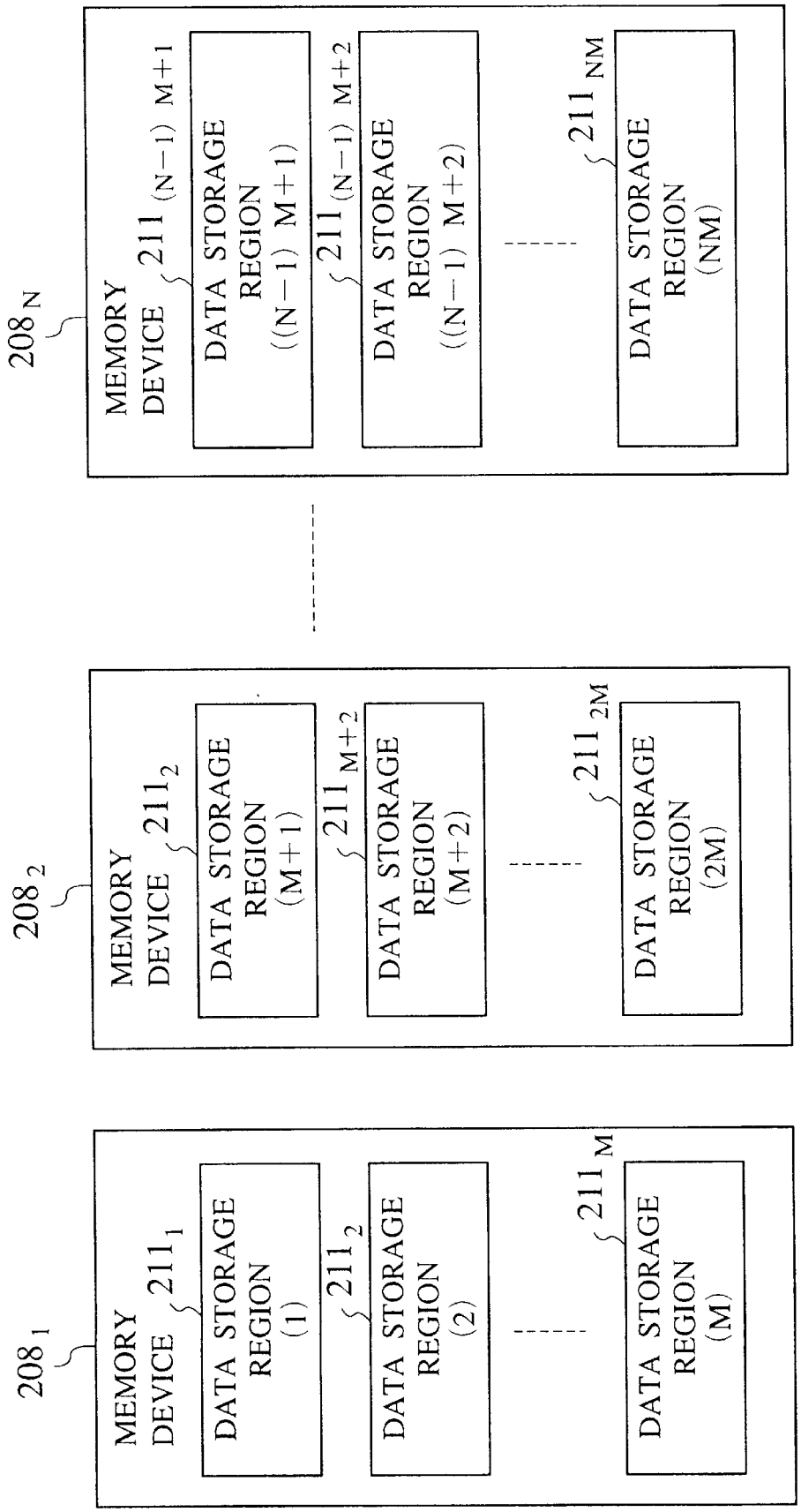
FIG. 61 is a diagrammatic illustration of another possible configuration of data storage regions used in the third embodiment of the present invention.
Figure 62:
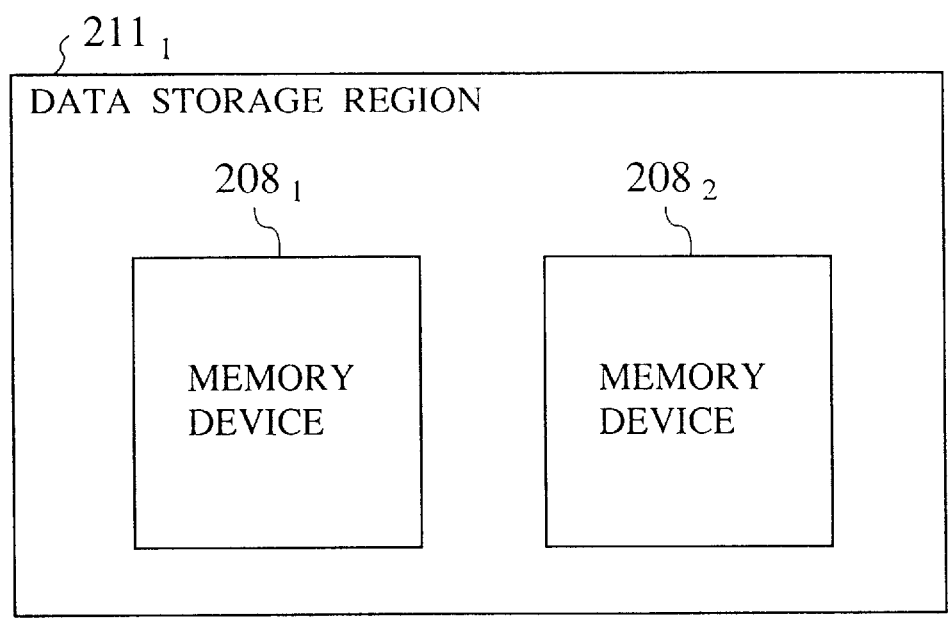
FIG. 62 is a diagrammatic illustration of another possible configuration of data storage regions used in the third embodiment of the present invention.

Here, the data management unit 210 stores data in a plurality of data storage regions in at least one memory device 208, and the data management unit 210 manages a plurality of data storage regions either by allocating each data storage region 211 to one memory device 208 as indicated in FIG. 60, or by allocating a plurality of data storage regions 211 to one memory device 208 as indicated in FIG. 61, or else by treating a plurality of memory devices 208 as a single data storage region 211 as indicated in FIG. 62. A number of data storage regions in each memory device, and a size of each data storage region can be optional, and it is even possible to set a number of data storage regions and a size of each data storage region to be different among different memory devices.

The memory device 208 managed by the data management unit 210 has a function for storing the data, and it suffices for the memory device 208 to be able to read/write any data at an arbitrary position within the memory device 208. This memory device 208 can be given in a form of any of the semiconductor memory, the hard disk, the floppy disk, the magnetic tape, etc.

This data management unit 210 may be constructed as an independent device, or realized by software or hardware as a function provided in a computer.

Now, the operation of this data management unit 210 of FIG. 59 will be described.

The access request generated by the transaction processed by the processor in the processor group 209 is received by the access reception unit 201. The access request comprises the data necessary for making an access and the data necessary for generating the correlation information. The access request reception unit 201 supplies the received access request to the correlation information management unit 203 and the data access unit 207.

The data access unit 207 carries out the data read/write operation with respect to the memory device 208 according to the received access request, and returns the result to the data access requested processor (which is one of the processors in the processor group 209).

The correlation information management unit 203 produces the correlation information from the newly received access request, and by matching it with the correlation information already stored in the correlation information memory table 202, updates the correlation information when it is the already registered correlation information, or registers it into the correlation information memory table 202 when it is not registered yet. At this point, the correlation information which has not been updated over a Prescribed period of time or which does not satisfy the predetermined condition is deleted from the correlation information memory table 202. The correlation information management unit 203 repeats such an updating of the correlation information whenever there is an access request, and supplies the correlation information to the data arrangement determination unit 204 when the sufficient amount of the correlation information is acquired.

The data arrangement determination unit 204 determines the new data arrangement according to the received correlation information and the data storage information stored in the data storage information memory unit 205. Then, when the new data arrangement is determined, the data arrangement determination unit 204 supplies it to the data arrangement changing unit 206 and the data storage information memory unit 205.

At a time of changing the data arrangement, the data arrangement changing unit 206 notifies how data positions are going to be interchanged to the data access unit 207 first. When this notice is received, the data access unit 207 temporarily prohibits the request for updating those data which are going to be interchanged. Then, the data arrangement changing unit 206 interchanges the data according to the received new data arrangement, and when this interchanging operation is finished, this fact is notified to the data storage information memory unit 205 and the data access unit 207.

When the notice for the finishing of the data interchanging is received from the data arrangement changing unit 206, the data storage information memory unit 205 updates the data storage information according to the information concerning the data arrangement received from the data arrangement determination unit 204. Also, at this point, the data access unit 207 changes the management information for the data access in correspondence to the change of the data arrangement if necessary, and sets the state to be capable of receiving the update request for these interchanged data.

Figure 63:
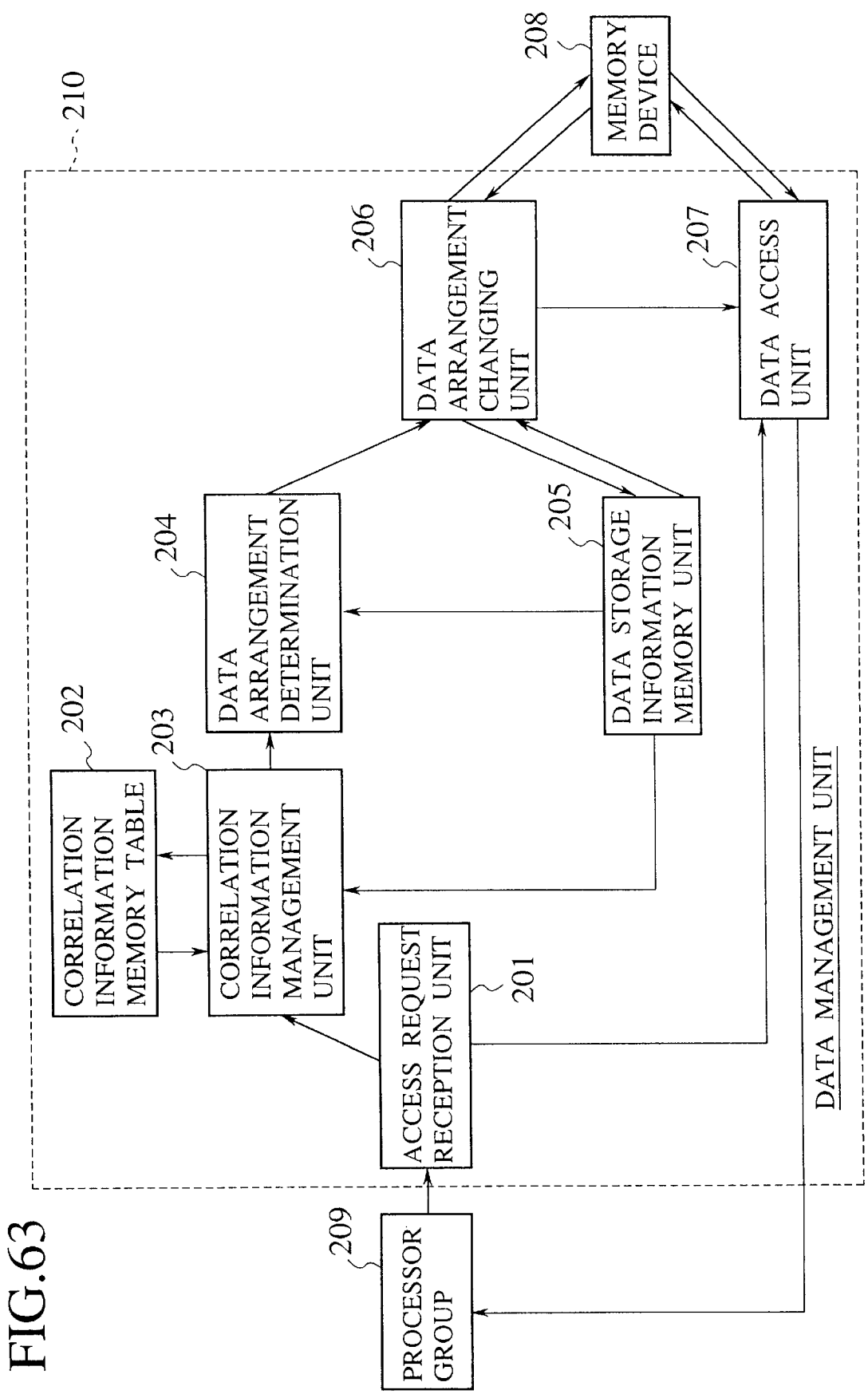
FIG. 63 is a block diagram of one possible modified configuration for the data management unit of FIG. 59.

The data management unit 210 of this third embodiment can have another configuration as shown in FIG. 63, which is basically constituted by the similar constituent elements as in FIG. 59, but the connection relationships and the functions of the constituent elements are somewhat different so that the characteristic points of this another configuration of FIG. 63 will be described.

The data access request generated from the transaction is received by the access request reception unit 201 and supplied to the correlation information management unit 203 and the data access unit 207. Here, the operation of the data access unit 207 is similar as in the configuration of FIG. 59 up to a point at which the data read/write operation with respect to the memory device 208 is carried out according to the received access request, and the result is returned to the data access requested processor (which is one of the processors in the processor group 209). However, the correlation information management unit 203 uses both the newly received access request and the data storage information stored in the data storage information memory table 202 in producing the correlation information. The other features of this configuration of FIG. 63 are substantially equivalent to that of FIG. 59.

Figure 64:
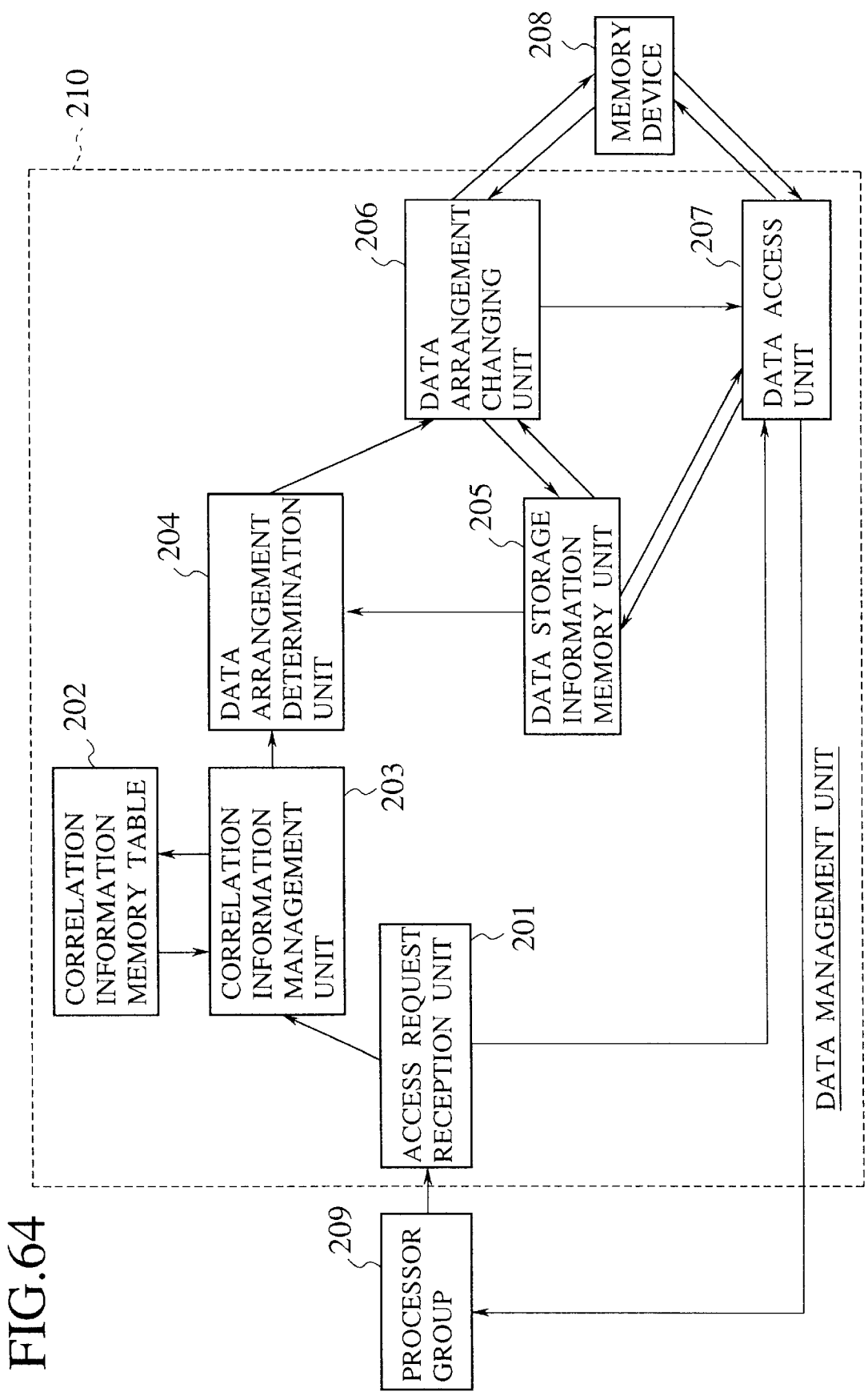
FIG. 64 is a block diagram of another possible modified configuration for the data management unit of FIG. 59.

The data management unit 210 of this third embodiment can also have still another configuration as shown in FIG. 64, which is basically constituted by the similar constituent elements as in FIG. 59, but the connection relationships and the functions of the constituent elements are somewhat different so that the characteristic points of this still another configuration of FIG. 64 will be described.

The data access request generated from the transaction is received by the access request reception unit 201 and supplied to the correlation information management unit 203 and the data access unit 207. Here, unlike the configurations of FIG. 59 and FIG. 63 in which the data access unit 207 managed the information concerning where the data to be accessed is present in the memory device 208 by itself, the data access unit 207 does not have this information concerning where the data to be accessed is present in the memory device 208 in this configuration of FIG. 64.

Namely, when the access request is received, the data access unit 207 searches where this data to be accessed is stored according to the data storage information in the data storage information memory unit 205, and after the access is made, the result is returned to this data to the data access requested processor.

The correlation information management unit 203 produces the correlation information from the newly received access request without using the data storage information, and by matching it with the correlation information already stored in the correlation information memory table 202, updates the correlation information when it is the already registered correlation information, or registers it into the correlation information memory table 202 when it is not registered yet. At this point, the correlation information which has not been updated over a prescribed period of time or which does not satisfy the predetermined condition is deleted from the correlation information memory table 202. The correlation information management unit 203 repeats such an updating of the correlation information whenever there is an access request, and supplies the correlation information to the data arrangement determination unit 204 when the sufficient amount of the correlation information is acquired.

The data arrangement determination unit 204 determines the new data arrangement according to the received correlation information and the data storage information stored in the data storage information memory unit 205. Then, when the new data arrangement is determined, the data arrangement determination unit 204 supplies it to the data arrangement changing unit 206 and the data storage information memory unit 205, just as in the case of FIG. 59.

Here, however, at a time of changing the data arrangement, the data arrangement changing unit 206 notifies how data positions are going to be interchanged to the data storage information memory unit 205 first. When this notice is received, the data storage information memory unit 205 memorizes the fact that those data which are going to be interchanged are currently not accessible. Then, the data arrangement changing unit 206 interchanges the data according to the received new data arrangement, and when this interchanging operation is finished, this fact is notified to the data storage information memory unit 205.

When the notice for the finishing of the data interchanging is received from the data arrangement changing unit 208, the data storage information memory unit 205 memorizes the fact that those data which have been interchanged are accessible again, and updates the data storage information for these data.

Figure 65:
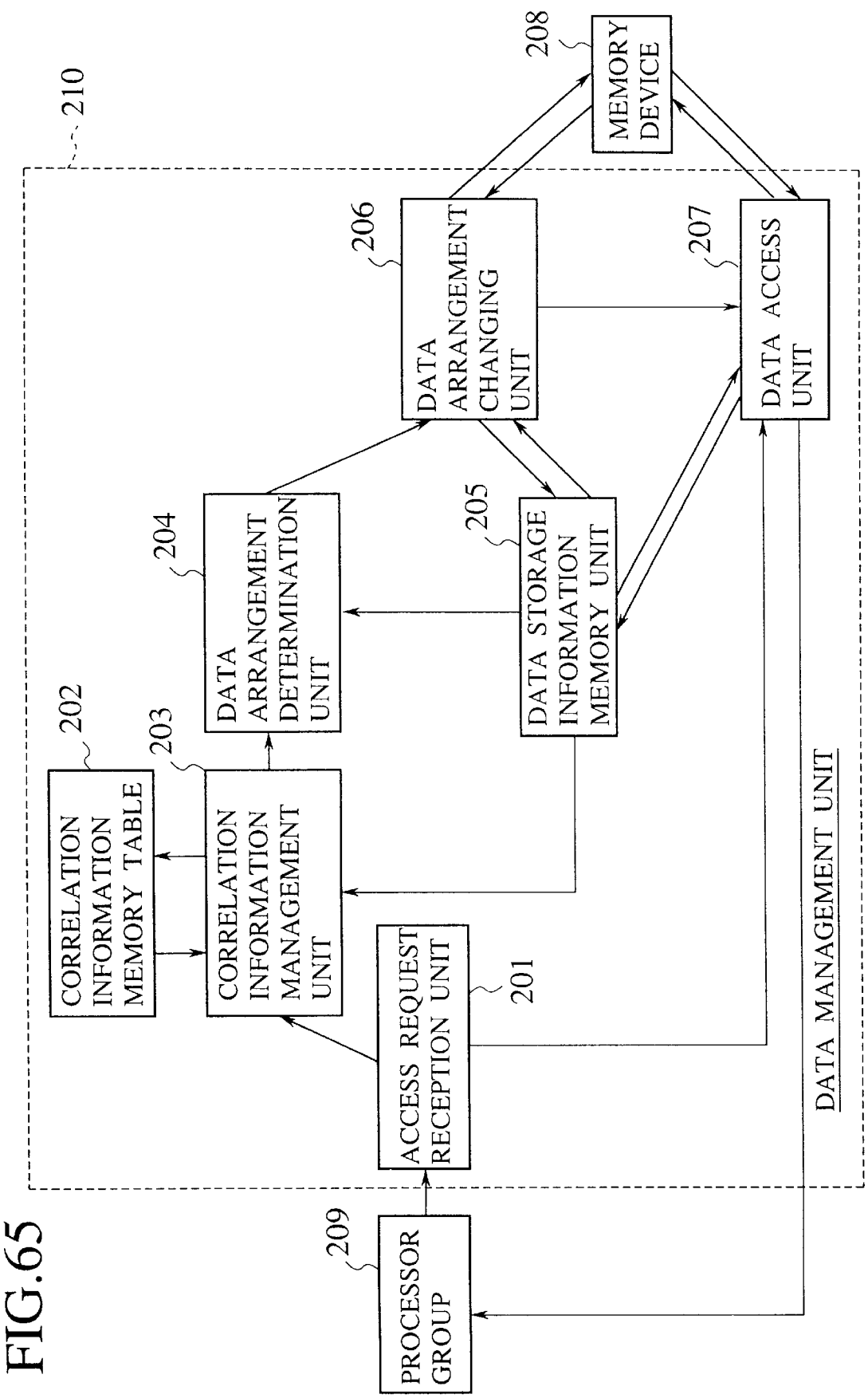
FIG. 65 is a block diagram of another possible modified configuration for the data management unit of FIG. 59.

It is also possible to use a configuration as shown in FIG. 65 in which the features of the configurations of FIG. 63 and FIG. 64 are combined together.

Figure 66:
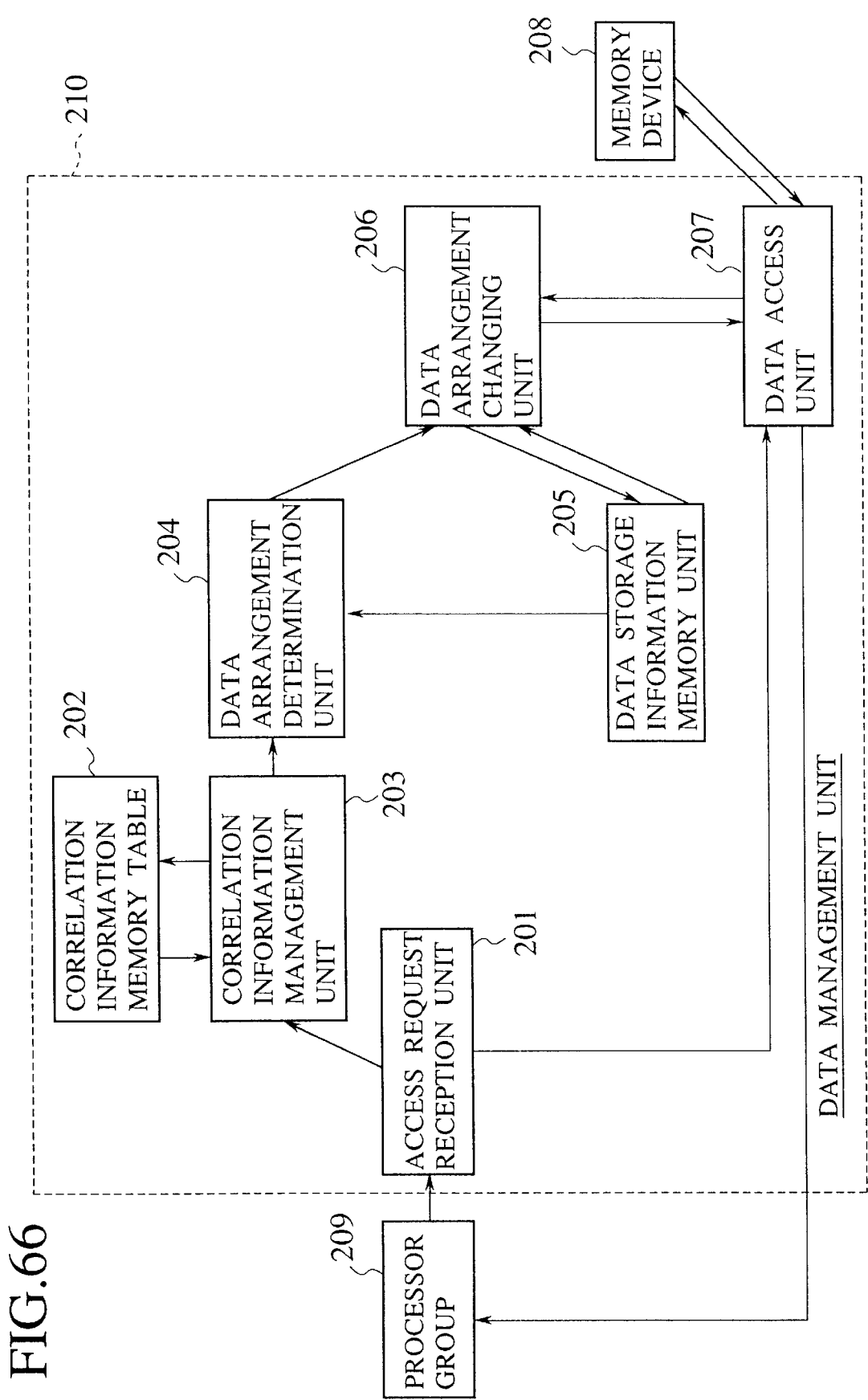
FIG. 66 is a block diagram of another possible modified configuration for the data management unit of FIG. 59.

Moreover, instead of forming the data arrangement determination unit 204 and the data access unit 207 to be capable of making accesses to the data independently as in the configurations of FIG. 59, it is also possible to use a configuration as shown in FIG. 66 in which the data arrangement determination unit 204 can make accesses to the data only through the data access unit 207, and the modifications of this configuration of FIG. 66 similar to those of FIGS. 63, 64, and 65 with respect to the configuration of FIG. 59 are also possible.

Furthermore, instead of temporarily prohibiting the accesses to the data at a time of updating the data arrangement as in the above, it is also possible to make the data accessible even during the data arrangement updating, by producing a replica of the data at a time of updating the data arrangement and accounting for the changes made in the replica during the data arrangement updating after the data arrangement updating is finished, without prohibiting the data access at all.

Figure 67:
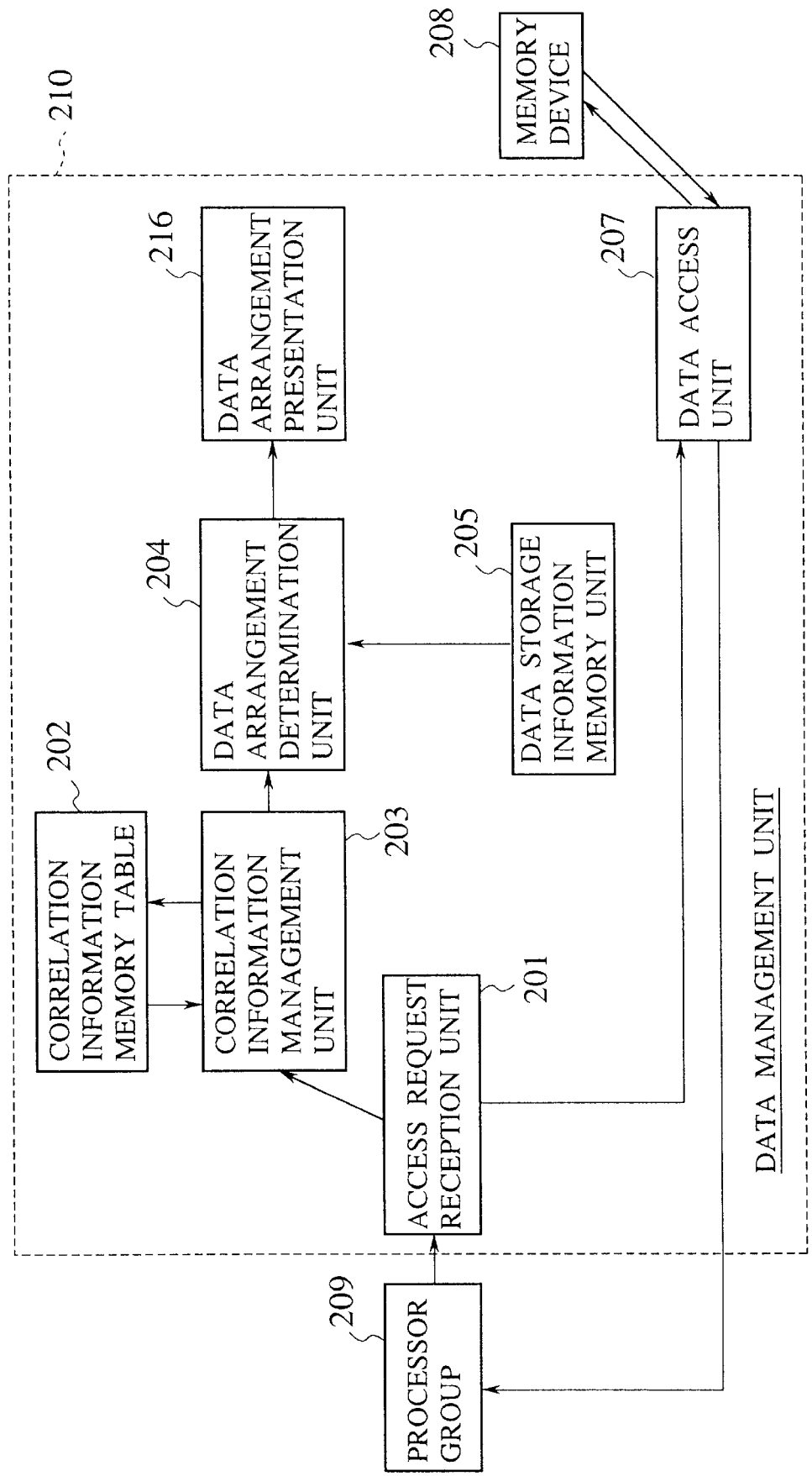
FIG. 67 is a block diagram of another possible modified configuration for the data management unit of FIG. 59.

Also, as shown in FIG. 67, it is possible to omit the data arrangement changing unit 206 and providing a data arrangement presentation unit 218 for presenting the data arrangement determined by the data arrangement determination unit 204 to the system manager, such that the data management unit 210 itself does not change the data arrangement.

Figure 68:
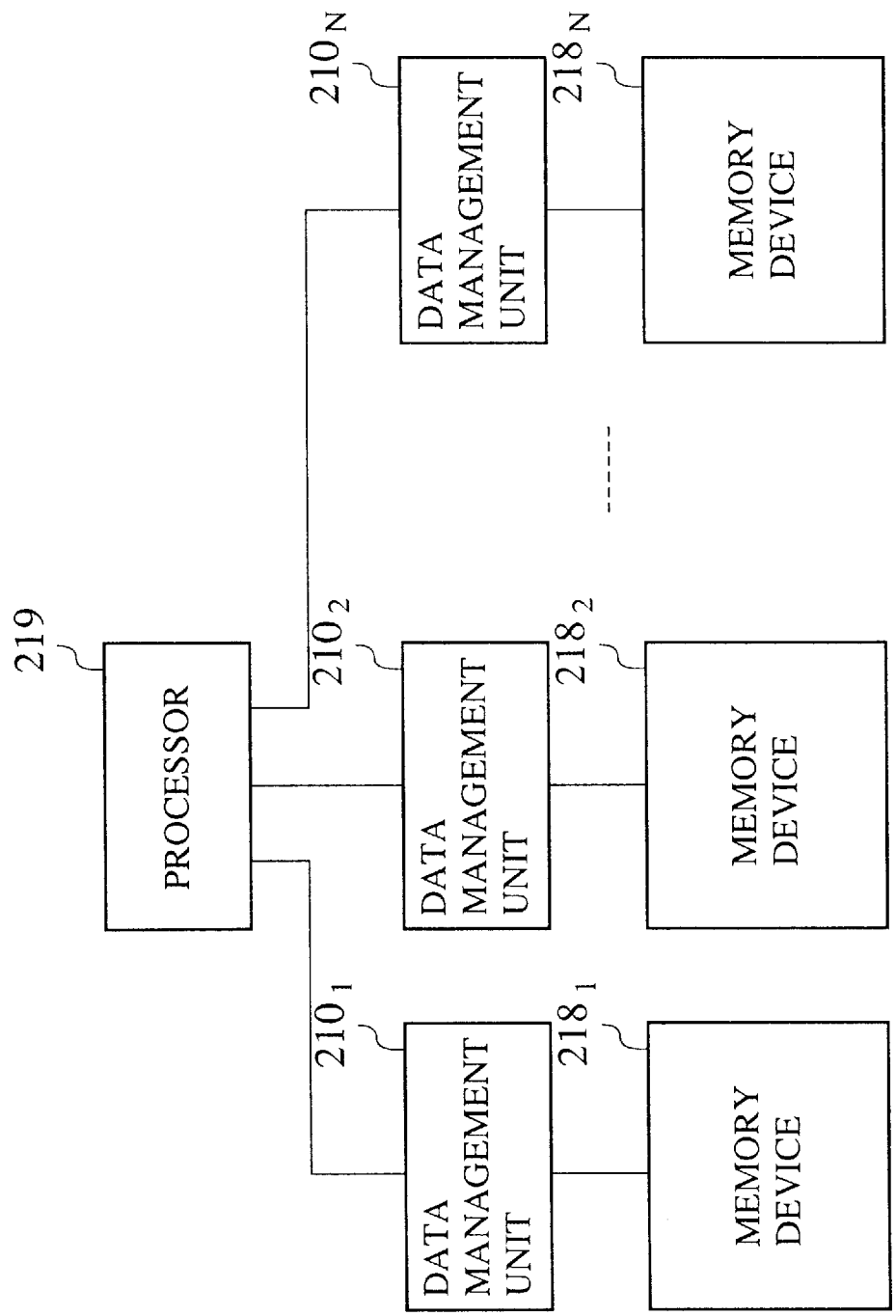
FIG. 68 is a schematic block diagram of one possible system configuration for the third embodiment of the present invention.
Figure 69:
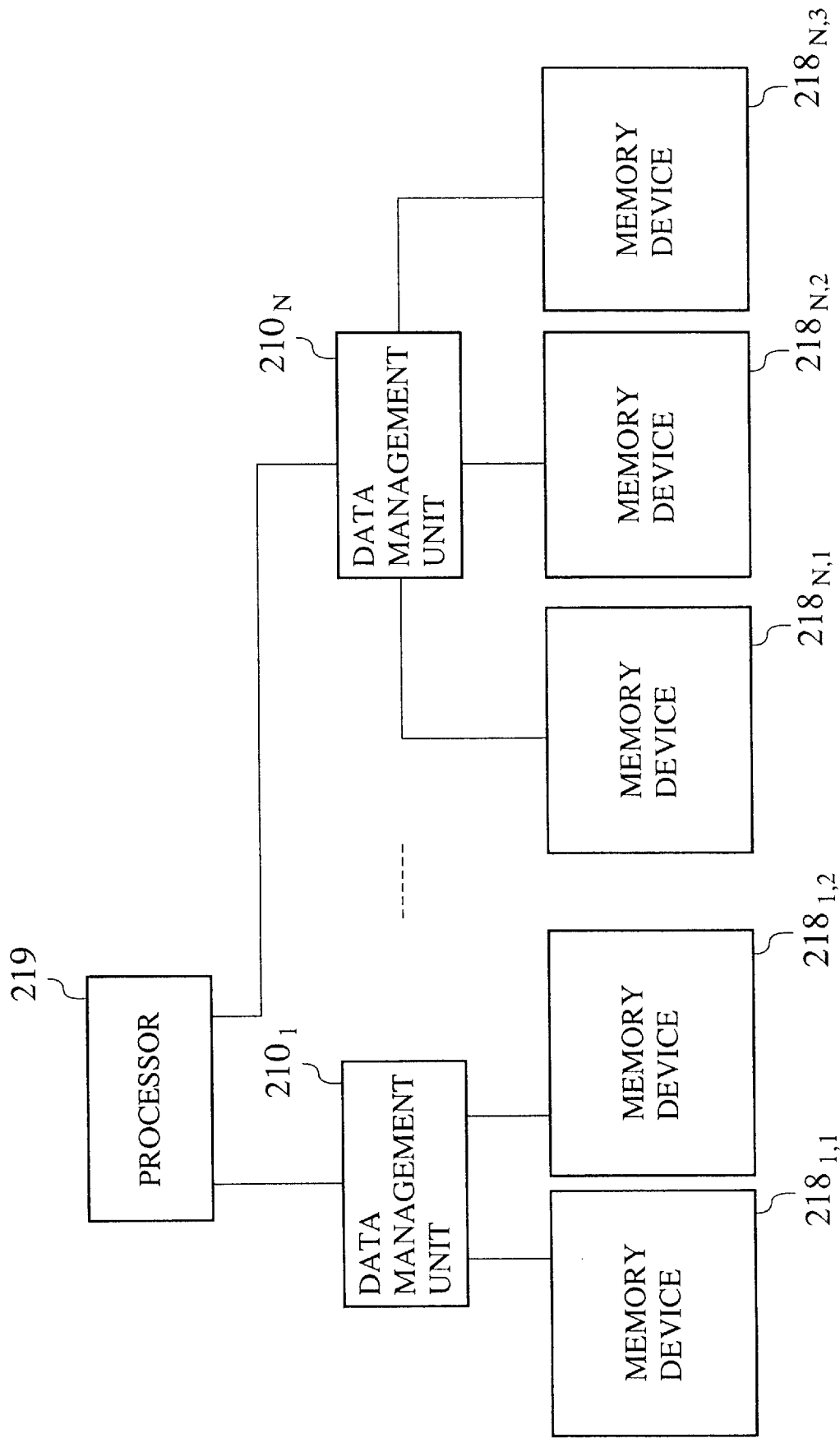
FIG. 69 is a schematic block diagram of another possible system configuration for the third embodiment of the present invention.
Figure 70:
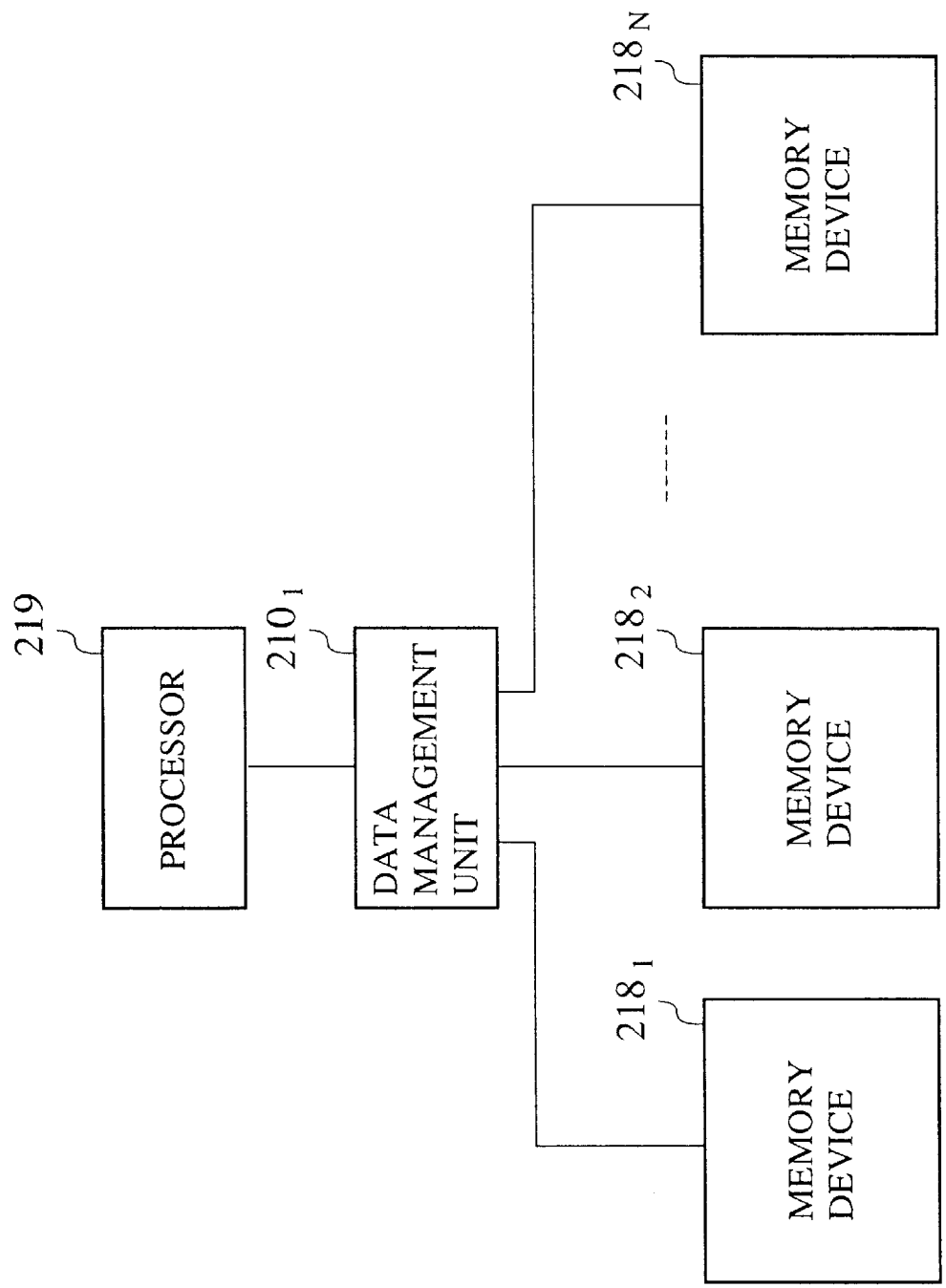
FIG. 70 is a schematic block diagram of another possible system configuration for the third embodiment of the present invention.

Also, in a case of using a plurality of memory devices for storing data, it is possible to provide the data management unit 210 of this third embodiment in correspondence to each memory device 218 under the control of a processor 219 as shown in FIG. 68, or to provide the data management unit 210 of this third embodiment in correspondence to each group of memory devices 218 under the control of a processor 219 as shown in FIG. 69, or else to provide only one data management unit 210 of this third embodiment for all the memory devices 218 as shown in FIG. 70.

Figure 71:
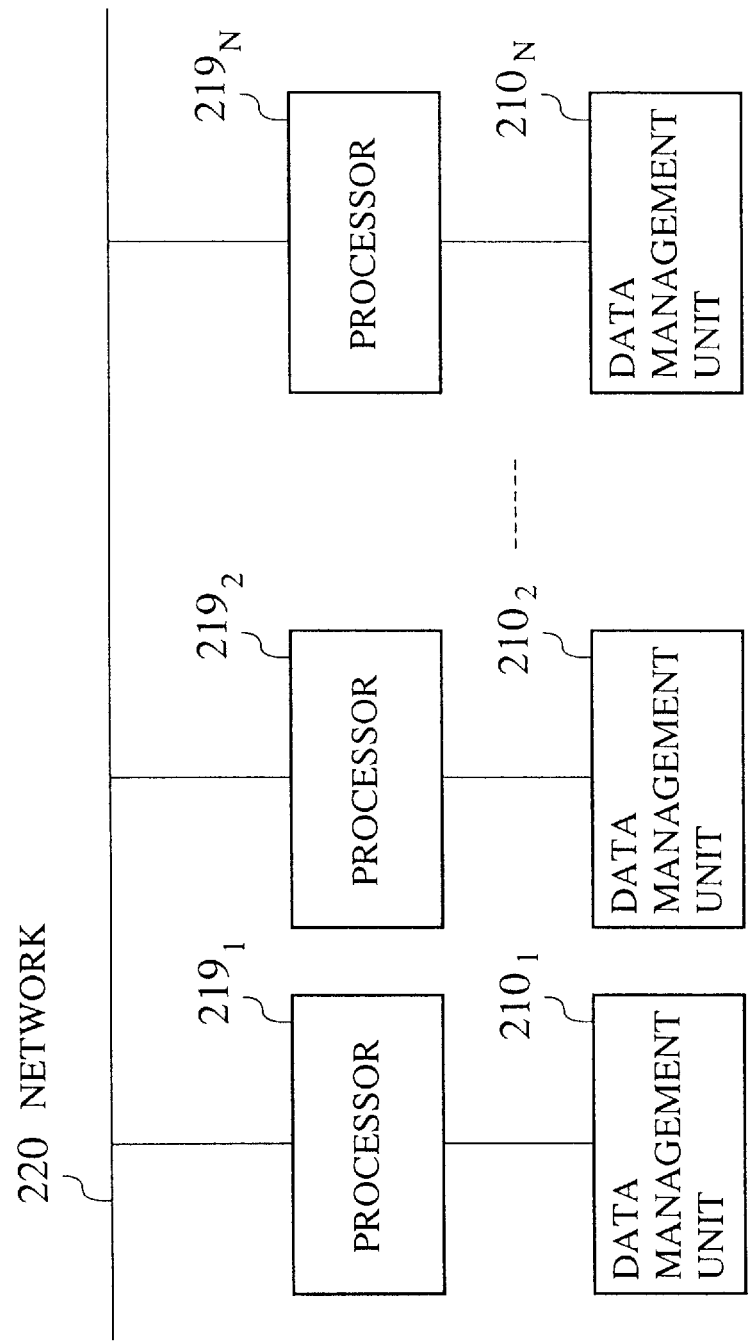
FIG. 71 is a schematic block diagram of another possible system configuration for the third embodiment of the present invention.
Figure 72:
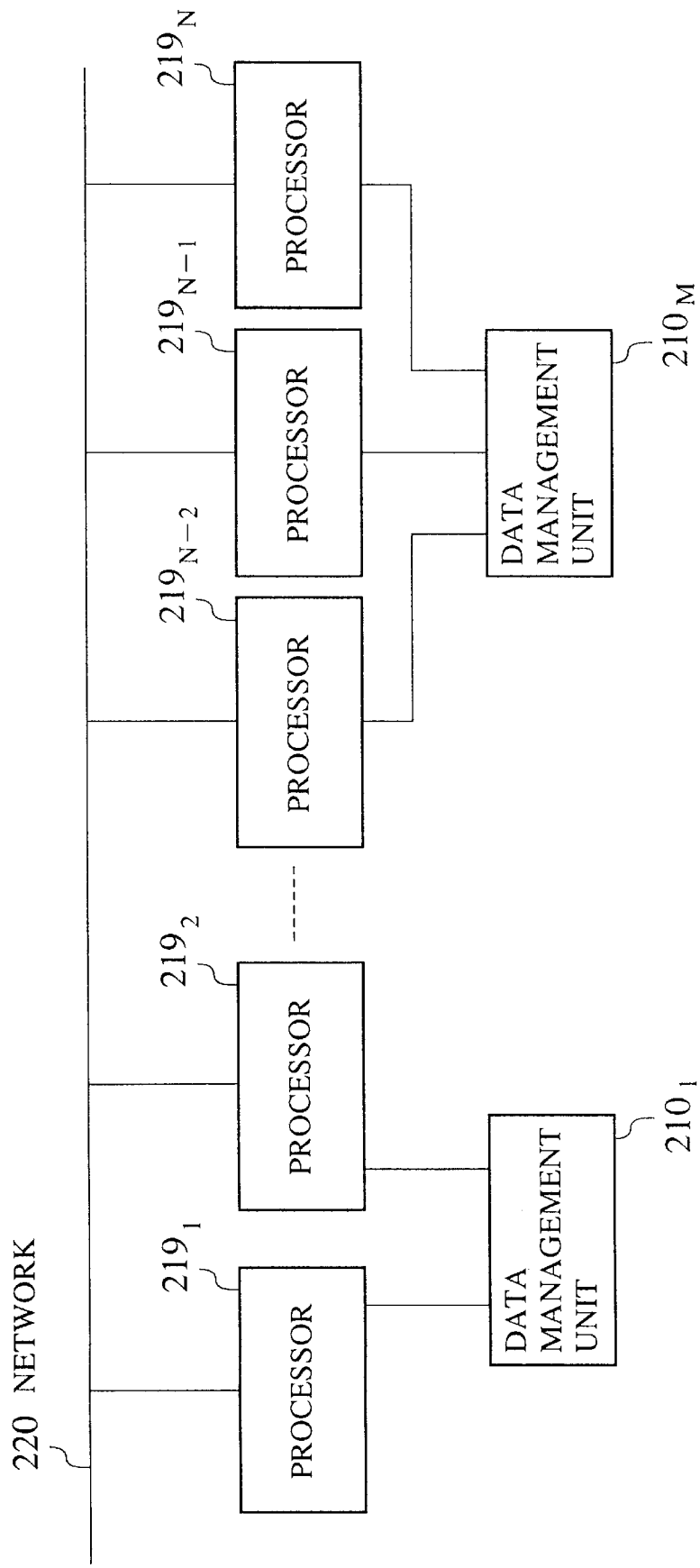
FIG. 72 is a schematic block diagram of another possible system configuration for the third embodiment of the present invention.

On the other hand, in a case of using a plurality of processors which manage the memory devices, it is possible to provide the data management unit 210 of this third embodiment in correspondence to each one of the processors 219 connected through a network 220 as shown in FIG. 71, or to provide the data management unit 210 of this third embodiment in correspondence to each group of processors 219 connected through a network 220 as shown in FIG. 72.

Figure 73:
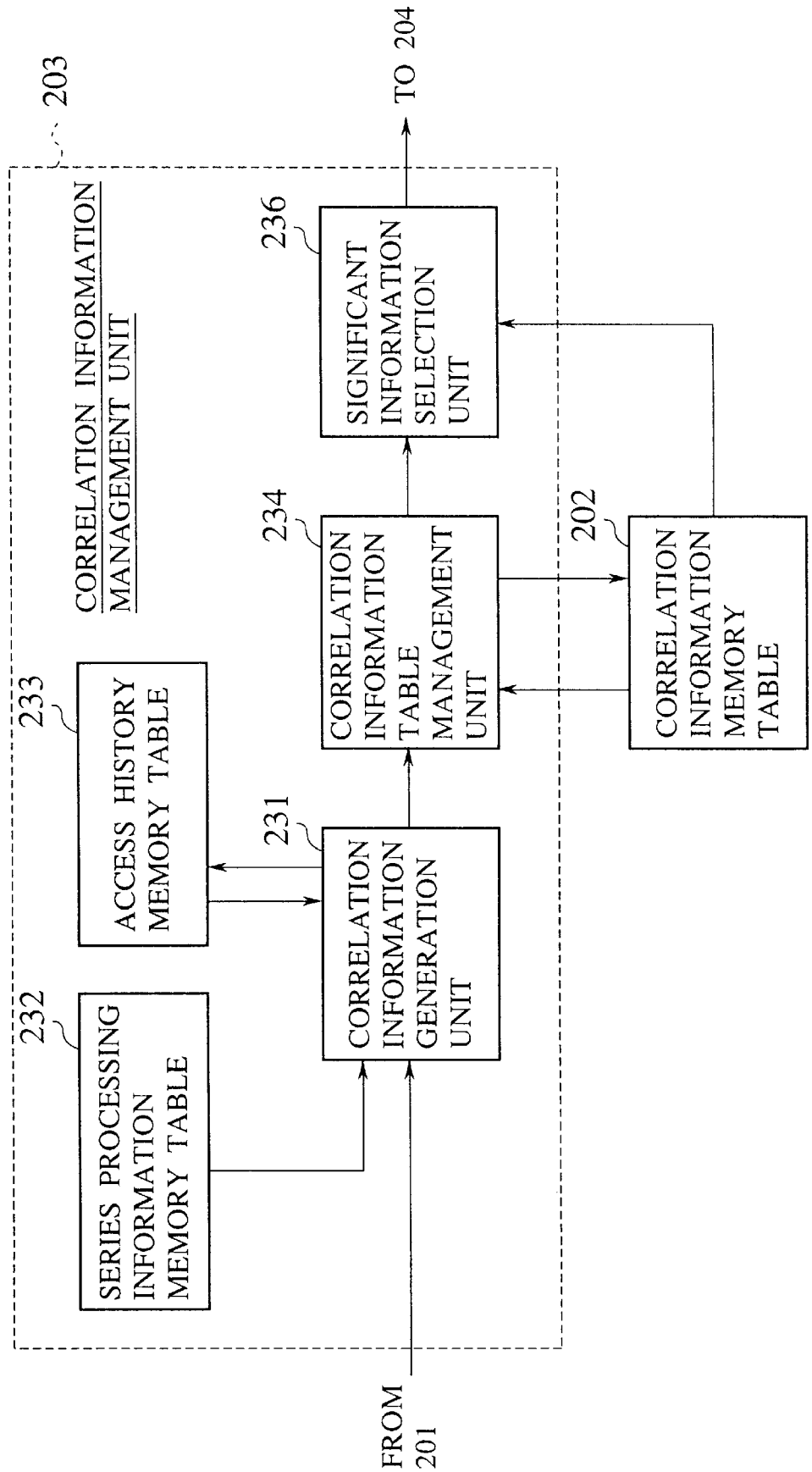
FIG. 73 is a block diagram of a correlation information management unit in the data management unit of FIG. 59.

Next, the correlation information management unit 203 in the data management unit 210 has a detailed configuration as shown in FIG. 73, which comprises: the correlation information generation unit 231 connected with the access request reception unit 201; a series processing information memory table 232 and an access history memory unit 233 connected with the correlation information generation unit 231; a correlation information table management unit 234 connected with the correlation information generation unit 231 and the correlation information memory table 202; and a significant information selection unit 236 connected with the correlation information table management unit 234, the correlation information memory table 202, and the data arrangement determination unit 204.

In this configuration of FIG. 73, the access request transmitted from the access request reception unit 201 is received by the correlation information generation unit 231. The access request comprises the data necessary for making an access and the data necessary for generating the correlation information. For example, the access request can include the processor ID, the process ID of the transaction, the ID for distinguishing each processing in the process, the memory device ID, the logical or physical address indicating the position of the data in the memory device, the data ID uniquely assigned to the data, the data accessing library ID, the access time, the parameters for distinguishing each data access from the other data accesses on the program. etc.

Figure 74:
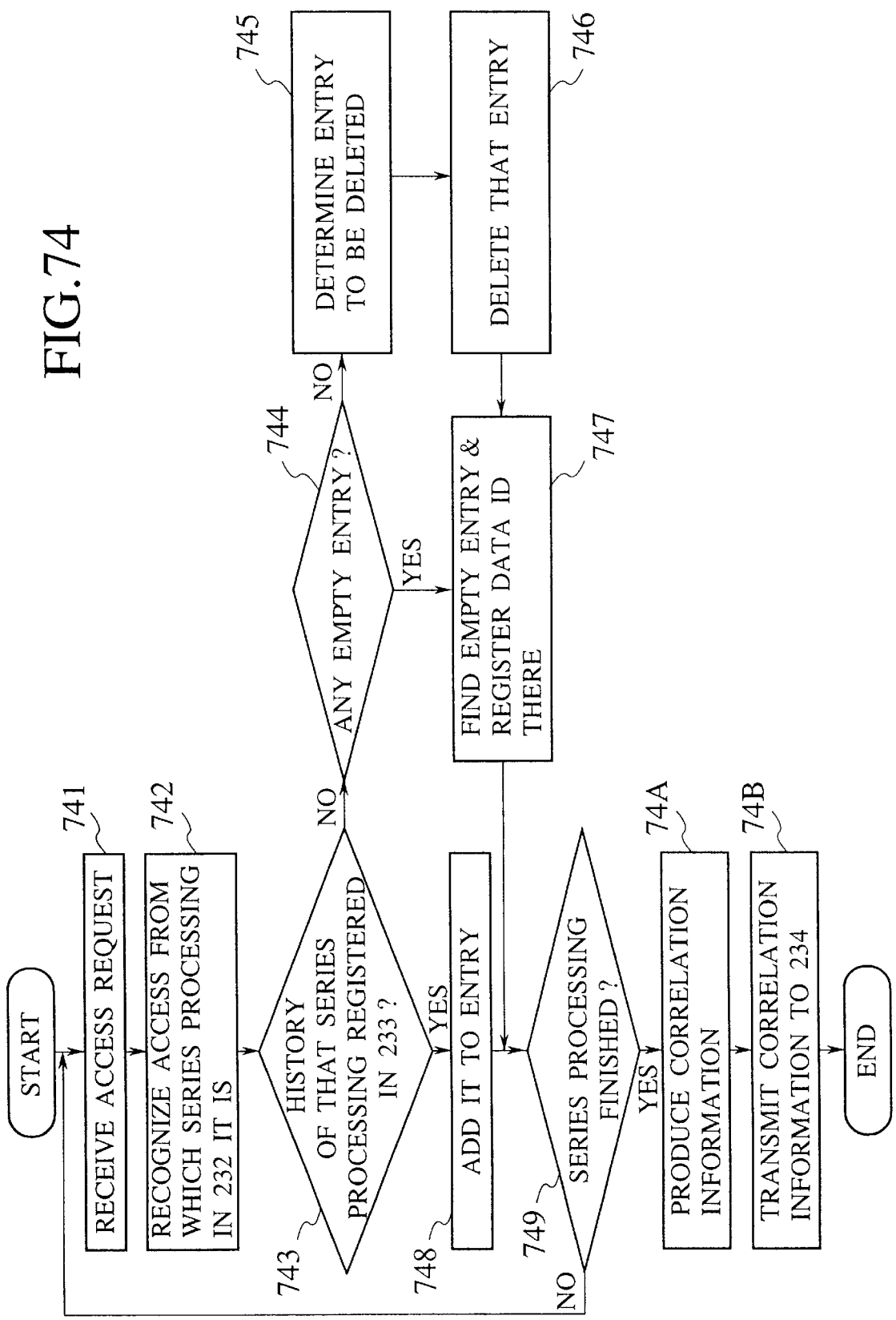
FIG. 74 is a flow chart for the operation of a correlation information generation unit in the correlation information management unit of FIG. 73.

This correlation information generation unit 231 operates according to the flow chart of FIG. 74 as follows.

When the access request for accessing the data is received (step 741), which series processing registered in the series processing information memory table 232 this access request has come from is recognized (step 742). Here, the series processing information memory table 232 registers what kinds of data access request sequence is to be treated as the series processing in advance.

Then, for the recognized series processing, the correlation information generation unit 231 determines whether the history of the series processing is registered in the access history memory table 233 (step 743). Here, the access history memory table 233 stores the history of the data IDs accessed in the past by each series processing. In a case the relevant entry is absent in the table, whether there is an empty entry in the table or not is determined (step 744), and if not, which entry of the table is to be deleted is determined (step 745) and deleted (step 746). Then, the correlation information generation unit 231 secures a new entry and registers the data ID of this data (step 747). In a case the relevant entry is present in the table, the new access is added to that entry (step 748).

Next, the correlation information generation unit 231 judges whether or not the series processing is going to be finished by this data access (step 749). Here, the series processing can be recognized according to the process ID processed by the transaction as the access sequence processed by the process having the same process ID on the same processor. When it is judged that the series processing is still continuing, the operation returns to the step 741 to await for the next input, whereas when It is judged that the series processing is finishing, the access history information for this series processing is read out from the access history memory table 233, and the correlation information is generated (step 74A) according to the access history information, and supplied to the correlation information table management unit 234 (step 74B).

Here, the series processing is the processings which are carried out from a prescribed start timing to a prescribed end timing. For example, the processings from the generation of a certain process to the termination of this process can be treated as the series processing, or in a case the process carries out the different processings according to the input, each case of carrying out one of these different processings can be defined as the series processing. It is also possible to divide the operation of the process into a plurality of parts, and define each of the divided parts as the series processing. It is also possible to define all the processings to be carried out as the transaction as the series processing. It is also possible to define all the series processing uniformly except for some particular processings. It is also possible to define everything that had been carried out between a prescribed starting time and an ending time as the series processing.

The correlation information generation unit 231 is capable of producing the correlation information only from the history of the access requests concerning the series processing. Here, the series processing makes a plurality of data accesses, so that the access history comprises a plurality of data IDs accessed by a plurality of the data accesses. For example, when a certain processing makes accesses to three data with the data IDs "a", "b", and "c", the correlation information generated by the correlation information generation unit 231 can be given in a form of a combination of a set of data IDs and a number of accesses to this set, such as (a, b, 1), (b, c, 1), and (a, c, 1) for example. Namely, for the access history formed by a set of n pieces of data IDs, the correlation information can be given by $_nC_2$ pieces of data ID combinations and the number of accesses for each data ID combination. It is also possible to form the correlation information in a form of a set of all the data IDs constituting the access history for the series processing and the number of accesses, such as (a, b, c, 1) for example.

For the data ID, it is possible to use the physical address or the logical address of the data, or the value assigned to the data in order to distinguish the data logically such as the tupple ID in the relational database or the record ID in the indexed sequential access file.

Instead of generating the correlation information only from the access history as in the above, it is also possible for the correlation information generation unit 231 to produce the correlation information from the access history and the data storage information obtained from the data storage information memory unit 205. In this case, the memory region storing the data is divided into blocks with each block containing a plurality of data, and the block number is uniquely assigned to each block and used as the ID of the data contained in each block. Here, the block can be in a form of a divided range of data value, or that which is treated collectively in the data management such as a tupple in the relational database, a record in the indexed sequential access file, or the logical region which is unrelated to the content of the data such as a page. For example, when a certain series processing makes accesses to the the data with the data IDs "a", "b,", and "c", and the block numbers of the blocks in which these data are stored are "10", "5", and "8", then the correlation information can be given in a form of a set (block number, block number, number of accesses) such as (10, 5, 1), (10, 8, 1), and (5, 8, 1).

In this manner, by converting the data ID into the block number assigned to the block containing a plurality of data, the number of IDs that can possibly be generated can be reduced. Therefore, the number of combinations that can possibly occur can be reduced and consequently the management in the correlation information table management unit 234 becomes easier.

It is possible for the access history memory table 233 to use the tree structure using the IDs assigned to a series of processings as keys, in which the accessed data IDs can be stored by the connected list structure at the leaves portion of the tree. It is also possible for the access history memory table 233 to use the hash table and the connected list structure instead of using the tree structure. It is also possible to use the tree structure using the addresses as keys in storing the data accessed by each process instead of using the connected lists.

Figure 75:
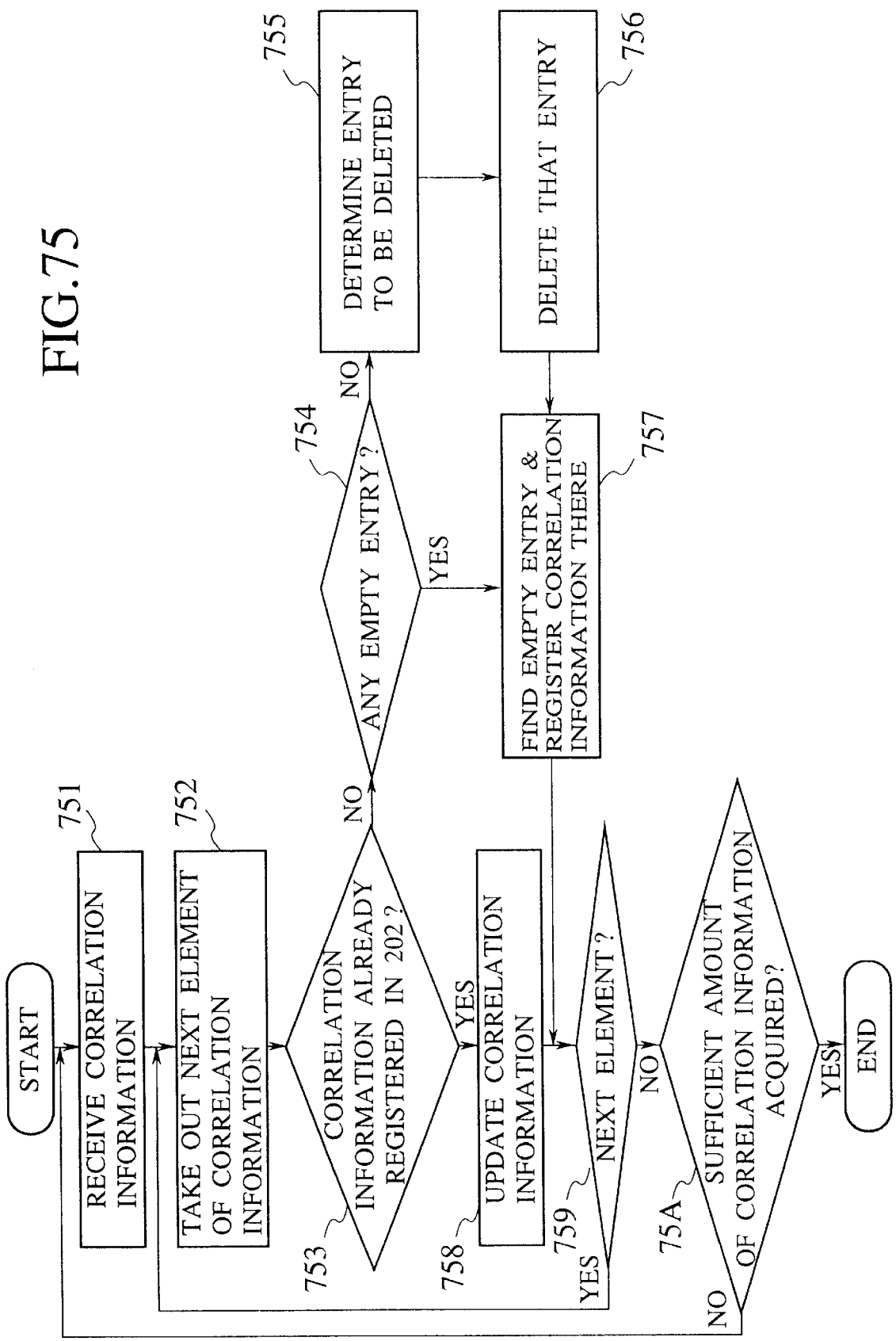
FIG. 75 is a flow chart for the operation of a correlation information table management unit in the correlation information management unit of FIG. 73.

The correlation information generated by the correlation information generation unit 231 is received by the correlation information table management unit 234, which operates according to the flow chart of FIG. 75 as follows.

When the correlation information is received from the correlation information generation unit 231 (step 751), the correlation information table management unit 234 takes out each element of the correlation information (step 752) and checks whether it is already stored in the correlation information memory table 202 or not (step 753). In a case the correlation information is not yet stored in the correlation information memory table 202, whether there is an empty entry in the table or not is determined (step 754), and if not, which entry of the table is to be deleted is determined (step 755) and deleted (step 756). Then, the correlation information table management unit 234 secures a new entry and registers the correlation information (step 757). In a case the correlation information is already stored in the correlation information memory table 202, the correlation information in the correlation information memory table 202 is updated (step 758). This operation is carried out for each element of the correlation information received from the correlation information generation unit 231 (step 759).

Then, the correlation information table management unit 234 judges whether the sufficient amount of the correlation information for producing a new arrangement has been acquired or not (step 75A). When it is judged that the sufficient amount has been acquired, this fact is notified to the significant information selection unit 236 and the current content of the correlation information memory table 202 is copied to another memory region, or the content of the correlation information memory table 202 at that point is transmitted to the significant information selection unit 236. When it is judged that the sufficient amount has not been acquired, the operation returns to the step 751 to await for the next correlation information.

Here, whether the sufficient amount of the correlation information has been acquired or not can be judged as follows. For example, it is possible to judge that the sufficient amount has been acquired when a prescribed period of time since the start of the acquisition of the correlation information has elapsed. In this case, it is possible to obtain the information from the time zone at which the processings are concentrated in the system which carries out the similar routine processings every day. It is also possible to set up the intended number of acquisitions of the correlation information in advance, and judge that the sufficient amount has been acquired when the number of acquisitions of the correlation information exceeds that intended number. Here, it is also possible to urge the system manager to specify the intended number in advance. It is also possible to count the significant ones among the received correlation information by the significant information selection unit 236 by using a certain judgement standard as will be described below, and judge that the sufficient amount has been acquired when the number of significant ones reaches to a certain number. It is also possible to present the received correlation information to the system manager at an appropriate timing, and urge the system manager to specify the end of the acquisition of the correlation information.

When the notice indicating that the sufficient amount of correlation information has been acquired is received from the correlation information table management unit 234, the significant information selection unit 236 takes the correlation information table transmitted from the correlation information table management unit 234 or the copy of the correlation information table taken by the correlation information table management unit 234. Then, the significant ones among the received correlation information are selected and transmitted to the data arrangement determination unit 204. It is also possible to supply all of the acquired correlation information to the data arrangement determination unit 204 without selecting the significant ones.

Here, the significant ones can be selected by providing means for sorting the correlation information in the order of the access frequency contained in the correlation information, and selecting a prescribed number of correlation information in the sorted access frequency order as the significant ones. It is also possible to judge the correlation information which has the number of accesses greater than a number obtained by multiplying the highest access frequency by a prescribed ratio as significant. It is also possible to judge the correlation information which has the number of accesses greater than a number obtained by multiplying the total number of accesses by a prescribed ratio as significant. It is also possible to check the distribution of the number of accesses and select the significant ones according to the average value, the standard deviation, etc.

In the above configuration, the acquisition of the correlation information is continued even after the significant information is selected by the significant information selection unit 236, but it is also possible to use such a scheme that, when the correlation information table management unit 234 judge that the sufficient amount has been acquired, after either the correlation information table at that point is saved or the content of the correlation information table is transmitted to the significant information selection unit 236, the data used up to then are discarded and the new correlation information is acquired again. In this manner, it becomes possible to change the data arrangement dynamically in accordance with the change of the transaction.

The correlation information memory table 202 comprises a plurality of entries for storing the correlation information, where each entry stores a set of accessed data IDs and its frequency of occurrences. It is also possible to form each entry from a set of block numbers and the frequency of occurrences, instead of using the data IDs. As the frequency of occurrences, it is possible to store the frequency of occurrences itself, or the value obtained by normalizing the frequency of occurrences, or the function value of an arbitrary function which has the frequency of occurrences as its argument.

When all the entries managed by the correlation information memory table 202 are already used, there is a need for the correlation information table management unit 234 to secure a new empty entry. This can be done by providing a field for storing the time of the last updating for each entry, and removing the entry which had been updated in the oldest time from the correlation information memory table 202. It is also possible to provide means for sorting the entries of the correlation information memory table 202 by their access frequencies, and remove the entry with the lowest access frequency. It is also possible to classify the entries of the correlation information memory table 202 into the significant ones and the insignificant ones according to their access frequencies, and the entry to be removed can be selected according to any of the above described schemes only among the insignificant ones. Here, the significant entries can be selected by the scheme similar to that used in the significant information selection unit 236.

Next, the data arrangement determination unit 204 operates according to the flow chart of FIG. 76 as follows.

First, when the (significant) correlation information is received from the significant information selection unit 236, the data arrangement determination unit 204 carries out the initialization operation to read out the data storage information concerning which data is stored in which memory device, or which memory device has how much memory capacity, etc. from the data storage information memory unit 205 (step 761).

Then, for the current data arrangement as well as for any new data arrangement determined at the step 767 below, the data arrangement is evaluated according to the data storage information and the correlation information by using a prescribed evaluation function (step 762), and the obtained evaluation value is compared with the stored evaluation value for the previous data arrangement (step 763). If the newly obtained evaluation value is better than the stored evaluation value, then the current or new data arrangement and evaluation value are stored by overwriting the previous data arrangement and evaluation value (step 764). Then, the stored evaluation value is sufficiently good or not is judged according to the prescribed criteria (step 765). When the current or new evaluation value is not better than the stored evaluation value, or when the stored evaluation value is not sufficiently good, whether there is any remaining possibility for changing the data arrangement further or not is determined (step 768) and if so, a new data arrangement is obtained by changing the previous data arrangement further (step 767) and the operation returns to the step 762. When the stored evaluation value is sufficiently good or when there is no remaining possibility for changing the data arrangement further, the stored data arrangement at that point is supplied to the data arrangement changing unit 206 (step 768).

Here, the data arrangement determination unit 204 evaluates the data arrangement as follows.

For example, when there are N data and M data storage regions, It is possible to express all possible cases of the i-th data stored in the j-th data storage region by using NM variables Xij ($1 \leq i \leq N$, $1 \leq j \leq M$, Xij=0 or 1). Then in a case the i-th data and the k-th data are frequently used together, it is preferable to store these data in the same data storage region as much as possible. To this end, it is possible to evaluate the data arrangement by using the function defined by the following equation (1).

$$Q = \sum_{j=1}^{M} \sum_{i=1}^{N} \sum_{k=1}^{N} Cik \times Xij \times Xkj \qquad (1)$$

In this function, the evaluation value Q is increased for Cik when the i-th data and the k-th data are stored in the same j-th data storage region. However, when this function is used, although the arrangement of these data in the same storage region can be guaranteed, it is impossible to ascertain which data storage region they are going to be stored. Thus, when it is preferable not to move the i-th data from the j-th data storage region in which it has originally been stored, the function defined by the following equation (2) can be used.

$$Q = \sum_{j=1}^{M} \sum_{i=1}^{M} \sum_{k=1}^{M} Xij \times Xkj \times Dik - \sum_{i=1}^{M} \sum_{j=1}^{M} V(Xij) \qquad (2)$$

Here, the factor V(Xij) is a function indicating the penalty for moving the i-th data from the j-th data storage region in which it has originally been stored, and the factor Dik is a proportionality constant for balancing the first term with the penalty of the second term. This penalty factor V(Xij) can be defined by using the Kronecker's delta function $\delta(i, j)$ as in the following equation (3).

$$V(Xij) = 1 - Xij \times \delta(i, Di) \qquad (3)$$

It is to be noted that there is no need to limit the evaluation function for evaluating the data arrangement to those of the quadratic forms as described above, and the equations of the higher degrees may be used if desired. Similarly, the manner of expressing the variables may be different from that described above. In addition, it is also possible to use the evaluation function which accounts for the access frequency or the load of the memory device to which the data are arranged. It is also possible to describe these considerations as the constraint conditions for the evaluation function.

Now, when the data arrangement is evaluated by using the evaluation function as described above, there may be a case in which the evaluation value does not change regardless of whether a certain data is arranged in one data storage region "a" or the other data storage region "b". In such a case, the data arrangement determination unit 204 randomly selects the data storage region to arrange this certain data. It is also possible to present the candidate data storage regions to arrange this certain data to an operator and urge the operator to specify the desired data storage region to arrange this certain data. It is also possible to provide the uniquely assigned number to each data storage region, and select the data storage region assigned with the smaller number or the larger number as the data storage region to arrange this certain data. It is also possible to introduce the concept of distance using this number, and select the data storage region for which the distance between the currently stored data storage region and the new data storage region after the rearrangement is shorter, Here, the distance between two data storage regions can be defined as a difference of the numbers assigned to these two data storage regions. It is also possible to provide means for evaluating the mutual relevancy of the data so as to evaluate the relevancy of the data to be moved and the data stored in each moving target data storage region, and to select the data storage region which stored more data with the high evaluated relevancy than the others. Here, the relevancy can be given by the number of stages in the partial tree which contains leaves indicating the positions of both date while producing the index of the data from the tree structure, or the information concerning whether both data are contained in the same relation or not in a case of the relational database. It is also possible to provide means for checking the load of each memory device and select the data storage region in the memory device with the lighter load.

By setting the evaluation function in the above manner, the evaluation values can be obtained for all possible combinations in the data arrangement and the best data arrangement can be determined. Also, after the setting of the evaluation function in the above manner, it is also possible to reduce the procedure for obtaining the best data arrangement into the linear programming problem and solve it by the linear programming method. It is also possible to solve this problem by utilizing the simulated annealing method. Also, in a case it is not necessary to obtain the very best data arrangement and it suffices to obtain the data arrangement close to the best, it is also possible to select the data arrangement sufficiently close to the best as soon as the data arrangement satisfying the predetermined conditions for judging the closeness to the best is found.

The data arrangement changing unit 206 changes the actual arrangement of the data according to the data arrangement supplied from the data arrangement determination unit 204. Here, it is necessary for the data arrangement changing unit 206 to prohibit the updating of the data to be changed before changing the data arrangement, because there is a possibility for destroying the consistency among the data if the updating of the data is allowed while the data are transferred from the original data storage region to the new data storage region in the data rearrangement operation. Thus, in order to make the data to be changed not writable, the lock of the data is requested to the device managing the locking of the data such as the data access unit 207 in the configuration of FIG. 59 and the data are locked. Then, after the data are transferred to the new data storage region, the lock of the data is released. It is also possible to make a copy of the data and allow the data updating only with respect to the copy during the data rearrangement operation, such that the updating made during the data rearrangement operation can be accounted in the original data after the data rearrangement operation is completed. In this case, the access to any data is allowed even during the data rearrangement operation.

Moreover, not necessarily all the memory devices have the same load at a time of the data transfer, and the data transfer requires a longer period of time for the memory device with heavier loads in addition, the load changes from time to time, so that by considering the possibility for the load of the memory device to be lighter afterwards, it is preferable to delay the data transfer from the memory device with the heavier load as late as possible. To this end, it is possible to provide means for checking the load of each memory device, and the higher priority for carrying out the data rearrangement operation can be set to the memory device with the lighter load.

Now, the exemplary case of applying the data management scheme of this third embodiment to the database using the indexed sequential access files stored on a plurality of disks will be described.

In this case, the system has a general configuration as shown in FIG. 77, in which the transactions for making data accesses are processed on a plurality of processors connected through a network, and the data to be accessed are distributedly stored in a plurality of memory devices in forms of disks associated with the respective processors. Here, the processors include one master processor 240 associated with a master data management unit 241 and a memory device 242, and the other processors 243 associated with the other data management units 244 and the other memory devices 245.

Figure 78B:
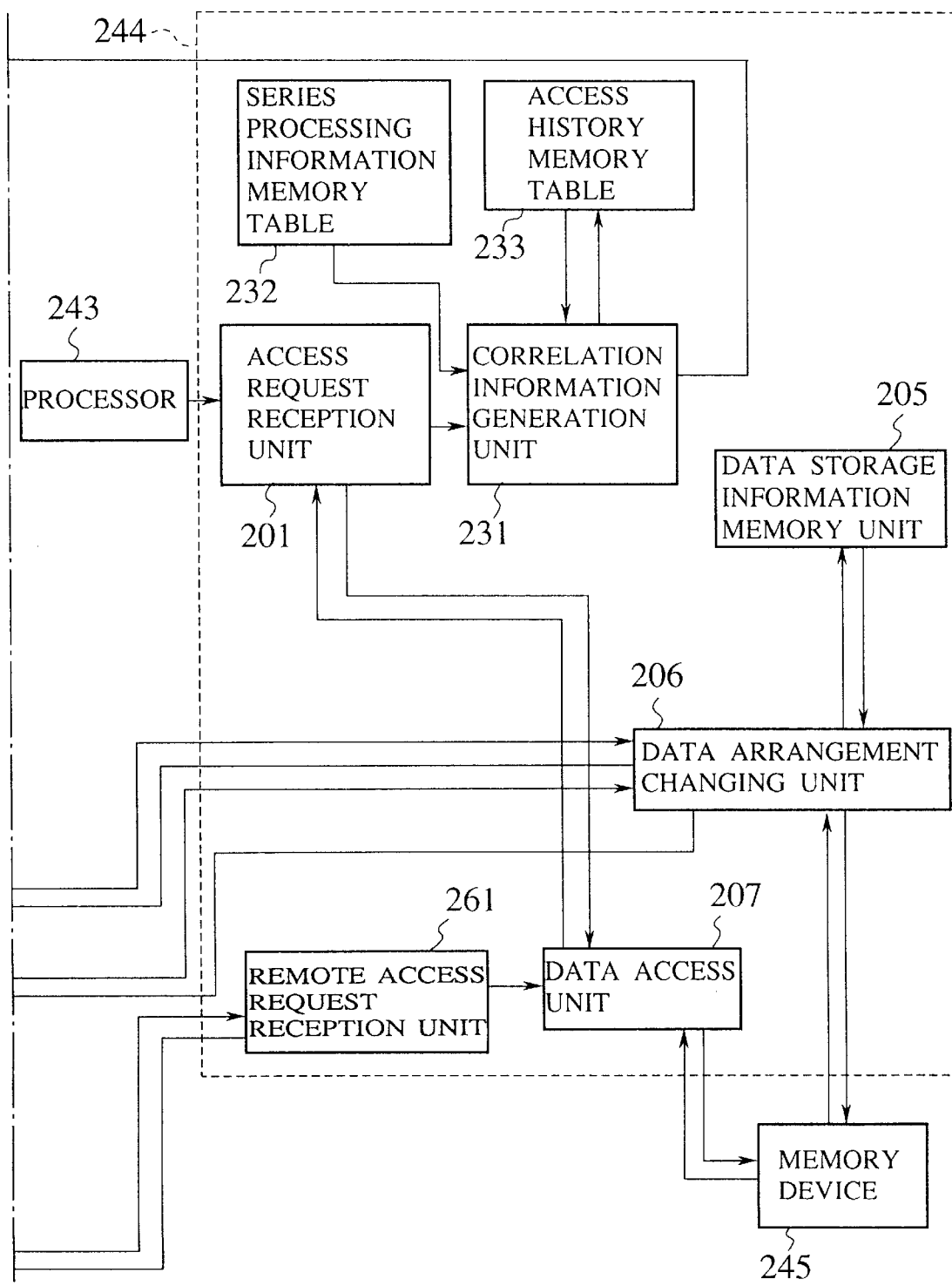

Here, the master data management unit 241 and each one of the other data management unit 244 have configurations as shown in FIG. 78. The other data management unit 244 includes the access request reception unit 201, the correlation information generation unit 231, the data arrangement changing unit 208, the access history memory table 233, the data storage information memory unit 205, the series processing information memory table 232, and the data access unit 207 similar to those in the configuration of FIG. 59 and FIG. 73 described above, as well as a remote access request reception unit 261 for receiving the access requests from the other data management unit when the data to be accessed is not present in the processor associated with that other data management unit but present in the processor associated with this data management unit 244. and supplying the requested data to the data access unit 207 in response to the receive access request.

The master data management unit 241 includes the access request reception unit 201, the correlation information generation unit 231, the data arrangement changing unit 206, the access history memory table 233, the data storage information memory unit 205, the series processing information memory table 232, the data access unit 207, the correlation information table management unit 234, the data arrangement determination unit 204, the significant information selection unit 236, and the correlation information memory table 202 similar to those in the configuration of FIG. 59 and FIG. 73 described above.

At a time of making access to the database, each transaction makes access by using the library function provided by the data management unit. The library function includes read( ) to be used in a case of reading out the data, write( ) to be used in a case of writing the data, commit( ) to be used in a case of carrying out the commit operation. etc. The data stored in the database are assigned with unique data ID, such that the data can be distinguished by specifying this data ID. Each transaction makes access by specifying this data ID at a time of making access.

When called up by the transaction, the library function acquires the process ID of the process which called it up from the operating system. The process ID is the identification number uniquely assigned to each process by the operating system, Then, the library function transmits the process ID, the data ID to be accessed, a flag indicating which library has been called up, a parameter for distinguishing a plurality of series processings defined in one process which will be described below, and parameters necessary in the access processing. The parameter for distinguishing the series processings can be given by a numerical value which is uniquely determined and assigned for each processing to be carried out in the process.

The access request reception unit 201 transmits the process ID, the data ID, the parameter for distinguishing the series processings, and the flag indicating the library to the correlation information generation unit 231, while transmitting the data ID to be accessed and the parameter necessary for the data access to the data access unit 207. The data access unit 207 searches through the index in the data storage information memory unit 205 as shown in FIG. 79A by using the received data ID as the key. The index of FIG. 79A has a tree structure using the data ID as the key, in which the flags indicating on which processor this data is stored, at which position of which file this data is stored when this data is present on this processor, and whether the lock is set with respect to this data or not are stored in the leaves portion of the tree structure.

When it is recognized that this data is present in the processor associated with this data management unit as a result of the index search, the data access unit 207 makes access to this data according to the search result, and the access result is transmitted to the library function. In the data access, by setting up the data lock flag to the index for that data, it is possible to prohibit the access by the other processes if necessary. In a case this data is stored in the other processor, the access request for this data is transmitted to the data management unit associated with that other processor, and the access result received in response is returned to the library function so as to complete the data access processing for this data.

When the process ID, the data ID, the flag indicating the library, and the parameter for distinguishing the series processings are received from the access request reception unit 201, the correlation information generation unit 231 searches through the series processing information memory table 232 according to the process ID. In the series processing information memory table 232, what kinds of processings are going to be regarded as the series processing is defined for each process as shown in FIG. 80A.

In the example shown in FIG. 80A, for the process with the process ID "10", the series processing is defined as starting when the called up library function is begin( ) and ending when the called up library function is commit( ). while the process with the process ID "20", two series processings are defined as starting when the called up library function is begin( ) and ending when the called up library function is commit( ) for each of two different parameter values. In this example, the parameter is given by only one variable of the integer type which takes the positive value, but it is also possible to set up a plurality of parameters. The series processing information memory table 232 also includes a portion for defining the default processing as shown in FIG. 80B, in which the series processing is defined as starting when the called up library function is init( ) and ending when the called up library function is exit( ), and those processes whose process IDs are not enlisted in FIG. 80A are going to follow this default definition.

It is possible to assign the uniquely determined number to each series processing. Here, there are cases in which a plurality of series processings are to be defined for one process, the unique number to be assigned to each series processing can be given by a set of numbers in a form of (process ID, serial number of processings in the process). In a case of the default processing, there is only one processing in the process, so that the series processing number is going to be given as (process ID, 1).

The correlation information generation unit 231 judges which series processing it is for which the current access is a part of by searching through the series processing information memory table 232, to obtain the processing number of that series processing. Then, the access history memory table 233 is searched through by using the obtained processing number as the key.

Figure 81:
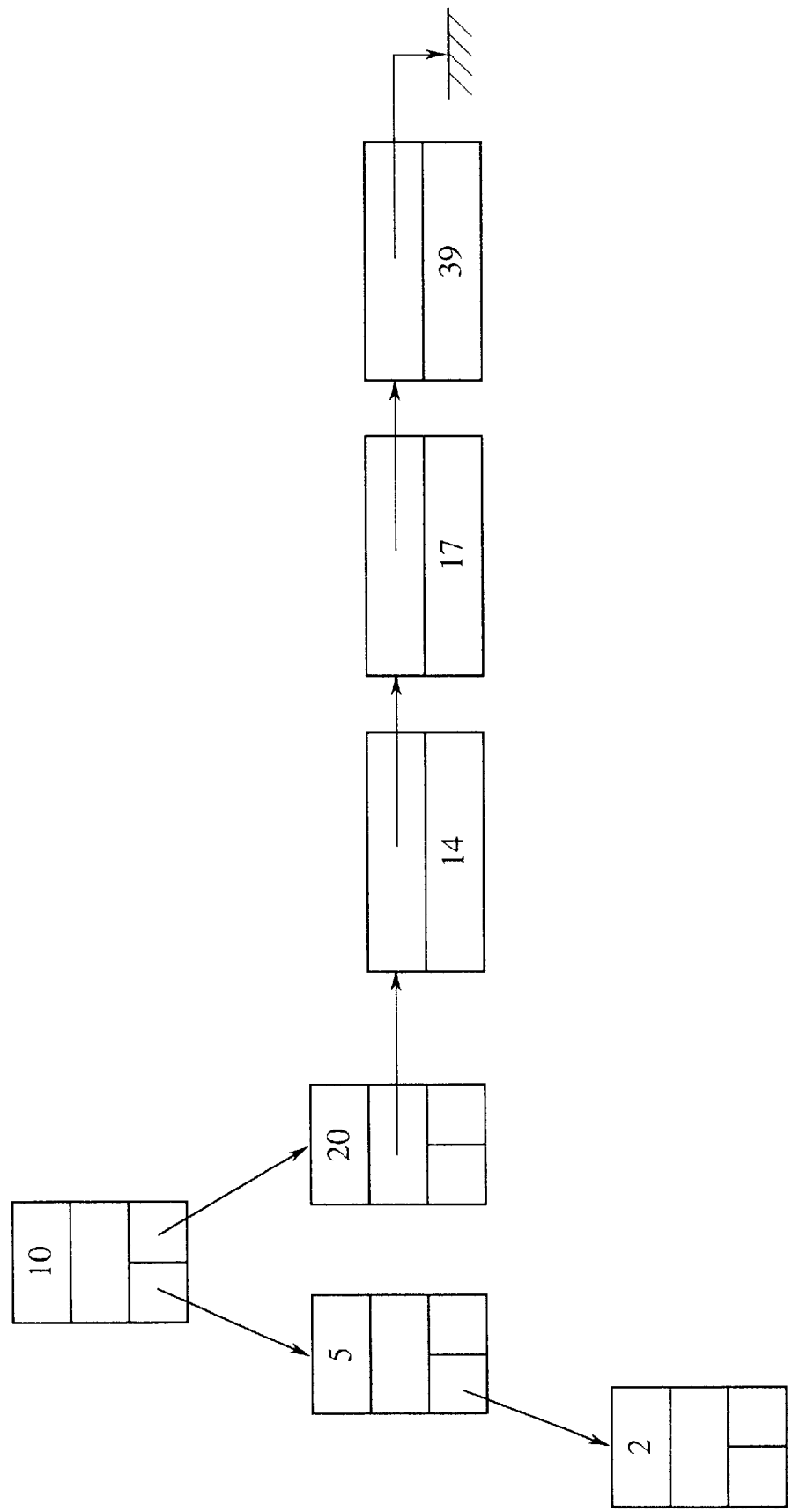
FIG. 81 is a diagrammatic illustration of an access history memory table in the data management units of FIG. 78.

The access history memory table 233 has a data configuration as shown in FIG. 81 which is in a tree structure with the process IDs as keys, where a plurality of connected list structures are attached to the leaves portion in correspondence to the serial number assigned to each processing in the process and storing the accessed data IDs. In the example of FIG. 81, the history for the process IDs "2", "5", "10", and "20" are stored.

In a case no entry for that processing is found by searching through the access history memory table 233, whether it is the call from the library for starting the series processing or not is judged by comparing the flag indicating the library received from the access request reception unit 201 and the flag indicating the starting library of that entry of the series processing information memory table 232, and when if the present access is that which starts the series processing, the entry for this processing is newly secured and the data ID is stored in the connected list.

On the other hand, when the compared flags are different, nothing is done. When there is an entry for this processing as a result of the searching through the access history memory table 233, the data ID of the data accessed this time is added to the connected list. Then, the flag indicating the library received from the access request reception unit 201 and the flag indicating the ending library in the series processing information memory table 233 are compared, and nothing is done when they are different. When they coincide, however, the series processing is going to be completed by this access, so that all the data ID accessed by this processing in the past are read out in order to generate the correlation information while this entry is deleted.

The correlation information generation unit 231 produces the correlation information as follows. Suppose the data IDs accessed in the just completed series processing are "14", "17", and "39", then the correlation information generation unit 231 generates the information in a form of (data ID, data ID, a number of accesses), such as (14, 17, 1), (14, 39, 1), and (17, 39, 1). Then, the set of these correlation information is transmitted to the correlation information table management unit 234 on the master data management unit 241.

Figure 82:
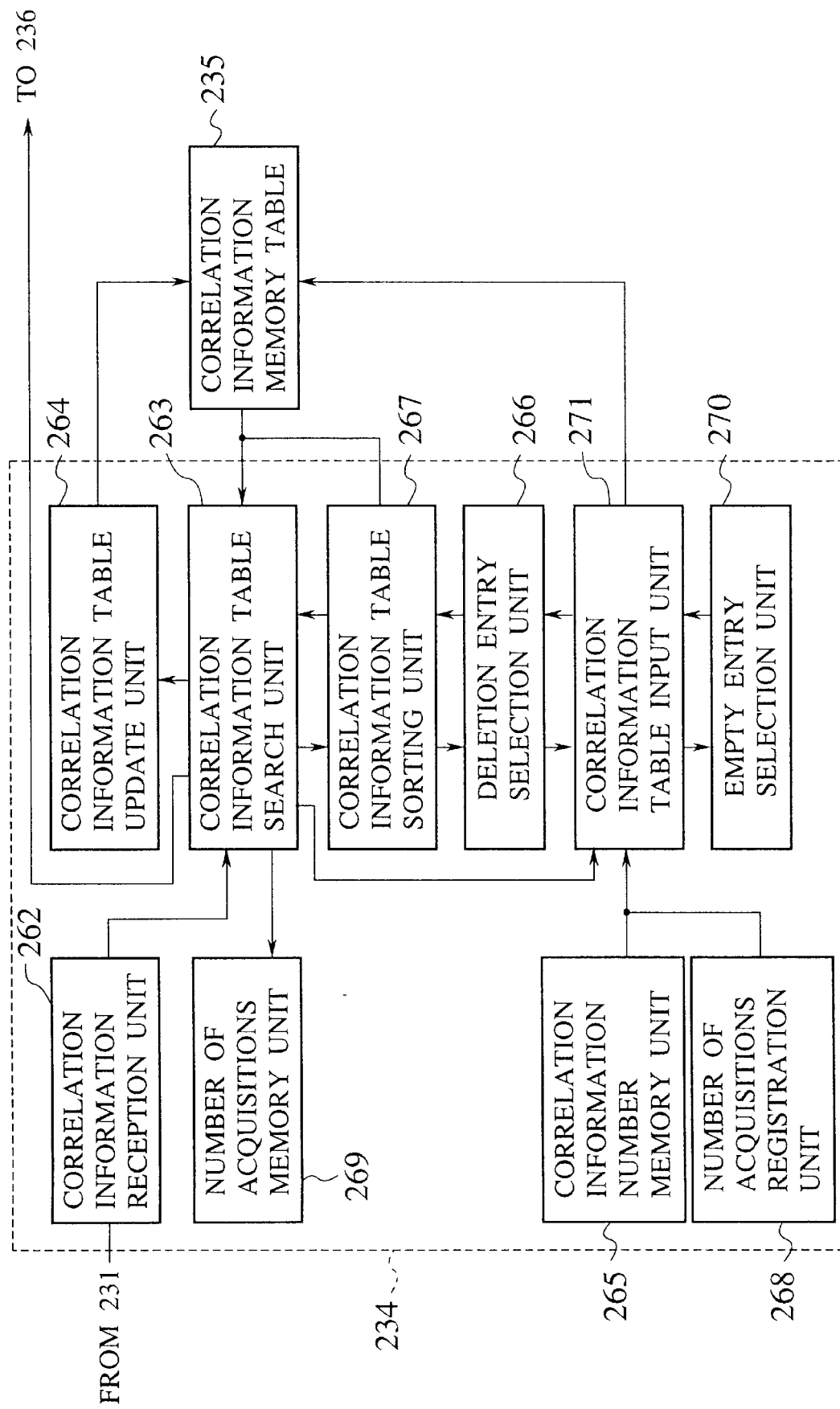
FIG. 82 is a block diagram of a correlation information table management unit in the data management units of FIG. 78.

The correlation information table management unit 234 on the master data management unit 241 has a configuration as shown in FIG. 82, which comprises: a correlation information reception unit 262 for receiving the correlation information from the correlation information generation unit 231 of each data management unit; a correlation information table search unit 263 for searching whether the received correlation information is already present in the correlation information memory table 202; a correlation information table update unit 264 for updating each correlation information in the correlation information memory table 202; a correlation information number memory unit 265 for storing how many correlation information are registered in the correlation information memory table 202; a deletion entry selection unit 266 for selecting the correlation information to be stored in a case the correlation information memory table 202 becomes full; a correlation information table sorting unit 267 for sorting the entries of the correlation information memory table 202 according to the number of accesses; a number of acquisitions registration unit 268 for registering a number of times for which the correlation information is to be acquired; a number of acquisition memory unit 269 for storing a number of times for which the correlation information has been acquired currently; an empty entry selection unit 270 for selecting the entry which is empty in a case the correlation information memory table 202 is not full; and a correlation information table input unit 271 for inputting new data into the correlation information memory table 202.

Figure 83:
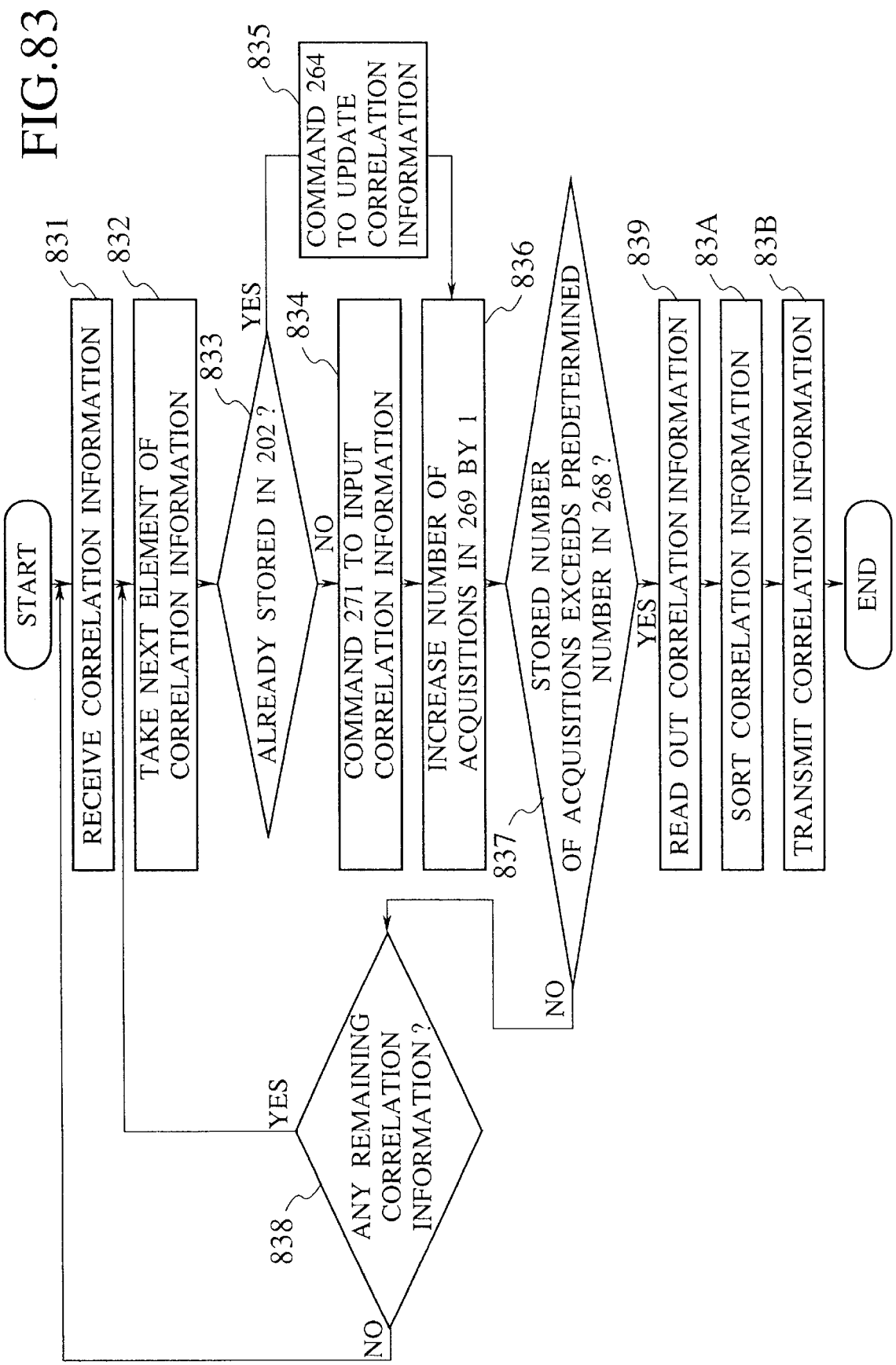
FIG. 83 is a flow chart for the operation of a correlation information table management unit in the data management units of FIG. 78.

This correlation information table management unit 234 operates according to the flow chart of FIG. 83 as follows.

First, the correlation information transmitted from the correlation information generation unit 231 is received by the correlation information reception unit 262 (step 831). Here, the correlation information comprises a plurality of information as described above, so that each element of the correlation information is taken out (step 832), and whether it is already stored in the correlation information memory table 202 or not is judged for each element of the correlation information by using the correlation information search unit 263 (step 833). As a result of the search, when it is not stored in the correlation information memory table 202, the correlation information table input unit 271 is commanded to input this correlation information as a new data into the correlation information memory table 202 (step 834), whereas when it is already stored in the correlation information memory table 202, the correlation information table update unit 264 is commanded to update this correlation information in the relevant entry (step 835). Then, the number of acquisitions of the correlation information in the number of acquisition memory unit 269 is increased by one (step 836).

Next, the number of acquisitions stored in the number of acquisition memory unit 269 and the predetermined number of acquisition registered in the number of acquisition registration unit 268 are compared to see if the stored number of acquisitions exceeded the predetermined number of acquisitions (step 837). If not, whether there is any remaining correlation information or not is determined (step 838) and the operation returns to the step 831 when there is no remaining correlation information, or to the step 832 when there is a remaining correlation information.

On the other hand, when the stored number of acquisitions exceeded the predetermined number of acquisitions, it is judged that the sufficient amount of correlation information has been acquired, so that the current correlation information in the correlation information memory table 202 is read out (step 839), sorted (step 83A), and transmitted to the significant information selection unit 236 along with the notice that the sufficient amount of correlation information has been acquired (step 83B). Then, all the entries of the correlation information memory table 202 are deleted, and the acquisition of new correlation information is started. The above operation is carried out every element in the correlation information received from the correlation information generation unit 231.

The correlation information table input unit 271 reads out the number of correlation information currently stored in the correlation information memory table 202, to check if the correlation information memory table 202 is full or not. When it is not full, the empty entry selection unit 270 is commanded to select the empty entry, whereas when it is full, the deletion entry selection unit 266 is commanded to select the entry to be deleted from the correlation information memory table 202 and the new correlation information is stored in the selected entry.

The correlation information table update unit 264 receives the command for changing the correlation information in some entry, and increases the number of accesses for that entry by one.

The deletion entry selection unit 266 first uses the correlation information table sorting unit 267 to sort out the correlation information in the correlation information memory table 202 according to the number of accesses, and then randomly selects one entry among those entries for which the number of accesses is lowest after the sorting as the entry to be deleted.

As shown in FIG. 84, the correlation information memory table 202 comprises a plurality of entries for storing correlation information, and each entry comprises a set of accessed data IDs and the number of accesses for which both of these data IDs are used together.

The significant information selection unit 236 receives the notice that the sufficient amount of correlation information has been acquired and the correlation information is received from the correlation information table management unit 234, and selects the significant ones among the received correlation information. The entries of the correlation information memory table 202 are sorted according to the access frequency registered in each entry by the correlation information table management unit 234 in advance, so that those entries which have the number of accesses greater than a number obtained by multiplying the maximum number of accesses by a prescribed rate are selected as the significant ones. Then, only the obtained significant correlation information is transmitted to the data arrangement determination unit 204.

Figure 85:
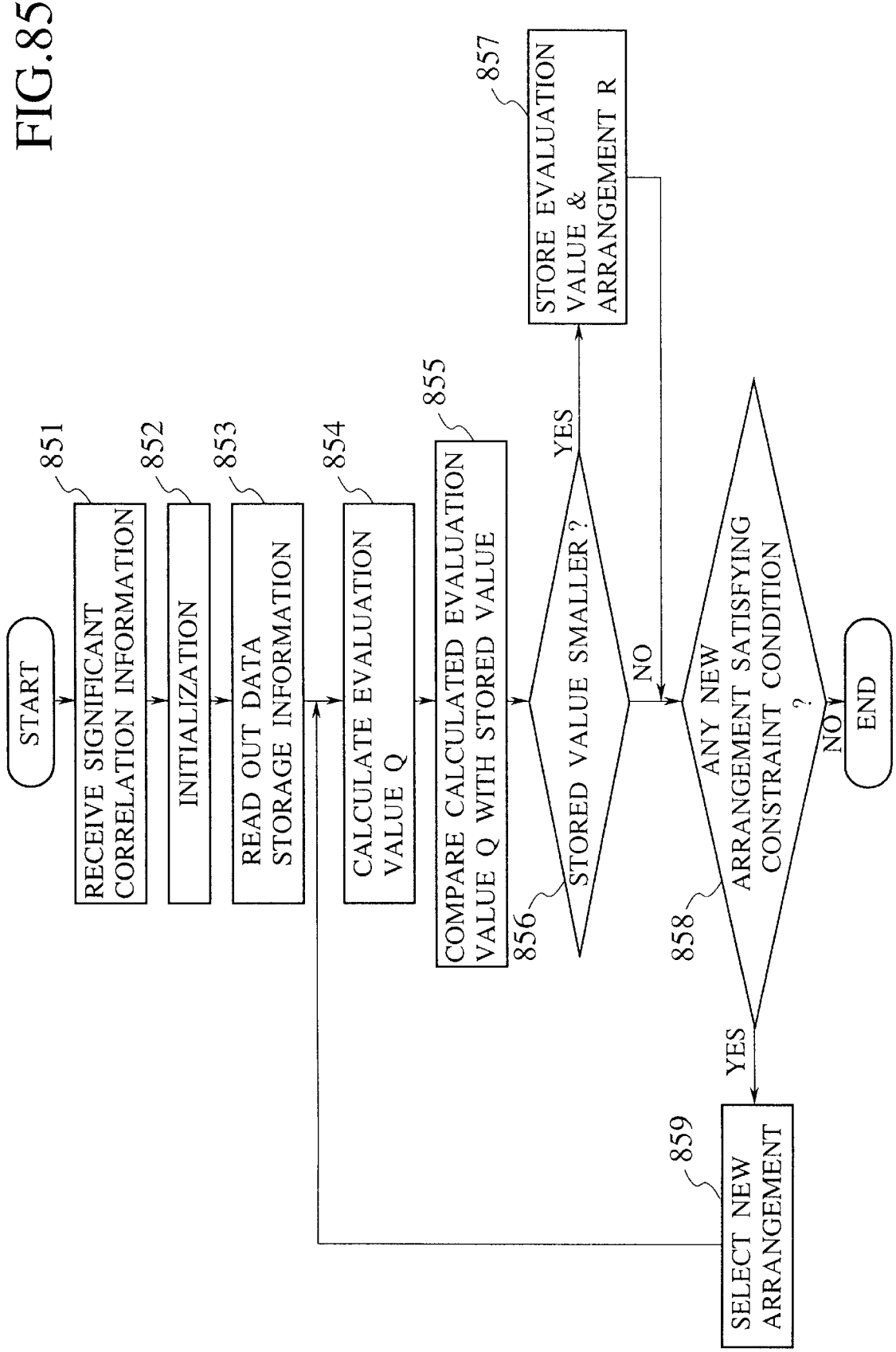
FIG. 85 is a flow chart for the operation of a data arrangement determination unit in the data management units of FIG. 78.

The data arrangement determination unit 204 determines the data arrangement according to the flow chart of FIG. 85 as follows.

First, the significant correlation relation is received from the significant information selection unit 236 (step 851), and then after the initialization (step 852), according to the index and the disk capacity table in the data storage information memory unit 205 shown in FIGS. 79A and 79B, the data storage information concerning which memory device each data is stored at, what size each data has, and what capacity each memory device has are read out (step 853).

Then, the data arrangement is evaluated by calculating the evaluation value using the following evaluation function (step 854).

$$Q = \sum_{j=1}^{M} \sum_{i=1}^{N} \sum_{k=1}^{N} Xij \times Xkj \times Dik - \sum_{i=1}^{N} \sum_{j=1}^{M} (1 - Xij \times \delta(j, Di)) \quad (4)$$

where Xij ($1 \leq i \leq N$, $1 \leq j \leq M$, Xij=0 or 1) is a variable indicating that the i-th data is stored in the j-th data storage region, Dik is the number of accesses by which the i-th data and the k-th data are used together, which takes a value 0 for the combination of data without any correlative relationship, and which is obtained from the correlation information.

Here, in addition, the constraint condition according to the following expressions is also used.

$$\sum_{i=1}^{N} si \times Xij \leq dj \, (\forall j) \quad (5)$$

where dj is the capacity of the j-th disk and si is the size of the i-th data, which are obtained from the data storage information.

Initially, the evaluation value for the current data arrangement is calculated by using the above equation (4), and the evaluation value and the current data arrangement are stored. Then, the data arrangement is changed to satisfy the constraint condition given by the above expressions (5). Next, for each new data arrangement, the evaluation value Q is calculated according to the above equation (4) (step 855), and this value Q is compared with the stored evaluation value (step 856). When the stored value is smaller than the calculated value, the calculated evaluation value Q and the corresponding new data arrangement R are stored (step 857). Then, whether there is any other new data arrangement which can satisfy the constraint condition of the above expressions (5) or not is determined (step 858), and if there is, the new data arrangement is selected (step 859) and the operation of the step 854 and below is repeated. When this operation is repeated for all the possible data arrangements which satisfy the constraint condition of the above expressions (5), the data arrangement having the best evaluation value remains stored at the end.

Here, the selection of the data arrangement to satisfy the constraint condition of the above expressions (5) can be made as follows. Suppose there are N data which appear in the significant correlation information, and M data storage regions. In such a case, there are altogether $N^M$ data arrangements that are conceivable. Then, among these arrangements, there is a possibility for selecting one arrangement which requires the moving of the data appearing in the significant correlation information alone without moving any other data and which results in the arrangement not satisfying the expressions (5). In such a case, some data which do not appear in the correlation information are selected from the data in the memory device which does not satisfy the expressions (5), and these selected data which have no correlation are moved to the arbitrary memory devices. When it is possible to satisfy the expressions (5) for all the memory devices in this manner, the resulting arrangement can be selected as the arrangement which satisfies the expressions (5), and otherwise the arrangement is discarded. This operation is repeated for all of $N^M$ possible arrangements.

When the data arrangement is selected in this manner, the data arrangement determination unit 204 commands the change of the data arrangement to the data arrangement changing unit 206, as follows.

Namely, there is a need to move the data on a plurality of processors, so that how data should be moved is commanded from the data arrangement determination unit 204 to the data arrangement changing unit 206. To this end, the data arrangement determination unit 204 transmits the information concerning the moving of the data among a plurality of data storage regions within each processor to the data arrangement changing unit 206 first. When this information is received, the data arrangement changing unit 206 temporarily prohibits the access to these data to be moved by setting the lock, and then changes the arrangement of these data. After that, the completion of the change of the arrangement of these data is notified to the data arrangement determination unit 204.

When this notice is received from the data arrangement changing unit 206, the data arrangement determination unit 204 starts the remaining data arrangement change among the processors. To this end, all the data arrangement changing units 206 on all the processors are commanded to prohibit accesses to all the data, and when the notice that the accesses to all the data are prohibited is received from all the data arrangement changing unit 206, next the data arrangement determination unit 204 selects the data to be moved one by one, and specifies the moving target processor to the data arrangement changing unit 206 on the processor on which the data to be moved is present, and commands the moving of the data from there to the moving target processor. When this command is received, the data arrangement changing unit 206 transmits the data to be moved to the data arrangement changing unit 206 on the specified moving target processor. When the notice for the completion of the moving of the data to be moved is received from the data arrangement changing unit 206 on the specified moving target processor, the data arrangement determination unit 204 proceeds to select the next data to be moved.

In this manner, when the arrangements of all the data are changed, the data arrangement determination unit 204 transmits the new data arrangement to the data storage information memory unit 205 on each processor, and when this transmission of the new data arrangement is completed, the data arrangement determination unit 204 commands all the data arrangement changing units 206 on all the processors to release the lock on the data.

Now, the exemplary case of applying the data management scheme of this third embodiment to the data management unit for managing the read only data will be described.

Here, the read only data can be stored in either the memory device capable of reading/writing or the read only memory device to which the writing can be made only once at a time of initially storing the data. The case of using the memory device capable of reading/writing can be realized similarly as described above. On the other hand, the case of using the read only memory device such as the CD-ROM, the scheme similar to that described above can be used only up to the determination of how to make the data rearrangement, as the writing into the original read only memory device is not allowed in rearranging the data.

Figure 86:
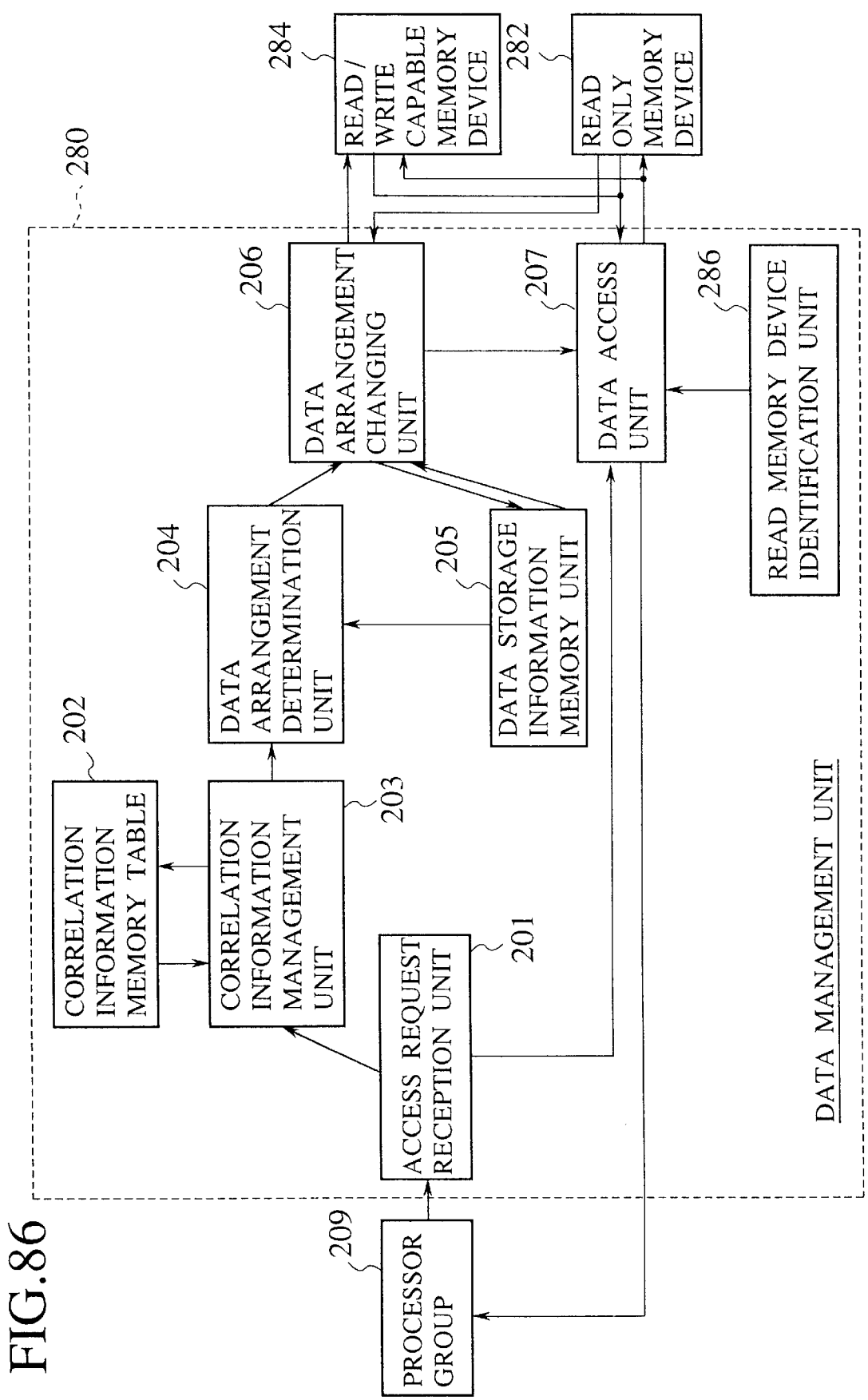
FIG. 86 is a block diagram of one possible modified configuration for the system of FIG. 59 in a case of an application to read only data.

In this case, as shown in FIG. 86, the data management unit 280 is associated with a read only memory device 282 in which the data are initially stored and a read/write capable memory device 284 for storing new data arrangement, which equipped with a read memory device identification unit 286 for identifying one of the read only memory device 282 and the read/write capable memory device 284 from which the data should be read out, such that the new data arrangement is stored in the read/write capable memory device 284 in a case of rearranging the data in accordance with the system characteristic. In this case, in making the data access or in rearranging the data, the data access unit 207 and the data arrangement changing unit 206 inquire the read memory device Identification unit 286 as to which one of the read only memory device 282 and the read/write capable memory device 284 should the data be read out from.

Figure 87:
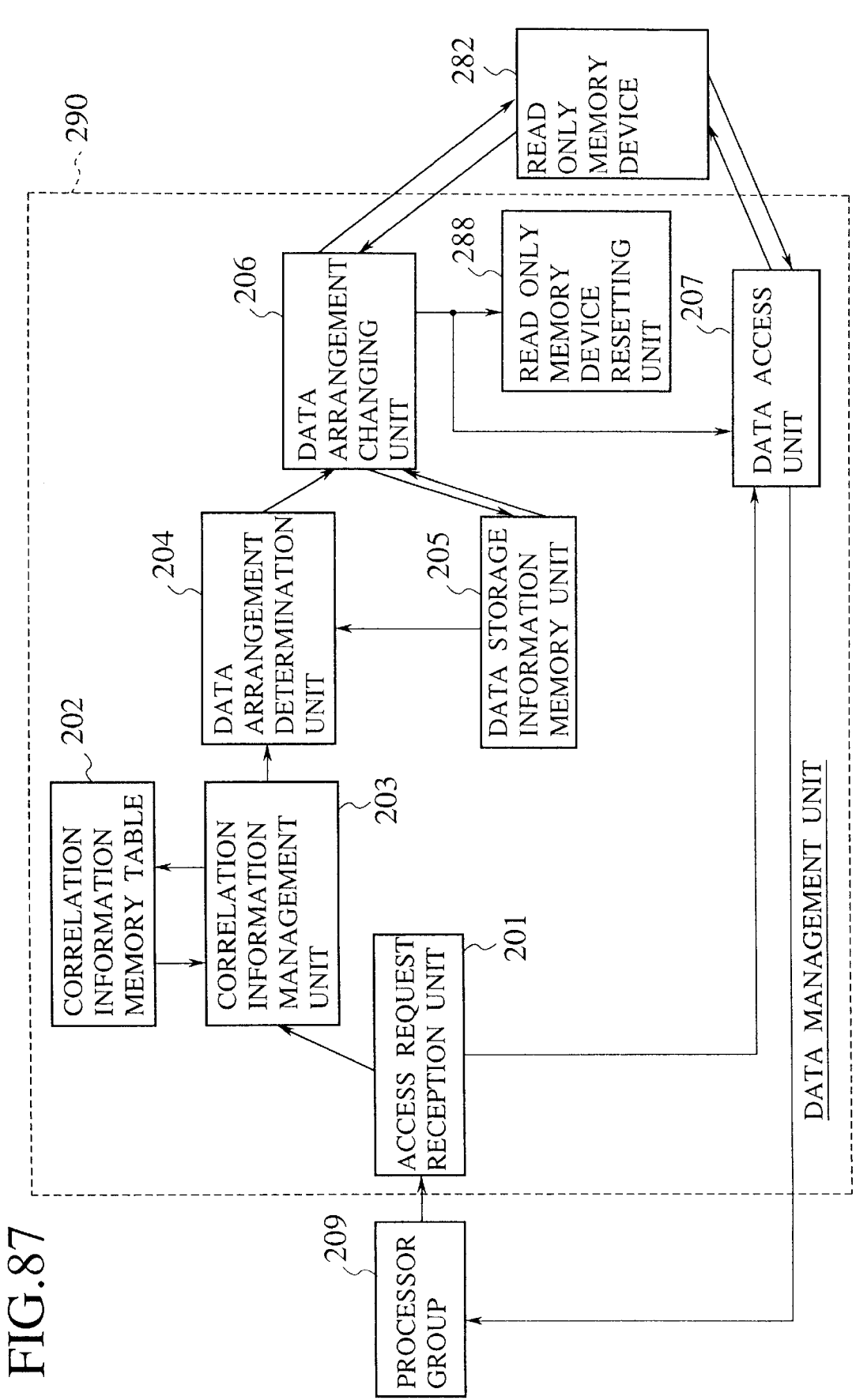
FIG. 87 is a block diagram of another possible modified configuration for the system of FIG. 59 in a case of an application to read only data.

Alternatively, as shown in FIG. 87, the data management unit 290 can be equipped with a read only memory device resetting unit 288 such that in rearranging the data in accordance with the system characteristic, the read only memory device 282 is reset and the data of the new data arrangement are stored into the reset read only memory device 282, and thereafter the reading of the data is made from the reset read only memory device 282.

Also, as this is the read only data management unit, the updating of the data does not occur at a time of resetting the new data arrangement in the reset read only memory device 282, so that the data arrangement can be changed while making copies in a new region, and the original data are accessed during the data arrangement change, while the access is made to the new region after the copies of all data are obtained.

It is also possible to store the content of the read only memory device storing the read only data in divisions into a plurality of memory devices, and it is also possible to rearrange the data of a plurality of read only memory devices into a single memory device.

By applying the data management scheme of this third embodiment to the read only data in this manner, it becomes possible to realize the optimum data arrangement according to the difference in the access pattern with respect to the data stored in the system, and consequently it becomes possible to realize the high speed reading operation.

As described, according to the data management scheme of this third embodiment, when the data stored in a plurality of data storage regions have a high frequency for being used together in the series processing, their correlation can be automatically recognized, and the arrangement of the data can be changed automatically such that the correlated data are stored n the same data storage region as much as possible.

Also, the information necessary in arranging the data are acquired automatically, so that there is no need for the system manager to analyze the processing on the system and determine the data arrangement, and consequently the processing time of each process can be shortened, while it becomes easier to take a full advantage of the available system power.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A transaction routing apparatus for routing transactions from at least one transaction source to one of a plurality of transaction processors for processing the transactions, comprising:

means for extracting at least one feature parameter from each transaction, the feature parameter of each transaction indicating what each transaction is;

means for storing processing history information on past transactions, the processing history information indicating what each past transaction was and how each past transaction was processed; and means for routing each transaction to one of the transaction processors according to the feature parameter extracted by the extracting means and the processing history information stored by the storing means.

2. The apparatus of claim 1, wherein the processing history information includes each past transaction, an identifier of one of the transaction processors which had processed each past transaction, and a processing cost which had been required in processing each past transaction.

3. The apparatus of claim 2, wherein the routing means determines said one of the transaction processors by selecting, for each of the transaction processors capable of processing said each transaction, at least one processing history information which has a feature parameter value of each feature parameter closest to a feature parameter value of each feature parameter extracted from said each transaction by the extracting means among the processing history information stored by the storing means, selecting one of the processing history information which has a smallest value for the processing cost among said at least one processing history information, obtaining a candidate transaction processor for each feature parameter as one of the transaction processors identified by said one of the processing history information, and selecting said one of the transaction processors from the candidate transaction processors of all the feature parameters extracted from said each transaction by the extracting means.

4. The apparatus of claim 3, wherein the routing means determines said one of the transaction processors by selecting an arbitrary one of the transaction processors capable of processing said each transaction, whenever the candidate transaction processors cannot be obtained for any of the feature parameters extracted from said each transaction by the extracting means.

5. The apparatus of claim 2, wherein the routing means routes each transaction to one of the transaction processors for which the processing cost is expected to be minimum according to the processing history information.

6. The apparatus of claim 2, wherein the processing cost is given by a processing time required in processing each past transaction.

7. The apparatus of claim 2, wherein each past transaction is represented by the feature parameter of each past transaction in the processing history information stored by the storing means.

8. The apparatus of claim 1, further comprising means for extracting the feature parameter from said each past transaction in the processing history information stored by the storing means.

9. The apparatus of claim 1, wherein each transaction contains a type of transaction and arguments, and the feature parameter of each transaction is defined as function of the type of transaction and arguments contained in each transaction.

10. The apparatus of claim 1, further comprising means for specifying a weight for each of the feature parameters extracted by the extracting means, and wherein the routing means determines said one of the transaction processors by obtaining a candidate transaction processor for each feature parameter among said plurality of transaction processors according to the feature parameters extracted by the extracting means and the processing history information stored by the storing means and selecting said one of the transaction processors from the candidate transaction processors for all the feature parameters according to the weights for all the feature parameters.

11. The apparatus of claim 10, wherein the weights for all the feature parameters indicate relative strengths of correlation relationships of the feature parameters of past transactions and the transaction processors which had processed the past transactions.

12. The apparatus of claim 1, wherein the routing means also uses at least one additional feature parameter obtained by changing bit positions in at least one of the feature parameters extracted by the extracting means.

13. The apparatus of claim 1, wherein the storing means stores a number of records of the processing history information, which is varied according to a change of a difference between a predicted processing cost for each transaction estimated according to the processing history information stored in the storing means and an actual processing cost required in processing each transaction.

14. The apparatus of claim 1, wherein the processing history information includes a processing cost which had been required in processing each past transaction, and wherein the routing means determines said one of the transaction processors by obtaining a candidate transaction processor for each feature parameter among said plurality of transaction processors according to the feature parameters extracted by the extracting means and the processing history information stored by the storing means, discarding any candidate transaction processor for one feature parameter which has the processing cost not significantly different from the processing costs of other transaction processors having identical feature parameter as said one feature parameter, and selecting said one of the transaction processors from the candidate transaction processors which are not discarded.

15. The apparatus of claim 1, further comprising means for obtaining a load information for each of the transaction processors capable of processing said each transaction, and wherein the routing means routes said each transaction with higher priority to one of the transaction processors for which the load information indicates a smaller load.

16. The apparatus of claim 1, wherein said each transaction is given in a form of a packet formed by a number of data units, where values of the data units indicate the feature parameters.

17. The apparatus of claim 1, wherein the extracting means has information on a data structure of said each transaction, and extracts the feature parameters of said each transaction as basic data units extracted from said each transaction according to said information on the data structure of said each transaction.

18. The apparatus of claim 1, further comprising means for deleting the processing history information which have been registered into the storing means before a prescribed period of time in past, from the storing means.

19. The apparatus of claim 1, wherein when each transaction processor receives a transaction which cannot be processed by said each transaction processor from the routing means, said each transaction processor notifies an impossibility for processing said transaction to the routing means, and in response, the routing means records the impossibility for processing said transaction by said each transaction processor in the processing history information stored in the storing means, and then carried out a routing of said transaction again.

20. A method for routing transactions from at least one transaction source to one of a plurality of transaction processors for processing the transactions, comprising the steps of:

extracting at least one feature parameter from each transaction, the feature parameter of each transaction indicating what each transaction is;

obtaining processing history information on past transactions, the processing history information indicating what each past transaction was and how each past transaction was processed; and routing each transaction to one of the transaction processors according to the feature parameter extracted at the extracting step and the processing history information obtained at the obtaining step.

* * * * *